(12) United States Patent
Hannuksela et al.

(10) Patent No.: US 9,736,454 B2
(45) Date of Patent: Aug. 15, 2017

(54) METHOD AND APPARATUS FOR VIDEO CODING

(71) Applicant: Nokia Technologies Oy, Espoo (FI)

(72) Inventors: Miska Matias Hannuksela, Tampere (FI); Dmytro Rusanovskyy, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 626 days.

(21) Appl. No.: 14/032,338

(22) Filed: Sep. 20, 2013

(65) Prior Publication Data

US 2014/0168362 A1 Jun. 19, 2014

Related U.S. Application Data

(60) Provisional application No. 61/703,735, filed on Sep. 21, 2012.

(51) Int. Cl.
*H04N 13/00* (2006.01)
*H04N 19/597* (2014.01)

(52) U.S. Cl.
CPC ....... *H04N 13/0048* (2013.01); *H04N 19/597* (2014.11)

(58) Field of Classification Search
CPC ...... H04N 7/50; H04N 7/26244; H04N 7/462; H04N 7/26335
See application file for complete search history.

(56) References Cited

U.S. PATENT DOCUMENTS

| 8,532,410 B2 | 9/2013 | Tian et al. |
| 8,964,844 B2 | 2/2015 | Lai et al. |
| 2011/0216833 A1 | 9/2011 | Chen et al. |

(Continued)

FOREIGN PATENT DOCUMENTS

| JP | 2010-157825 A | 7/2010 |
| JP | 2010-537484 A | 12/2010 |

(Continued)

OTHER PUBLICATIONS

International Search Report and Written Opinion received for corresponding Patent Cooperation Treaty Application No. PCT/FI2013/050899, dated Dec. 4, 2013, 12 pages.

(Continued)

*Primary Examiner* — Shawn An
(74) *Attorney, Agent, or Firm* — Alston & Bird LLP

(57) ABSTRACT

There are disclosed various methods, apparatuses and computer program products for video encoding. In some embodiments the method for encoding comprises examining availability of a depth block co-located with a texture block, determining a prediction method for a texture block on the basis of availability of a co-located depth block; and deriving a first prediction block for the texture block on the basis of the availability of the co-located depth block. The method further comprises deriving a first prediction block for the texture block on the basis of the co-located depth block, if the co-located depth block is available, and otherwise deriving a second prediction block for the texture block without using the co-located depth block. There are also disclosed corresponding method for various methods, apparatuses and computer program products for video decoding.

12 Claims, 13 Drawing Sheets

(56) References Cited

U.S. PATENT DOCUMENTS

| | | | |
|---|---|---|---|
| 2011/0222602 A1 | 9/2011 | Sung et al. | |
| 2012/0050475 A1 | 3/2012 | Tian et al. | |
| 2012/0229602 A1* | 9/2012 | Chen | H04N 19/597 348/43 |
| 2013/0128965 A1 | 5/2013 | Zhang et al. | |
| 2013/0162773 A1* | 6/2013 | Tian | H04N 19/597 348/43 |
| 2013/0235159 A1 | 9/2013 | Kim et al. | |
| 2014/0009574 A1* | 1/2014 | Hannuksela | H04N 19/00769 348/42 |
| 2015/0245061 A1* | 8/2015 | Chen | H04N 19/597 375/240.13 |
| 2015/0288983 A1* | 10/2015 | Koo | H04N 19/597 375/240.12 |

FOREIGN PATENT DOCUMENTS

| | | |
|---|---|---|
| JP | 2011-519226 A | 6/2011 |
| JP | 2012-518367 A | 8/2012 |
| KR | 2012-0013966 A | 2/2012 |
| KR | 2012-0051574 A | 5/2012 |
| WO | 2010043773 A1 | 4/2010 |

OTHER PUBLICATIONS

Su et al., "Depth-Based Motion Vector Prediction in 3D Video Coding", Picture Coding Symposium (PCS), Krakow, Poland, 2012, 10 pages.
Daribo et al., "Arbitrarily Shaped Sub-Block Motion Predition in Texture Map Compression Using Depth Information", Picture Coding Symposium (PCS), Krakow, Poland, May, 2012. 4 pages.
Zhang et al., "Low Complexity Multiview Video Plus Depth Coding", IEEE Trans. on Consumer Electronics, vol. 57, No. 4, Nov. 2011, 10 pages.
"Block-Based Depth Maps Interpolation for Efficient Multiview Content Generation"; IEEE Transactions on Circuits and Systems for Video Technology; vol. 21, No. 12; Dec. 31, 2011.
Office Action from corresponding Korean Patent Application No. 2015-7010203 dated Nov. 20, 2015.
Boyce, Jill et al.; "High Level Syntax Hooks for Future Extensions—Adopted Text Modifications"; Joint Collaborative Team on Video Coding (JCT-VC) of ITU-T SG16 WP3 and ISO/IEC JTC1/SC29/WG11; 8th Meeting: San Jose, CA, USA; Feb. 1-10, 2012.
Boyce, Jill et al.; "High Level Syntax Hooks for Future Extensions"; Joint Collaborative Team on Video Coding (JCT-VC) of ITU-T SG16 WP3 and ISO/IEC JTC1/SC29/WG11; 8th Meeting: San Jose, CA, USA; Feb. 1-10, 2012.
Coban, Muhammed, et al.; "Support of Independent Sub-Pictures"; Joint Collaborative Team on Video Coding (JCT-VC) of ITU-T SG 16 WP 3 and ISO/IEC JTC 1/SC 29/WG 11; 9th Meeting: Geneva, CH, Apr. 27-May 7, 2012.
Chen, Ying et al.; AHG9: Header Parameter Set (HPS); Joint Collaborative Team on Video Coding (JCT-VC) of ITU-T SG16 WP3 and ISO/IEC JTC1/SC29/WG11; 10th Meeting: Stockholm, SE; Jul. 11-20, 2012.
Singapore Search Report and Written Opinion for Application No. 11201502194Q dated Aug. 3, 2016.
Jager, Fabian; "3D-CE6.h related: Model-based Intra Coding for Depth Maps using a Depth Lookup Table"; Joint Collaborative Team on 3D Video Coding Extension Development of ITU-T SG 16 WP 3 and ISO/IEC JTC 1/SC 29/WG 11; 1st Meeting: Stockholm, SE, Jul. 16-20, 2012; Document: JCT2-A0010; 9 pages.
Office Action from corresponding Japanese Patent Application No. 2015-532478 mailed May 10, 2016 with English summary; 8 pages.
Office Action from corresponding Korean Patent Application No. 2015-7010203 dated May 23, 2016.
Rusanovskyy et al. "3DV-ATM Anchor Production under the Common Test Conditions." International Organisation for Standardisation, Feb. 2012, 5 pages.
Shimizu, Shinya; Sugimoto, Shiori; "3DV-AVC HLS: On depth definition"; Joint Collaborative Team on 3D Video Coding Extension Development of ITU-T SG 16 WP 3 and ISO/IEC JTC 1/SC 29/WG 11; 1st Meeting: Stockholm, SE, Jul. 16-20, 2012; Document JCT2-A0140; 6 pages.
Uchiumi, Tadashi et al. "Additional tool for depth-based prediction with D-MVP (3DV ACV)." International Organisation for Standardisation, Feb. 2012, 4 pages.
Wang et al. "Block-Based Depth Maps Interpolation for Efficient Multiview Content Generation." IEEE Transactions on Circuits and Systems for Video Technology, vol. 21, No. 12, Dec. 2011, pp. 1847-1858.
Extended European Search Report for European Patent Application No. EP 13839597.5, dated Jun. 13, 2016, 10 pages.
Office Action for Japanese Application No. 2015-532478 dated Dec. 20, 2016.
Office Action for European Patent Application No. EP 13839597.5, dated Jun. 28, 2017, 5 pages.
Office Action for Chinese Patent Application No. 201380060994.X, dated Jun. 5, 2017, 6 pages.

* cited by examiner

METHOD AND APPARATUS FOR VIDEO CODING

TECHNICAL FIELD

The present application relates generally to an apparatus, a method and a computer program for video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Scalable video coding refers to a coding structure where one bitstream can contain multiple representations of the content at different bitrates, resolutions, frame rates and/or other types of scalability. A scalable bitstream may consist of a base layer providing the lowest quality video available and one or more enhancement layers that enhance the video quality when received and decoded together with the lower layers. In order to improve coding efficiency for the enhancement layers, the coded representation of that layer may depend on the lower layers. Each layer together with all its dependent layers is one representation of the video signal at a certain spatial resolution, temporal resolution, quality level, and/or operation point of other types of scalability.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display.

In the encoding of 3D video content, video compression systems, such as Advanced Video Coding standard H.264/AVC or the Multiview Video Coding MVC extension of H.264/AVC can be used.

SUMMARY

Some embodiments provide a method for encoding and decoding video information. In some embodiments of the method a prediction method for a texture block may be determined on the basis of availability of a co-located depth block; and on the basis of the availability of the co-located depth block, a first prediction block for the texture block may be derived on the basis of the co-located depth block, if the co-located depth block is available. If the co-located depth block is not available, a second prediction block for the texture block may be derived without using the co-located depth block.

Various aspects of examples of the invention are provided in the detailed description.

According to a first aspect of the present invention, there is provided a method comprising:

examining availability of a depth block co-located with a texture block;

determining a prediction method for a texture block on the basis of availability of a co-located depth block; and deriving a first prediction block for the texture block on the basis of the availability of the co-located depth block, if the co-located depth block is available; and otherwise deriving a second prediction block for the texture block without using the co-located depth block.

According to a second aspect of the present invention, there is provided a method comprising:

examining availability of a depth block co-located with a texture block;

determining a prediction method for a texture block on the basis of availability of a co-located depth block; and deriving a first prediction block for the texture block on the basis of the availability of the co-located depth block, if the co-located depth block is available; and otherwise deriving a second prediction block for the texture block without using the co-located depth block.

According to a third aspect of the present invention, there is provided an apparatus comprising at least one processor and at least one memory including computer program code, the at least one memory and the computer program code configured to, with the at least one processor, cause the apparatus to:

examine availability of a depth block co-located with a texture block;

determine a prediction method for a texture block on the basis of availability of a co-located depth block; and derive a first prediction block for the texture block on the basis of the co-located depth block, if the co-located depth block is available; and otherwise deriving a second prediction block for the texture block without using the co-located depth block.

According to a fourth aspect of the present invention, there is provided an apparatus comprising at least one processor and at least one memory including computer program code, the at least one memory and the computer program code configured to, with the at least one processor, cause the apparatus to:

examine availability of a depth block co-located with a texture block;

determine a prediction method for a texture block on the basis of availability of a co-located depth block; and derive a first prediction block for the texture block on the basis of the co-located depth block, if the co-located depth block is available; and otherwise deriving a second prediction block for the texture block without using the co-located depth block.

According to a fifth aspect of the present invention, there is provided an apparatus comprising:

means for examining availability of a depth block co-located with a texture block;

means for determining a prediction method for a texture block on the basis of availability of a co-located depth block; and means for deriving a first prediction block for the texture block on the basis of the co-located depth block, if the co-located depth block is available; and otherwise deriving a second prediction block for the texture block without using the co-located depth block.

According to a sixth aspect of the present invention, there is provided an apparatus comprising:
means for examining availability of a depth block co-located with a texture block;
determining a prediction method for a texture block on the basis of availability of a co-located depth block; and
means for deriving a first prediction block for the texture block on the basis of the co-located depth block, if the co-located depth block is available; and otherwise deriving a second prediction block for the texture block without using the co-located depth block.

According to a seventh aspect of the present invention, there is provided a computer program product including one or more sequences of one or more instructions which, when executed by one or more processors, cause an apparatus to at least perform the following:
examine availability of a depth block co-located with a texture block;
determine a prediction method for a texture block on the basis of availability of a co-located depth block; and
derive a first prediction block for the texture block on the basis of the co-located depth block, if the co-located depth block is available; and otherwise deriving a second prediction block for the texture block without using the co-located depth block.

According to an eighth aspect of the present invention, there is provided a computer program product including one or more sequences of one or more instructions which, when executed by one or more processors, cause an apparatus to at least perform the following:
examine availability of a depth block co-located with a texture block;
determine a prediction method for a texture block on the basis of availability of a co-located depth block; and
derive a first prediction block for the texture block on the basis of the co-located depth block, if the co-located depth block is available; and otherwise deriving a second prediction block for the texture block without using the co-located depth block.

According to a ninth aspect of the present invention, there is provided a method comprising:
receiving, capturing, or deriving one or more input texture views and one or more input depth views;
determining which input texture views and input depth views are encoded;
encoding one or more indications of the one or more encoded texture views and the one or more encoded depth views; and
encoding the input texture views and the input depth views determined to be encoded into a bitstream, wherein the encoded texture views and the encoded depth views having one or more of the following characteristics:
an encoded depth view represents a viewpoint that is not represented by any encoded texture view of the bitstream;
two or more encoded depth views represent a same viewpoint;
a first encoded depth view comprises depth view components of a first depth map type and a second encoded depth view comprises depth view components of a second depth map type, the first depth map type and the second depth map type being different;
an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:
a ratio of a horizontal or vertical sample dimension of the first sampling grid and a horizontal or vertical sample dimension, respectively, of the second sampling grid is not an integer;
the first sampling grid does not cover the same sampling area as the second sampling grid.

According to a tenth aspect of the present invention, there is provided a method comprising:
receiving, capturing, or deriving one or more input texture views and one or more input depth views;
determining which input texture views and input depth views are encoded, wherein the determination comprises one or more of the following:
concluding if input depth views are needed for prediction of any of the one or more encoded texture views, and determining that depth views needed for prediction of any of the one or more encoded texture views are encoded, while depth views not needed for prediction of any of the one or more encoded texture views are not encoded;
receiving information which texture views are expected or known to be output on the basis of the bitstream and determining the encoded texture and depth views to facilitate decoding or view synthesis of said texture views expected or known to be output;
encoding the input texture views and the input depth views determined to be encoded into a bitstream; and
encoding one or more indications of the one or more encoded texture views and the one or more encoded depth views.

According to an eleventh aspect of the present invention, there is provided a method comprising:
receiving one or more encoded texture views and one or more encoded depth views;
decoding one or more indications of the one or more encoded texture views and the one or more encoded depth views to determine which input texture views and input depth views have been encoded; and
decoding the encoded texture views and the encoded depth views from a bitstream, wherein the encoded texture views and the encoded depth views having one or more of the following characteristics:
an encoded depth view represents a viewpoint that is not represented by any encoded texture view of the bitstream;
two or more encoded depth views represent a same viewpoint;
a first encoded depth view comprises depth view components of a first depth map type and a second encoded depth view comprises depth view components of a second depth map type, the first depth map type and the second depth map type being different;
an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:
a ratio of a horizontal or vertical sample dimension of the first sampling grid and a horizontal or vertical sample dimension, respectively, of the second sampling grid is not an integer;
the first sampling grid does not cover the same sampling area as the second sampling grid.

According to a twelfth aspect of the present invention, there is provided an apparatus comprising at least one processor and at least one memory including computer program code, the at least one memory and the computer program code configured to, with the at least one processor, cause the apparatus to:

receive, capture, or derive one or more input texture views and one or more input depth views;

determine which input texture views and input depth views are encoded;

encode one or more indications of the one or more encoded texture views and the one or more encoded depth views; and encode the input texture views and the input depth views determined to be encoded into a bitstream, wherein the encoded texture views and the encoded depth views having one or more of the following characteristics:
  an encoded depth view represents a viewpoint that is not represented by any encoded texture view of the bitstream;
  two or more encoded depth views represent a same viewpoint;
  a first encoded depth view comprises depth view components of a first depth map type and a second encoded depth view comprises depth view components of a second depth map type, the first depth map type and the second depth map type being different;
  an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:
    a ratio of a horizontal or vertical sample dimension of the first sampling grid and a horizontal or vertical sample dimension, respectively, of the second sampling grid is not an integer;
    the first sampling grid does not cover the same sampling area as the second sampling grid.

According to a thirteenth aspect of the present invention, there is provided an apparatus comprising at least one processor and at least one memory including computer program code, the at least one memory and the computer program code configured to, with the at least one processor, cause the apparatus to:

receive, capture, or derive one or more input texture views and one or more input depth views;

determine which input texture views and input depth views are encoded, wherein the determination comprises one or more of the following:
  conclude if input depth views are needed for prediction of any of the one or more encoded texture views, and determine that depth views needed for prediction of any of the one or more encoded texture views are encoded, while depth views not needed for prediction of any of the one or more encoded texture views are not encoded;
  receive information which texture views are expected or known to be output on the basis of the bitstream and determine the encoded texture and depth views to facilitate decoding or view synthesis of said texture views expected or known to be output;

encode the input texture views and the input depth views determined to be encoded into a bitstream; and encode one or more indications of the one or more encoded texture views and the one or more encoded depth views.

According to a fourteenth aspect of the present invention, there is provided an apparatus comprising at least one processor and at least one memory including computer program code, the at least one memory and the computer program code configured to, with the at least one processor, cause the apparatus to:

receive one or more encoded texture views and one or more encoded depth views;

decode one or more indications of the one or more encoded texture views and the one or more encoded depth views to determine which input texture views and input depth views have been encoded; and decode the encoded texture views and the encoded depth views from a bitstream, wherein the encoded texture views and the encoded depth views having one or more of the following characteristics:
  an encoded depth view represents a viewpoint that is not represented by any encoded texture view of the bitstream;
  two or more encoded depth views represent a same viewpoint;
  a first encoded depth view comprises depth view components of a first depth map type and a second encoded depth view comprises depth view components of a second depth map type, the first depth map type and the second depth map type being different;
  an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:
    a ratio of a horizontal or vertical sample dimension of the first sampling grid and a horizontal or vertical sample dimension, respectively, of the second sampling grid is not an integer;
    the first sampling grid does not cover the same sampling area as the second sampling grid.

According to a fifteenth aspect of the present invention, there is provided an apparatus comprising:

means for receiving, capturing, or deriving one or more input texture views and one or more input depth views;

means for determining which input texture views and input depth views are encoded;

means for encoding one or more indications of the one or more encoded texture views and the one or more encoded depth views; and means for encoding the input texture views and the input depth views determined to be encoded into a bitstream, wherein the encoded texture views and the encoded depth views having one or more of the following characteristics:
  an encoded depth view represents a viewpoint that is not represented by any encoded texture view of the bitstream;
  two or more encoded depth views represent a same viewpoint;
  a first encoded depth view comprises depth view components of a first depth map type and a second encoded depth view comprises depth view components of a second depth map type, the first depth map type and the second depth map type being different;

an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:

a ratio of a horizontal or vertical sample dimension of the first sampling grid and a horizontal or vertical sample dimension, respectively, of the second sampling grid is not an integer;

the first sampling grid does not cover the same sampling area as the second sampling grid.

According to a sixteenth aspect of the present invention, there is provided an apparatus comprising:

means for receiving, capturing, or deriving one or more input texture views and one or more input depth views;

means for determining which input texture views and input depth views are encoded, wherein the means for determination comprises one or more of the following:

means for concluding if input depth views are needed for prediction of any of the one or more encoded texture views, and determining that depth views needed for prediction of any of the one or more encoded texture views are encoded, while depth views not needed for prediction of any of the one or more encoded texture views are not encoded;

means for receiving information which texture views are expected or known to be output on the basis of the bitstream and determining the encoded texture and depth views to facilitate decoding or view synthesis of said texture views expected or known to be output;

means for encoding the input texture views and the input depth views determined to be encoded into a bitstream; and means for encoding one or more indications of the one or more encoded texture views and the one or more encoded depth views.

According to a seventeenth aspect of the present invention, there is provided an apparatus comprising:

means for receiving one or more encoded texture views and one or more encoded depth views;

means for decoding one or more indications of the one or more encoded texture views and the one or more encoded depth views to determine which input texture views and input depth views have been encoded; and means for decoding the encoded texture views and the encoded depth views from a bitstream, wherein the encoded texture views and the encoded depth views having one or more of the following characteristics:

an encoded depth view represents a viewpoint that is not represented by any encoded texture view of the bitstream;

two or more encoded depth views represent a same viewpoint;

a first encoded depth view comprises depth view components of a first depth map type and a second encoded depth view comprises depth view components of a second depth map type, the first depth map type and the second depth map type being different;

an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:

a ratio of a horizontal or vertical sample dimension of the first sampling grid and a horizontal or vertical sample dimension, respectively, of the second sampling grid is not an integer;

the first sampling grid does not cover the same sampling area as the second sampling grid.

According to an eighteenth aspect of the present invention, there is provided a computer program product including one or more sequences of one or more instructions which, when executed by one or more processors, cause an apparatus to at least perform the following:

receive, capture, or derive one or more input texture views and one or more input depth views;

determine which input texture views and input depth views are encoded;

encode one or more indications of the one or more encoded texture views and the one or more encoded depth views; and encode the input texture views and the input depth views determined to be encoded into a bitstream, wherein the encoded texture views and the encoded depth views having one or more of the following characteristics:

an encoded depth view represents a viewpoint that is not represented by any encoded texture view of the bitstream;

two or more encoded depth views represent a same viewpoint;

a first encoded depth view comprises depth view components of a first depth map type and a second encoded depth view comprises depth view components of a second depth map type, the first depth map type and the second depth map type being different;

an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:

a ratio of a horizontal or vertical sample dimension of the first sampling grid and a horizontal or vertical sample dimension, respectively, of the second sampling grid is not an integer;

the first sampling grid does not cover the same sampling area as the second sampling grid.

According to a nineteenth aspect of the present invention, there is provided a computer program product including one or more sequences of one or more instructions which, when executed by one or more processors, cause an apparatus to at least perform the following:

receive, capture, or derive one or more input texture views and one or more input depth views;

determine which input texture views and input depth views are encoded, wherein the determination comprises one or more of the following:

conclude if input depth views are needed for prediction of any of the one or more encoded texture views, and determine that depth views needed for prediction of any of the one or more encoded texture views are encoded, while depth views not needed for prediction of any of the one or more encoded texture views are not encoded;

receive information which texture views are expected or known to be output on the basis of the bitstream and determine the encoded texture and depth views to facilitate decoding or view synthesis of said texture views expected or known to be output;

encode the input texture views and the input depth views determined to be encoded into a bitstream; and encode one or more indications of the one or more encoded texture views and the one or more encoded depth views.

According to a twentieth aspect of the present invention, there is provided a computer program product including one or more sequences of one or more instructions which, when executed by one or more processors, cause an apparatus to at least perform the following:

receive one or more encoded texture views and one or more encoded depth views;

decode one or more indications of the one or more encoded texture views and the one or more encoded depth views to determine which input texture views and input depth views have been encoded; and decode the encoded texture views and the encoded depth views from a bitstream, wherein the encoded texture views and the encoded depth views having one or more of the following characteristics:

an encoded depth view represents a viewpoint that is not represented by any encoded texture view of the bitstream;

two or more encoded depth views represent a same viewpoint;

a first encoded depth view comprises depth view components of a first depth map type and a second encoded depth view comprises depth view components of a second depth map type, the first depth map type and the second depth map type being different;

an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:

a ratio of a horizontal or vertical sample dimension of the first sampling grid and a horizontal or vertical sample dimension, respectively, of the second sampling grid is not an integer;

the first sampling grid does not cover the same sampling area as the second sampling grid.

According to a twenty-first aspect of the present invention, there is provided a method comprising:

receiving from a bitstream a first depth view of a first viewpoint, the bitstream not including a texture view of the first viewpoint, decoding the first depth view, using backward view synthesis to the first viewpoint based on the decoded first depth view.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 1:
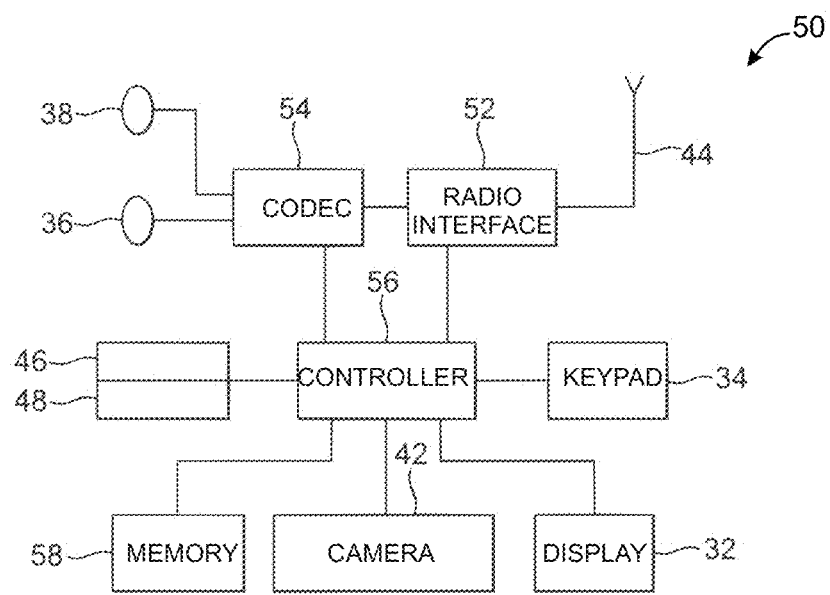
FIG. 1 shows schematically an electronic device employing some embodiments of the invention.

In the following, several embodiments of the invention will be described in the context of one video coding arrangement. It is to be noted, however, that the invention is not limited to this particular arrangement. In fact, the different embodiments have applications widely in any environment where improvement of reference picture handling is required. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

There is a currently ongoing standardization project of High Efficiency Video Coding (HEVC) by the Joint Collaborative Team-Video Coding (JCT-VC) of VCEG and MPEG.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in a draft HEVC standard—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. In H.264/AVC and HEVC, a picture may either be a frame or a field. A frame comprises a matrix of luma samples and corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

During the course of HEVC standardization the terminology for example on picture partitioning units has evolved. In the next paragraphs, some non-limiting examples of HEVC terminology are provided.

In one draft version of the HEVC standard, video pictures are divided into coding units (CU) covering the area of the picture. A CU consists of one or more prediction units (PU) defining the prediction process for the samples within the CU and one or more transform units (TU) defining the prediction error coding process for the samples in the CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can further be split into smaller PUs and TUs in order to increase granularity of the prediction and prediction error coding processes, respectively. The PU splitting can be realized by splitting the CU into four equal size square PUs or splitting the CU into two rectangle PUs vertically or horizontally in a symmetric or asymmetric way. The division of the image into CUs, and division of CUs into PUs and TUs is typically signalled in the bitstream allowing the decoder to reproduce the intended structure of these units.

In a draft HEVC standard, a picture can be partitioned in tiles, which are rectangular and contain an integer number of LCUs. In a draft HEVC standard, the partitioning to tiles forms a regular grid, where heights and widths of tiles differ from each other by one LCU at the maximum. In a draft HEVC, a slice consists of an integer number of CUs. The CUs are scanned in the raster scan order of LCUs within tiles or within a picture, if tiles are not in use. Within an LCU, the CUs have a specific scan order.

In a Working Draft (WD) 5 of HEVC, some key definitions and concepts for picture partitioning are defined as follows. A partitioning is defined as the division of a set into subsets such that each element of the set is in exactly one of the subsets.

A basic coding unit in a HEVC WD5 is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two trees, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In a HEVC WD5, pictures are divided into slices and tiles. A slice may be a sequence of treeblocks but (when referring to a so-called fine granular slice) may also have its boundary within a treeblock at a location where a transform unit and prediction unit coincide. Treeblocks within a slice are coded and decoded in a raster scan order. For the primary coded picture, the division of each picture into slices is a partitioning.

In a HEVC WD5, a tile is defined as an integer number of treeblocks co-occurring in one column and one row, ordered consecutively in the raster scan within the tile. For the primary coded picture, the division of each picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprise treeblocks contained in several tiles.

A distinction between coding units and coding treeblocks may be defined for example as follows. A slice may be defined as a sequence of one or more coding tree units (CTU) in raster-scan order within a tile or within a picture if tiles are not in use. Each CTU may comprise one luma coding treeblock (CTB) and possibly (depending on the chroma format being used) two chroma CTBs.

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

A syntax element may be defined as an element of data represented in the bitstream. A syntax structure may be defined as zero or more syntax elements present together in the bitstream in a specified order.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to, for example, enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit and whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. A draft HEVC standard includes a 1-bit nal_ref_idc syntax element, also known as nal_ref_flag, which when equal to 0 indicates that a coded slice contained in the NAL unit is a part of a non-reference picture and when equal to 1 indicates that a coded slice contained in the NAL unit is a part of a reference picture. The header for SVC and MVC NAL units may additionally contain various indications related to the scalability and multiview hierarchy.

In a draft HEVC standard, a two-byte NAL unit header is used for all specified NAL unit types. The first byte of the NAL unit header contains one reserved bit, a one-bit indication nal_ref_flag primarily indicating whether the picture carried in this access unit is a reference picture or a non-reference picture, and a six-bit NAL unit type indication. The second byte of the NAL unit header includes a three-bit temporal_id indication for temporal level and a five-bit reserved field (called reserved_one_5 bits) required to have a value equal to 1 in a draft HEVC standard. The temporal_id syntax element may be regarded as a temporal identifier for the NAL unit and TemporalId variable may be defined to be equal to the value of temporal_id. The five-bit reserved field is expected to be used by extensions such as a future scalable and 3D video extension. Without loss of generality, in some example embodiments a variable LayerId is derived from the value of reserved_one_5 bits for example as follows: LayerId=reserved_one_5 bits−1.

In a later draft HEVC standard, a two-byte NAL unit header is used for all specified NAL unit types. The NAL unit header contains one reserved bit, a six-bit NAL unit type indication, a six-bit reserved field (called reserved_zero_6 bits) and a three-bit temporal_id_plus1 indication for temporal level. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. Without loss of generality, in some example embodiments a variable LayerId is derived from the value of reserved_zero_6 bits for example as follows: LayerId=reserved_zero_6 bits.

It is expected that reserved_one_5 bits, reserved_zero_6 bits and/or similar syntax elements in NAL unit header would carry information on the scalability hierarchy. For example, the LayerId value derived from reserved_one_5 bits, reserved_zero_6 bits and/or similar syntax elements may be mapped to values of variables or syntax elements describing different scalability dimensions, such as quality_id or similar, dependency_id or similar, any other type of layer identifier, view order index or similar, view identifier, an indication whether the NAL unit concerns depth or texture i.e. depth_flag or similar, or an identifier similar to priority_id of SVC indicating a valid sub-bitstream extraction if all NAL units greater than a specific identifier value are removed from the bitstream. reserved_one_5 bits, reserved_zero_6 bits and/or similar syntax elements may be partitioned into one or more syntax elements indicating scalability properties. For example, a certain number of bits among reserved_one_5 bits, reserved_zero_6 bits and/or similar syntax elements may be used for dependency_id or similar, while another certain number of bits among reserved_one_5 bits, reserved_zero_6 bits and/or similar syntax elements may be used for quality_id or similar. Alternatively, a mapping of LayerId values or similar to values of variables or syntax elements describing different scalability dimensions may be provided for example in a Video Parameter Set, a Sequence Parameter Set or another syntax structure.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In a draft HEVC standard, coded slice NAL units contain syntax elements representing one or more CU.

In H.264/AVC a coded slice NAL unit can be indicated to be a coded slice in an Instantaneous Decoding Refresh (IDR) picture or coded slice in a non-IDR picture.

In a draft HEVC standard, a coded slice NAL unit can be indicated to be one of the following types.

| nal_unit_type | Name of nal_unit_type | Content of NAL unit and RBSP syntax structure |
|---|---|---|
| 1, 2 | TRAIL_R, TRAIL_N | Coded slice of a non-TSA, non-STSA trailing picture slice_layer_rbsp( ) |
| 3, 4 | TSA_R, TSA_N | Coded slice of a TSA picture slice_layer_rbsp( ) |
| 5, 6 | STSA_R, STSA_N | Coded slice of an STSA picture slice_layer_rbsp( ) |
| 7, 8, 9 | BLA_W_TFD BLA_W_DLP BLA_N_LP | Coded slice of a BLA picture slice_layer_rbsp( ) |
| 10, 11 | IDR_W_LP IDR_N_LP | Coded slice of an IDR picture slice_layer_rbsp( ) |
| 12 | CRA_NUT | Coded slice of a CRA picture slice_layer_rbsp( ) |
| 13 | DLP_NUT | Coded slice of a DLP picture slice_layer_rbsp( ) |
| 14 | TFD_NUT | Coded slice of a TFD picture slice_layer_rbsp( ) |

In a draft HEVC standard, abbreviations for picture types may be defined as follows: Broken Link Access (BLA), Clean Random Access (CRA), Decodable Leading Picture (DLP), Instantaneous Decoding Refresh (IDR), Random Access Point (RAP), Step-wise Temporal Sub-layer Access (STSA), Tagged For Discard (TFD), Temporal Sub-layer Access (TSA). A BLA picture having nal_unit_type equal to BLA_W_TFD is allowed to have associated TFD pictures present in the bitstream. A BLA picture having nal_unit_type equal to BLA_W_DLP does not have associated TFD pictures present in the bitstream, but may have associated DLP pictures in the bitstream. A BLA picture having nal_unit_type equal to BLA_N_LP does not have associated leading pictures present in the bitstream. An IDR picture having nal_unit_type equal to IDR_N_LP does not have associated leading pictures present in the bitstream. An IDR picture having nal_unit_type equal to IDR_W_LP does not have associated TFD pictures present in the bitstream, but may have associated DLP pictures in the bitstream. When the value of nal_unit_type is equal to TRAIL_N, TSA_N or STSA_N, the decoded picture is not used as a reference for any other picture of the same temporal sub-layer. That is, in a draft HEVC standard, when the value of nal_unit_type is equal to TRAIL_N, TSA_N or STSA_N, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N or STSA_N may be discarded without affecting the decodability of other pictures with the same value of TemporalId. In the table above, RAP pictures are those having nal_unit_type within the range of 7 to 12, inclusive. Each picture, other than the first picture in the bitstream, is considered to be associated with the previous RAP picture in decoding order. A leading picture may be defined as a picture that precedes the associated RAP picture in output order. Any picture that is a leading picture has nal_unit_type equal to DLP_NUT or TFD_NUT. A trailing picture may be defined as a picture that follows the associated RAP picture in output order. Any picture that is a trailing picture does not have nal_unit_type equal to DLP_NUT or TFD_NUT. Any picture that is a leading picture may be constrained to precede, in decoding order, all trailing pictures that are associated with the same RAP picture. No TFD pictures are present in the bitstream that are associated with a BLA picture having nal_unit_type equal to BLA_W_DLP or BLA_N_LP. No DLP pictures are present in the bitstream that are associated with a BLA picture having nal_unit_type equal to BLA_N_LP or that are associated with an IDR picture having nal_unit_type equal to IDR_N_LP. Any TFD picture associated with a CRA or BLA picture may be constrained to precede any DLP picture associated with the CRA or BLA picture in output order. Any TFD picture associated with a CRA picture may be constrained to follow, in output order, any other RAP picture that precedes the CRA picture in decoding order.

Another means of describing picture types of a draft HEVC standard is provided next. As illustrated in the table below, picture types can be classified into the following groups in HEVC: a) random access point (RAP) pictures, b) leading pictures, c) sub-layer access pictures, and d) pictures that do not fall into the three mentioned groups. The picture types and their sub-types as described in the table below are identified by the NAL unit type in HEVC. RAP picture types include IDR picture, BLA picture, and CRA picture, and can further be characterized based on the leading pictures associated with them as indicated in the table below.

| a) Random access point pictures | | |
|---|---|---|
| IDR | Instantaneous decoding refresh | without associated leading pictures may have associated leading pictures |
| BLA | Broken link access | without associated leading pictures may have associated DLP pictures but without associated TFD pictures may have associated DLP and TFD pictures |
| CRA | Clean random access | may have associated leading pictures |
| b) Leading pictures | | |
| DLP | Decodable leading picture | |
| TFD | Tagged for discard | |
| c) Temporal sub-layer access pictures | | |
| TSA | Temporal sub-layer access | not used for reference in the same sub-layer may be used for reference in the same sub-layer |
| STSA | Step-wise temporal sub-layer access | not used for reference in the same sub-layer may be used for reference in the same sub-layer |
| d) Picture that is not RAP, leading or temporal sub-layer access picture | | |
| | | not used for reference in the same sub-layer may be used for reference in the same sub-layer |

CRA pictures in HEVC allows pictures that follow the CRA picture in decoding order but precede it in output order to use pictures decoded before the CRA picture as a reference and still allow similar clean random access functionality as an IDR picture. Pictures that follow a CRA picture in both decoding and output order are decodable if random access is performed at the CRA picture, and hence clean random access is achieved.

Leading pictures of a CRA picture that do not refer to any picture preceding the CRA picture in decoding order can be correctly decoded when the decoding starts from the CRA picture and are therefore DLP pictures. In contrast, a TFD picture cannot be correctly decoded when decoding starts from a CRA picture associated with the TFD picture (while the TFD picture could be correctly decoded if the decoding had started from a RAP picture before the current CRA picture). Hence, TFD pictures associated with a CRA may be discarded when the decoding starts from the CRA picture.

When a part of a bitstream starting from a CRA picture is included in another bitstream, the TFD pictures associated with the CRA picture cannot be decoded, because some of their reference pictures are not present in the combined bitstream. To make such splicing operation straightforward, the NAL unit type of the CRA picture can be changed to indicate that it is a BLA picture. The TFD pictures associated with a BLA picture may not be correctly decodable hence should not be output/displayed. The TFD pictures associated with a BLA picture may be omitted from decoding.

In HEVC there are two picture types, the TSA and STSA picture types, that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit (having NAL unit type equal to 7) containing all the data for H.264/AVC VCL NAL units in the sequence, the sequence parameter set extension NAL unit containing the data for auxiliary coded pictures, and the subset sequence parameter set for MVC and SVC VCL NAL units. The syntax structure included in the sequence parameter set NAL unit of H.264/AVC (having NAL unit type equal to 7) may be referred to as sequence parameter set data, seq_parameter_set_data, or base SPS data. For example, profile, level, the picture size and the chroma sampling format may be included in the base SPS data. A picture parameter set contains such parameters that are likely to be unchanged in several coded pictures.

In a draft HEVC, there is also another type of a parameter set, here referred to as an Adaptation Parameter Set (APS), which includes parameters that are likely to be unchanged in several coded slices but may change for example for each picture or each few pictures. In a draft HEVC, the APS syntax structure includes parameters or syntax elements related to quantization matrices (QM), adaptive sample offset (SAO), adaptive loop filtering (ALF), and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS.

A draft HEVC standard also includes yet another type of a parameter set, called a video parameter set (VPS), which was proposed for example in document JCTVC-H0388 (http://phenix.int-evry.fr/jct/doc_end_user/documents/8_San%20Jose/wg11/JCTVC-H0388-v4.zip). A video parameter set RBSP may include parameters that can be referred to by one or more sequence parameter set RBSPs.

The relationship and hierarchy between VPS, SPS, and PPS may be described as follows. VPS resides one level above SPS in the parameter set hierarchy and in the context of scalability and/or 3DV. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain TemporalId values) of a layer representation.

H.264/AVC and HEVC syntax allows many instances of parameter sets, and each instance is identified with a unique identifier. In order to limit the memory usage needed for parameter sets, the value range for parameter set identifiers has been limited. In H.264/AVC and a draft HEVC standard, each slice header includes the identifier of the picture parameter set that is active for the decoding of the picture that contains the slice, and each picture parameter set contains the identifier of the active sequence parameter set.

In a HEVC standard, a slice header additionally contains an APS identifier. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message. In the following, non-limiting examples of activation of parameter sets in a draft HEVC standard are given.

Each adaptation parameter set RB SP is initially considered not active at the start of the operation of the decoding process. At most one adaptation parameter set RBSP is considered active at any given moment during the operation of the decoding process, and the activation of any particular adaptation parameter set RBSP results in the deactivation of the previously-active adaptation parameter set RBSP (if any).

When an adaptation parameter set RBSP (with a particular value of aps_id) is not active and it is referred to by a coded slice NAL unit (using that value of aps_id), it is activated. This adaptation parameter set RBSP is called the active adaptation parameter set RBSP until it is deactivated by the activation of another adaptation parameter set RBSP. An adaptation parameter set RBSP, with that particular value of aps_id, is available to the decoding process prior to its activation, included in at least one access unit with temporal_id equal to or less than the temporal_id of the adaptation parameter set NAL unit, unless the adaptation parameter set is provided through external means.

Each picture parameter set RB SP is initially considered not active at the start of the operation of the decoding process. At most one picture parameter set RBSP is considered active at any given moment during the operation of the decoding process, and the activation of any particular picture parameter set RBSP results in the deactivation of the previously-active picture parameter set RBSP (if any).

When a picture parameter set RBSP (with a particular value of pic_parameter_set_id) is not active and it is referred to by a coded slice NAL unit or coded slice data partition A NAL unit (using that value of pic_parameter_set_id), it is activated. This picture parameter set RBSP is called the active picture parameter set RBSP until it is deactivated by the activation of another picture parameter set RBSP. A picture parameter set RBSP, with that particular value of pic_parameter_set_id, is available to the decoding process prior to its activation, included in at least one access unit with temporal_id equal to or less than the temporal_id of the picture parameter set NAL unit, unless the picture parameter set is provided through external means.

Each sequence parameter set RB SP is initially considered not active at the start of the operation of the decoding process. At most one sequence parameter set RBSP is considered active at any given moment during the operation of the decoding process, and the activation of any particular sequence parameter set RBSP results in the deactivation of the previously-active sequence parameter set RBSP (if any).

When a sequence parameter set RBSP (with a particular value of seq_parameter_set_id) is not already active and it is referred to by activation of a picture parameter set RBSP (using that value of seq_parameter_set_id) or is referred to by an SEI NAL unit containing a buffering period SEI message (using that value of seq_parameter_set_id), it is activated. This sequence parameter set RBSP is called the active sequence parameter set RBSP until it is deactivated by the activation of another sequence parameter set RBSP. A sequence parameter set RBSP, with that particular value of seq_parameter_set_id is available to the decoding process prior to its activation, included in at least one access unit with temporal_id equal to 0, unless the sequence parameter set is provided through external means. An activated sequence parameter set RBSP remains active for the entire coded video sequence.

Each video parameter set RBSP is initially considered not active at the start of the operation of the decoding process. At most one video parameter set RBSP is considered active at any given moment during the operation of the decoding process, and the activation of any particular video parameter set RBSP results in the deactivation of the previously-active video parameter set RBSP (if any).

When a video parameter set RB SP (with a particular value of video_parameter_set_id) is not already active and it is referred to by activation of a sequence parameter set RBSP (using that value of video_parameter_set_id), it is activated. This video parameter set RBSP is called the active video parameter set RBSP until it is deactivated by the activation of another video parameter set RBSP. A video parameter set RBSP, with that particular value of video_parameter_set_id is available to the decoding process prior to its activation, included in at least one access unit with temporal_id equal to 0, unless the video parameter set is provided through external means. An activated video parameter set RBSP remains active for the entire coded video sequence.

During operation of the decoding process in a draft HEVC standard, the values of parameters of the active video parameter set, the active sequence parameter set, the active picture parameter set RBSP and the active adaptation parameter set RBSP are considered in effect. For interpretation of SEI messages, the values of the active video parameter set, the active sequence parameter set, the active picture parameter set RBSP and the active adaptation parameter set RBSP for the operation of the decoding process for the VCL NAL units of the coded picture in the same access unit are considered in effect unless otherwise specified in the SEI message semantics.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC and HEVC, an access unit comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In H.264/AVC, a coded video sequence is defined to be a sequence of consecutive access units in decoding order from an IDR access unit, inclusive, to the next IDR access unit, exclusive, or to the end of the bitstream, whichever appears earlier. In a draft HEVC standard, a coded video sequence is defined to be a sequence of access units that consists, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. In HEVC a closed GOP may also start from a BLA_W_DLP or a BLA_N_LP picture. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. The relative decoding order of the pictures is illustrated by the numerals inside the pictures. Any picture in the previous SOP has a smaller decoding order than any picture in the current SOP and any picture in the next SOP has a larger decoding order than any picture in the current SOP. The term group of pictures (GOP) may sometimes be used interchangeably with the term SOP and having the same semantics as the semantics of SOP rather than the semantics of closed or open GOP as described above.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC. In H.264/AVC, the NAL unit header indicates the type of the NAL unit and whether a coded slice contained in the NAL unit is a part of a reference picture or a non-reference picture.

Many hybrid video codecs, including H.264/AVC and HEVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may also be referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

In many video codecs, including H.264/AVC and HEVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). H.264/AVC and HEVC, as many other video compression standards, divide a picture into a mesh of rectangles, for each of which a similar block in one of the reference pictures is indicated for inter prediction. The location of the prediction block is coded as a motion vector that indicates the position of the prediction block relative to the block being coded.

Inter prediction process may be characterized for example using one or more of the following factors.

The Accuracy of Motion Vector Representation.

For example, motion vectors may be of quarter-pixel accuracy, half-pixel accuracy or full-pixel accuracy and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated prediction in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on a block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion Vector Prediction.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P slices may be uni-predicted or intra-predicted. The reference pictures for a bi-predictive picture may not be limited to be the subsequent picture and the previous picture in output order, but rather any reference pictures may be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to prediction from a reference picture in reference picture list 0, and prediction in backward direction may refer to prediction from a reference picture in reference picture list 1, even though the reference pictures for prediction may have any decoding or output order relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts, while in explicit weighted prediction, prediction weights are explicitly indicated.

In many video codecs, the prediction residual after motion compensation is first transformed with a transform kernel (like DCT) and then coded. The reason for this is that often there still exists some correlation among the residual and transform can in many cases help reduce this correlation and provide more efficient coding.

In a draft HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the TU (including e.g. DCT coefficient information). It may be signalled at CU level whether prediction error coding is applied or not for each CU. In the case there is no prediction error residual associated with the CU, it can be considered there are no TUs for the CU.

In some coding formats and codecs, a distinction is made between so-called short-term and long-term reference pictures. This distinction may affect some decoding processes such as motion vector scaling in the temporal direct mode or implicit weighted prediction. If both of the reference pictures used for the temporal direct mode are short-term reference pictures, the motion vector used in the prediction may be scaled according to the picture order count (POC)

difference between the current picture and each of the reference pictures. However, if at least one reference picture for the temporal direct mode is a long-term reference picture, default scaling of the motion vector may be used, for example scaling the motion to half may be used. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, a default prediction weight may be used, such as 0.5 in implicit weighted prediction for bi-predicted blocks.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC standard, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In a draft HEVC standard, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in a draft HEVC standard, a combined list (List C) is constructed after the final reference picture lists (List 0 and List 1) have been constructed. The combined list may be used for uni-prediction (also known as uni-directional prediction) within B slices.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. The RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

The combined list in a draft HEVC standard may be constructed as follows. If the modification flag for the combined list is zero, the combined list is constructed by an implicit mechanism; otherwise it is constructed by reference picture combination commands included in the bitstream. In the implicit mechanism, reference pictures in List C are mapped to reference pictures from List 0 and List 1 in an interleaved fashion starting from the first entry of List 0, followed by the first entry of List 1 and so forth. Any reference picture that has already been mapped in List C is not mapped again. In the explicit mechanism, the number of entries in List C is signaled, followed by the mapping from an entry in List 0 or List 1 to each entry of List C. In addition, when List 0 and List 1 are identical the encoder has the option of setting the ref_pic_list_combination_flag to 0 to indicate that no reference pictures from List 1 are mapped, and that List C is equivalent to List 0.

Many high efficiency video codecs such as a draft HEVC codec employ an additional motion information coding/decoding mechanism, often called merging/merge mode/process/mechanism, where all the motion information of a block/PU is predicted and used without any modification/correction. The aforementioned motion information for a PU may comprise 1) The information whether 'the PU is uni-predicted using only reference picture list0' or 'the PU is uni-predicted using only reference picture list 1' or 'the PU is bi-predicted using both reference picture list0 and list 1'; 2) Motion vector value corresponding to the reference picture list0; 3) Reference picture index in the reference picture list0; 4) Motion vector value corresponding to the reference picture list 1; and 5) Reference picture index in the reference picture list 1. Similarly, predicting the motion information is carried out using the motion information of adjacent blocks and/or co-located blocks in temporal reference pictures. A list, often called as a merge list, may be constructed by including motion prediction candidates associated with available adjacent/co-located blocks and the index of selected motion prediction candidate in the list is signalled and the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism may also be employed for individual PUs (not necessarily the whole CU as in skip mode) and in this case, prediction residual may be utilized to improve prediction quality. This type of prediction mode is typically named as an inter-merge mode.

There may be a reference picture lists combination syntax structure, created into the bitstream by an encoder and decoded from the bitstream by a decoder, which indicates the contents of a combined reference picture list. The syntax structure may indicate that the reference picture list 0 and the reference picture list 1 are combined to be an additional reference picture lists combination used for the prediction units being uni-directional predicted. The syntax structure may include a flag which, when equal to a certain value, indicates that the reference picture list 0 and the reference picture list 1 are identical thus the reference picture list 0 is used as the reference picture lists combination. The syntax structure may include a list of entries, each specifying a reference picture list (list 0 or list 1) and a reference index to the specified list, where an entry specifies a reference picture to be included in the combined reference picture list.

A syntax structure for decoded reference picture marking may exist in a video coding system. For example, when the decoding of the picture has been completed, the decoded reference picture marking syntax structure, if present, may be used to adaptively mark pictures as "unused for reference" or "used for long-term reference". If the decoded reference picture marking syntax structure is not present and the number of pictures marked as "used for reference" can no longer increase, a sliding window reference picture marking may be used, which basically marks the earliest (in decoding order) decoded reference picture as unused for reference.

A coding technique known as isolated regions is based on constraining in-picture prediction and inter prediction jointly. An isolated region in a picture can contain any macroblock (or alike) locations, and a picture can contain zero or more isolated regions that do not overlap. A leftover region, if any, is the area of the picture that is not covered by any isolated region of a picture. When coding an isolated region, at least some types of in-picture prediction is disabled across its boundaries. A leftover region may be predicted from isolated regions of the same picture.

A coded isolated region can be decoded without the presence of any other isolated or leftover region of the same coded picture. It may be necessary to decode all isolated regions of a picture before the leftover region. In some implementations, an isolated region or a leftover region contains at least one slice.

Pictures, whose isolated regions are predicted from each other, may be grouped into an isolated-region picture group. An isolated region can be inter-predicted from the corresponding isolated region in other pictures within the same isolated-region picture group, whereas inter prediction from other isolated regions or outside the isolated-region picture group may be disallowed. A leftover region may be inter-predicted from any isolated region. The shape, location, and size of coupled isolated regions may evolve from picture to picture in an isolated-region picture group.

Coding of isolated regions in the H.264/AVC codec may be based on slice groups. The mapping of macroblock locations to slice groups may be specified in the picture parameter set. The H.264/AVC syntax includes syntax to code certain slice group patterns, which can be categorized into two types, static and evolving. The static slice groups stay unchanged as long as the picture parameter set is valid, whereas the evolving slice groups can change picture by picture according to the corresponding parameters in the picture parameter set and a slice group change cycle parameter in the slice header. The static slice group patterns include interleaved, checkerboard, rectangular oriented, and freeform. The evolving slice group patterns include horizontal wipe, vertical wipe, box-in, and box-out. The rectangular oriented pattern and the evolving patterns are especially suited for coding of isolated regions and are described more carefully in the following.

For a rectangular oriented slice group pattern, a desired number of rectangles are specified within the picture area. A foreground slice group includes the macroblock locations that are within the corresponding rectangle but excludes the macroblock locations that are already allocated by slice groups specified earlier. A leftover slice group contains the macroblocks that are not covered by the foreground slice groups.

An evolving slice group is specified by indicating the scan order of macroblock locations and the change rate of the size of the slice group in number of macroblocks per picture. Each coded picture is associated with a slice group change cycle parameter (conveyed in the slice header). The change cycle multiplied by the change rate indicates the number of macroblocks in the first slice group. The second slice group contains the rest of the macroblock locations.

In H.264/AVC in-picture prediction is disabled across slice group boundaries, because slice group boundaries lie in slice boundaries. Therefore each slice group is an isolated region or leftover region.

Each slice group has an identification number within a picture. Encoders can restrict the motion vectors in a way that they only refer to the decoded macroblocks belonging to slice groups having the same identification number as the slice group to be encoded. Encoders should take into account the fact that a range of source samples is needed in fractional pixel interpolation and all the source samples should be within a particular slice group.

The H.264/AVC codec includes a deblocking loop filter. Loop filtering is applied to each 4×4 block boundary, but loop filtering can be turned off by the encoder at slice boundaries. If loop filtering is turned off at slice boundaries, perfect reconstructed pictures at the decoder can be achieved when performing gradual random access. Otherwise, reconstructed pictures may be imperfect in content even after the recovery point.

The recovery point SEI message and the motion constrained slice group set SEI message of the H.264/AVC standard can be used to indicate that some slice groups are coded as isolated regions with restricted motion vectors. Decoders may utilize the information for example to achieve faster random access or to save in processing time by ignoring the leftover region.

A sub-picture concept has been proposed for HEVC e.g. in document JCTVC-I0356<http://phenix.int-evry.fr/jct/doc_end_user/documents/9_Geneva/wg11/JCTVC-I0356-v1.zip>, which is similar to rectangular isolated regions or rectangular motion-constrained slice group sets of H.264/AVC. The sub-picture concept proposed in JCTVC-I0356 is described in the following, while it should be understood that sub-pictures may be defined otherwise similarly but not identically to what is described below. In the sub-picture concept, the picture is partitioned into predefined rectangular regions. Each sub-picture would be processed as an independent picture except that all sub-pictures constituting a picture share the same global information such as SPS, PPS and reference picture sets. Sub-pictures are similar to tiles geometrically. Their properties are as follows: They are LCU-aligned rectangular regions specified at sequence level. Sub-pictures in a picture may be scanned in sub-picture raster scan of the picture. Each sub-picture starts a new slice. If multiple tiles are present in a picture, sub-picture boundaries and tiles boundaries may be aligned. There may be no loop filtering across sub-pictures. There may be no prediction of sample value and motion info outside the sub-picture, and no sample value at a fractional sample position that is derived using one or more sample values outside the sub-picture may be used to inter predict any sample within the sub-picture. If motion vectors point to regions outside of a sub-picture, a padding process defined for picture boundaries may be applied. LCUs are scanned in raster order within sub-pictures unless a sub-picture contains more than one tile. Tiles within a sub-picture are scanned in tile raster scan of the sub-picture. Tiles cannot cross sub-picture boundaries except for the default one tile per picture case. All coding mechanisms that are available at picture level are supported at sub-picture level.

Scalable video coding refers to a coding structure where one bitstream can contain multiple representations of the content at different bitrates, resolutions and/or frame rates. In these cases the receiver can extract the desired representation depending on its characteristics (e.g. resolution that matches best with the resolution of the display of the device). Alternatively, a server or a network element can extract the portions of the bitstream to be transmitted to the receiver depending on e.g. the network characteristics or processing capabilities of the receiver.

A scalable bitstream may consist of a base layer providing the lowest quality video available and one or more enhancement layers that enhance the video quality when received and decoded together with the lower layers. An enhancement layer may enhance the temporal resolution (i.e., the frame rate), the spatial resolution, or simply the quality of the video content represented by another layer or part thereof. In order to improve coding efficiency for the enhancement layers, the coded representation of that layer may depend on the lower layers. For example, the motion and mode information of the enhancement layer can be predicted from lower layers. Similarly the pixel data of the lower layers can be used to create prediction for the enhancement layer(s).

Each scalable layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS). FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

SVC specifies a concept known as single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer. A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

The scalability structure in the SVC draft is characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL-1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVCV standard is that MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_ref_active_1x_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref_base_pic_flag" is equal to 1) or only decoded pictures not marked as "base representation" (when "use_ref_base_pic_flag" is equal to 0), but never both at the same time.

In an H.264/AVC bit stream, coded pictures in one coded video sequence uses the same sequence parameter set, and at any time instance during the decoding process, only one sequence parameter set is active. In SVC, coded pictures from different scalable layers may use different sequence parameter sets. If different sequence parameter sets are used, then, at any time instant during the decoding process, there may be more than one active sequence picture parameter set. In the SVC specification, the one for the top layer is denoted as the active sequence picture parameter set, while the rest are referred to as layer active sequence picture parameter sets. Any given active sequence parameter set remains unchanged throughout a coded video sequence in the layer in which the active sequence parameter set is referred to.

A scalable nesting SEI message has been specified in SVC. The scalable nesting SEI message provides a mechanism for associating SEI messages with subsets of a bitstream, such as indicated dependency representations or other scalable layers. A scalable nesting SEI message contains one or more SEI messages that are not scalable nesting SEI messages themselves. An SEI message contained in a scalable nesting SEI message is referred to as a nested SEI message. An SEI message not contained in a scalable nesting SEI message is referred to as a non-nested SEI message.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

Frame packing refers to a method where more than one frame is packed into a single frame at the encoder side as a pre-processing step for encoding and then the frame-packed frames are encoded with a conventional 2D video coding scheme. The output frames produced by the decoder therefore contain constituent frames of that correspond to the input frames spatially packed into one frame in the encoder side. Frame packing may be used for stereoscopic video, where a pair of frames, one corresponding to the left eye/camera/view and the other corresponding to the right eye/camera/view, is packed into a single frame. Frame packing may also or alternatively be used for depth or disparity enhanced video, where one of the constituent frames represents depth or disparity information corresponding to another constituent frame containing the regular color information (luma and chroma information). The use of frame-packing may be signaled in the video bitstream, for example using the frame packing arrangement SEI message of H.264/AVC or similar. The use of frame-packing may also or alternatively be indicated over video interfaces, such as High-Definition Multimedia Interface (HDMI). The use of frame-packing may also or alternatively be indicated and/or negotiated using various capability exchange and mode negotiation protocols, such as Session Description Protocol (SDP). The decoder or renderer may extract the constituent frames from the decoded frames according to the indicated frame packing arrangement type.

In general, frame packing may for example be applied such a manner that a frame may contain constituent frames of more than two views and/or some or all constituent frames may have unequal spatial extents and/or constituent frames may be depth view components. For example, pictures of frame-packed video may contain a video-plus-depth representation, i.e. a texture frame and a depth frame, for example in a side-by-side frame packing arrangement.

Characteristics, coding properties, and alike that apply only to a subset of constituent frames in frame-packed video may be indicated for example through a specific nesting SEI message. Such a nesting SEI message may indicate which constituent frames it applies to and include one or more SEI messages that apply to the indicated constituent frames. For example, a motion-constrained tile set SEI message may indicate a set of tile indexes or addresses alike within an indicated or inferred group of pictures, such as within the coded video sequence, that form an isolated-region picture group.

As indicated earlier, MVC is an extension of H.264/AVC. Many of the definitions, concepts, syntax structures, semantics, and decoding processes of H.264/AVC apply also to MVC as such or with certain generalizations or constraints. Some definitions, concepts, syntax structures, semantics, and decoding processes of MVC are described in the following.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit results in one decoded picture consisting of one or more decoded view components, when decoding errors, bitstream errors or other errors which may affect the decoding do not occur. In other words, an access unit in MVC contains the view components of the views for one output time instance.

A view component in MVC is referred to as a coded representation of a view in a single access unit.

Inter-view prediction may be used in MVC and refers to prediction of a view component from decoded samples of different view components of the same access unit. In MVC, inter-view prediction is realized similarly to inter prediction. For example, inter-view reference pictures are placed in the same reference picture list(s) as reference pictures for inter prediction, and a reference index as well as a motion vector are coded or inferred similarly for inter-view and inter reference pictures.

An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

As mentioned earlier, non-base views of MVC bitstreams may refer to a subset sequence parameter set NAL unit. A subset sequence parameter set for MVC includes a base SPS data structure and an sequence parameter set MVC extension data structure. In MVC, coded pictures from different views may use different sequence parameter sets. An SPS in MVC (specifically the sequence parameter set MVC extension part of the SPS in MVC) can contain the view dependency information for inter-view prediction. This may be used for example by signaling-aware media gateways to construct the view dependency tree.

In the context of multiview video coding, view order index may be defined as an index that indicates the decoding or bitstream order of view components in an access unit. In MVC, the inter-view dependency relationships are indicated in a sequence parameter set MVC extension, which is included in a sequence parameter set. According to the MVC standard, all sequence parameter set MVC extensions that are referred to by a coded video sequence are required to be identical. The following excerpt of the sequence parameter set MVC extension provides further details on the way inter-view dependency relationships are indicated in MVC.

| seq_parameter_set_mvc_extension( ) { | C | Descriptor |
|---|---|---|
| num_views_minus1 | 0 | ue(v) |
| for( i = 0; i <= num_views_minus1; i++ ) | | |
|   view_id[ i ] | 0 | ue(v) |
| for( i = 1; i <= num_views_minus1; i++ ) { | | |
|   num_anchor_refs_l0[ i ] | 0 | ue(v) |
|   for( j = 0; j < num_anchor_refs_l0[ i ]; j++ ) | | |
|     anchor_ref_l0[ i ][ j ] | 0 | ue(v) |
|   num_anchor_refs_l1[ i ] | 0 | ue(v) |
|   for( j = 0; j < num_anchor_refs_l1[ i ]; j++ ) | | |
|     anchor_ref_l1[ i ][ j ] | 0 | ue(v) |
| } | | |
| for( i = 1; i <= num_views_minus1; i++ ) { | | |
|   num_non_anchor_refs_l0[ i ] | 0 | ue(v) |
|   for( j = 0; j < num_non_anchor_refs_l0[ i ]; j++ ) | | |

| | | De- |
| --- | --- | --- |
| | | scrip- |
| seq_parameter_set_mvc_extension( ) { | C | tor |
|     non_anchor_ref_l0[ i ][ j ] | 0 | ue(v) |
|     num_non_anchor_refs_l1[ i ] | 0 | ue(v) |
|     for( j = 0; j < num_non_anchor_refs_l1[ i ]; j++ ) | | |
|         non_anchor_ref_l1[ i ][ j ] | 0 | ue(v) |
| } | | |
| ... | | |

In MVC decoding process, the variable VOIdx may represent the view order index of the view identified by view_id (which may be obtained from the MVC NAL unit header of the coded slice being decoded) and may be set equal to the value of i for which the syntax element view_id[i] included in the referred subset sequence parameter set is equal to view_id.

The semantics of the sequence parameter set MVC extension may be specified as follows. num_views_minus1 plus1 specifies the maximum number of coded views in the coded video sequence. The actual number of views in the coded video sequence may be less than num_views_minus1 plus1. view_id[i] specifies the view_id of the view with VOIdx equal to i. num_anchor_refs_l0[i] specifies the number of view components for inter-view prediction in the initial reference picture list RefPicList0 in decoding anchor view components with VOIdx equal to i. anchor_ref_l0[i][j] specifies the view_id of the j-th view component for inter-view prediction in the initial reference picture list RefPicList0 in decoding anchor view components with VOIdx equal to i. num_anchor_refs_l1[i] specifies the number of view components for inter-view prediction in the initial reference picture list RefPicList1 in decoding anchor view components with VOIdx equal to i. anchor_ref_l1[i][j] specifies the view_id of the j-th view component for inter-view prediction in the initial reference picture list RefPicList1 in decoding an anchor view component with VOIdx equal to i. num_non_anchor_refs_l0[i] specifies the number of view components for inter-view prediction in the initial reference picture list RefPicList0 in decoding non-anchor view components with VOIdx equal to i. non_anchor_ref_l0[i][j] specifies the view_id of the j-th view component for inter-view prediction in the initial reference picture list RefPicList0 in decoding non-anchor view components with VOIdx equal to i. num_non_anchor_refs_l1[i] specifies the number of view components for inter-view prediction in the initial reference picture list RefPicList1 in decoding non-anchor view components with VOIdx equal to i. non_anchor_ref_l1[i][j] specifies the view_id of the j-th view component for inter-view prediction in the initial reference picture list RefPicList1 in decoding non-anchor view components with VOIdx equal to i. For any particular view with view_id equal to vId1 and VOIdx equal to vOIdx1 and another view with view_id equal to vId2 and VOIdx equal to vOIdx2, when vId2 is equal to the value of one of non_anchor_ref_l0[vOIdx1][j] for all j in the range of 0 to num_non_anchor_refs_l0[vOIdx1], exclusive, or one of non_anchor_ref_l1[vOIdx1][j] for all j in the range of 0 to num_non_anchor_refs_l1[vOIdx1], exclusive, vId2 is also required to be equal to the value of one of anchor_ref_l0[vOIdx1][j] for all j in the range of 0 to num_anchor_refs_l0[vOIdx1], exclusive, or one of anchor_ref_l1[vOIdx1][j] for all j in the range of 0 to num_anchor_refs_l1[vOIdx1], exclusive. The inter-view dependency for non-anchor view components is a subset of that for anchor view components.

In MVC, an operation point may be defined as follows: An operation point is identified by a temporal_id value representing the target temporal level and a set of view_id values representing the target output views. One operation point is associated with a bitstream subset, which consists of the target output views and all other views the target output views depend on, that is derived using the sub-bitstream extraction process with tIdTarget equal to the temporal_id value and viewIdTargetList consisting of the set of view_id values as inputs. More than one operation point may be associated with the same bitstream subset. When "an operation point is decoded", a bitstream subset corresponding to the operation point may be decoded and subsequently the target output views may be output.

In scalable multiview coding, the same bitstream may contain coded view components of multiple views and at least some coded view components may be coded using quality and/or spatial scalability.

A texture view refers to a view that represents ordinary video content, for example has been captured using an ordinary camera, and is usually suitable for rendering on a display. A texture view typically comprises pictures having three components, one luma component and two chroma components. In the following, a texture picture typically comprises all its component pictures or color components unless otherwise indicated for example with terms luma texture picture and chroma texture picture.

A depth view refers to a view that represents distance information of a texture sample from the camera sensor, disparity or parallax information between a texture sample and a respective texture sample in another view, or similar information. A depth view may comprise depth pictures (a.k.a. depth maps) having one component, similar to the luma component of texture views. A depth map is an image with per-pixel depth information or similar. For example, each sample in a depth map represents the distance of the respective texture sample or samples from the plane on which the camera lies. In other words, if the z axis is along the shooting axis of the cameras (and hence orthogonal to the plane on which the cameras lie), a sample in a depth map represents the value on the z axis. The semantics of depth map values may for example include the following:

1. Each luma sample value in a coded depth view component represents an inverse of real-world distance (Z) value, i.e. 1/Z, normalized in the dynamic range of the luma samples, such to the range of 0 to 255, inclusive, for 8-bit luma representation. The normalization may be done in a manner where the quantization 1/Z is uniform in terms of disparity.
2. Each luma sample value in a coded depth view component represents an inverse of real-world distance (Z) value, i.e. 1/Z, which is mapped to the dynamic range of the luma samples, such to the range of 0 to 255, inclusive, for 8-bit luma representation, using a mapping function f(1/Z) or table, such as a piece-wise linear mapping. In other words, depth map values result in applying the function f(1/Z).
3. Each luma sample value in a coded depth view component represents a real-world distance (Z) value normalized in the dynamic range of the luma samples, such to the range of 0 to 255, inclusive, for 8-bit luma representation.
4. Each luma sample value in a coded depth view component represents a disparity or parallax value from the present depth view to another indicated or derived depth view or view position.

While phrases such as depth view, depth view component, depth picture and depth map are used to describe various embodiments, it is to be understood that any semantics of depth map values may be used in various embodiments including but not limited to the ones described above. For example, embodiments of the invention may be applied for depth pictures where sample values indicate disparity values.

An encoding system or any other entity creating or modifying a bitstream including coded depth maps may create and include information on the semantics of depth samples and on the quantization scheme of depth samples into the bitstream. Such information on the semantics of depth samples and on the quantization scheme of depth samples may be for example included in a video parameter set structure, in a sequence parameter set structure, or in an SEI message.

Depth-enhanced video refers to texture video having one or more views associated with depth video having one or more depth views. A number of approaches may be used for representing of depth-enhanced video, including the use of video plus depth (V+D), multiview video plus depth (MVD), and layered depth video (LDV). In the video plus depth (V+D) representation, a single view of texture and the respective view of depth are represented as sequences of texture picture and depth pictures, respectively. The MVD representation contains a number of texture views and respective depth views. In the LDV representation, the texture and depth of the central view are represented conventionally, while the texture and depth of the other views are partially represented and cover only the dis-occluded areas required for correct view synthesis of intermediate views.

A texture view component may be defined as a coded representation of the texture of a view in a single access unit. A texture view component in depth-enhanced video bitstream may be coded in a manner that is compatible with a single-view texture bitstream or a multi-view texture bitstream so that a single-view or multi-view decoder can decode the texture views even if it has no capability to decode depth views. For example, an H.264/AVC decoder may decode a single texture view from a depth-enhanced H.264/AVC bitstream. A texture view component may alternatively be coded in a manner that a decoder capable of single-view or multi-view texture decoding, such H.264/AVC or MVC decoder, is not able to decode the texture view component for example because it uses depth-based coding tools. A depth view component may be defined as a coded representation of the depth of a view in a single access unit. A view component pair may be defined as a texture view component and a depth view component of the same view within the same access unit.

Depth-enhanced video may be coded in a manner where texture and depth are coded independently of each other. For example, texture views may be coded as one MVC bitstream and depth views may be coded as another MVC bitstream. Depth-enhanced video may also be coded in a manner where texture and depth are jointly coded. In a form a joint coding of texture and depth views, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture. In another option, coded video data of texture and coded video data of depth are not predicted from each other or one is not coded/decoded on the basis of the other one, but coded texture and depth view may be multiplexed into the same bitstream in the encoding and demultiplexed from the bitstream in the decoding. In yet another option, while coded video data of texture is not predicted from coded video data of depth in e.g. below slice layer, some of the high-level coding structures of texture views and depth views may be shared or predicted from each other. For example, a slice header of coded depth slice may be predicted from a slice header of a coded texture slice. Moreover, some of the parameter sets may be used by both coded texture views and coded depth views.

It has been found that a solution for some multiview 3D video (3DV) applications is to have a limited number of input views, e.g. a mono or a stereo view plus some supplementary data, and to render (i.e. synthesize) all required views locally at the decoder side. From several available technologies for view rendering, depth image-based rendering (DIBR) has shown to be a competitive alternative.

Figure 5:
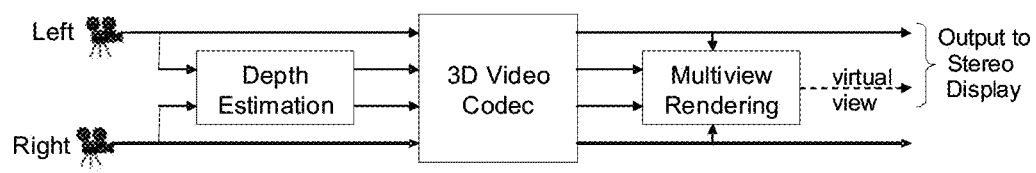
FIG. 5 shows a simplified model of a DIBR-based 3DV system.

A simplified model of a DIBR-based 3DV system is shown in FIG. 5. The input of a 3D video codec comprises a stereoscopic video and corresponding depth information with stereoscopic baseline b0. Then the 3D video codec synthesizes a number of virtual views between two input views with baseline (bi<b0). DIBR algorithms may also enable extrapolation of views that are outside the two input views and not in between them. Similarly, DIBR algorithms may enable view synthesis from a single view of texture and the respective depth view. However, in order to enable DIBR-based multiview rendering, texture data should be available at the decoder side along with the corresponding depth data.

In such 3DV system, depth information is produced at the encoder side in a form of depth pictures (also known as depth maps) for texture views.

Figure 6:
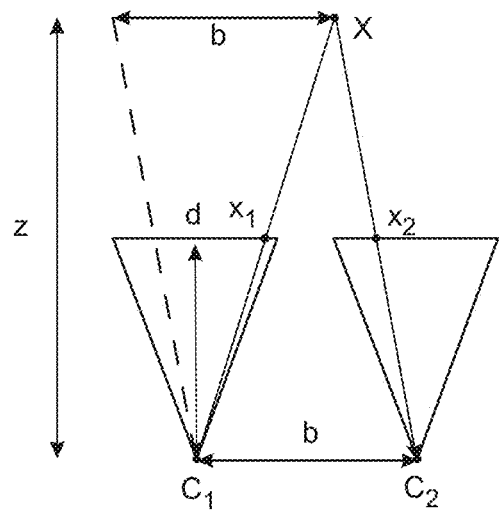
FIG. 6 shows a simplified 2D model of a stereoscopic camera setup.

Depth information can be obtained by various means. For example, depth of the 3D scene may be computed from the disparity registered by capturing cameras or color image sensors. A depth estimation approach, which may also be referred to as stereo matching, takes a stereoscopic view as an input and computes local disparities between the two offset images of the view. Since the two input views represent different viewpoints or perspectives, the parallax creates a disparity between the relative positions of scene points on the imaging planes depending on the distance of the points. A target of stereo matching is to extract those disparities by finding or detecting the corresponding points between the images. Several approaches for stereo matching exist. For example, in a block or template matching approach each image is processed pixel by pixel in overlapping blocks, and for each block of pixels a horizontally localized search for a matching block in the offset image is performed. Once a pixel-wise disparity is computed, the corresponding depth value z is calculated by equation (1):

$$z = \frac{f \cdot b}{d + \Delta d}, \qquad (1)$$

where f is the focal length of the camera and b is the baseline distance between cameras, as shown in FIG. 6. Further, d may be considered to refer to the disparity observed between the two cameras or the disparity estimated between corresponding pixels in the two cameras. The camera offset Δd may be considered to reflect a possible horizontal misplacement of the optical centers of the two cameras or a possible horizontal cropping in the camera frames due to pre-processing. However, since the algorithm is based on block matching, the quality of a depth-through-disparity estimation is content dependent and very often not accurate. For example, no straightforward solution for depth estimation is possible for image fragments that are featuring very smooth areas with no textures or large level of noise.

Alternatively or in addition to the above-described stereo view depth estimation, the depth value may be obtained using the time-of-flight (TOF) principle for example by using a camera which may be provided with a light source, for example an infrared emitter, for illuminating the scene. Such an illuminator may be arranged to produce an intensity modulated electromagnetic emission for a frequency between e.g. 10-100 MHz, which may require LEDs or laser diodes to be used. Infrared light may be used to make the illumination unobtrusive. The light reflected from objects in the scene is detected by an image sensor, which may be modulated synchronously at the same frequency as the illuminator. The image sensor may be provided with optics; a lens gathering the reflected light and an optical bandpass filter for passing only the light with the same wavelength as the illuminator, thus helping to suppress background light. The image sensor may measure for each pixel the time the light has taken to travel from the illuminator to the object and back. The distance to the object may be represented as a phase shift in the illumination modulation, which can be determined from the sampled data simultaneously for each pixel in the scene.

Alternatively or in addition to the above-described stereo view depth estimation and/or TOF-principle depth sensing, depth values may be obtained using a structured light approach which may operate for example approximately as follows. A light emitter, such as an infrared laser emitter or an infrared LED emitter, may emit light that may have a certain direction in a 3D space (e.g. follow a raster-scan or a pseudo-random scanning order) and/or position within an array of light emitters as well as a certain pattern, e.g. a certain wavelength and/or amplitude pattern. The emitted light is reflected back from objects and may be captured using a sensor, such as an infrared image sensor. The image/signals obtained by the sensor may be processed in relation to the direction of the emitted light as well as the pattern of the emitted light to detect a correspondence between the received signal and the direction/position of the emitted lighted as well as the pattern of the emitted light for example using a triangulation principle. From this correspondence a distance and a position of a pixel may be concluded.

It is to be understood that the above-described depth estimation and sensing methods are provided as non-limiting examples and embodiments may be realized with the described or any other depth estimation and sensing methods and apparatuses.

Disparity or parallax maps, such as parallax maps specified in ISO/IEC International Standard 23002-3, may be processed similarly to depth maps. Depth and disparity have a straightforward correspondence and they can be computed from each other through mathematical equation.

Texture views and depth views may be coded into a single bitstream where some of the texture views may be compatible with one or more video standards such as H.264/AVC and/or MVC. In other words, a decoder may be able to decode some of the texture views of such a bitstream and can omit the remaining texture views and depth views.

In this context an encoder that encodes one or more texture and depth views into a single H.264/AVC and/or MVC compatible bitstream is also called as a 3DV-ATM encoder. Bitstreams generated by such an encoder can be referred to as 3DV-ATM bitstreams. The 3DV-ATM bitstreams may include some of the texture views that H.264/AVC and/or MVC decoder cannot decode, and depth views. A decoder capable of decoding all views from 3DV-ATM bitstreams may also be called as a 3DV-ATM decoder.

3DV-ATM bitstreams can include a selected number of AVC/MVC compatible texture views. Furthermore, 3DV-ATM bitstream can include a selected number of depth views that are coded using the coding tools of the AVC/MVC standard only. The remaining depth views of an 3DV-ATM bitstream for the AVC/MVC compatible texture views may be predicted from the texture views and/or may use depth coding methods not included in the AVC/MVC standard presently. The remaining texture views may utilize enhanced texture coding, i.e. coding tools that are not included in the AVC/MVC standard presently.

Inter-component prediction may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

An example of syntax and semantics of a 3DV-ATM bitstream and a decoding process for a 3DV-ATM bitstream may be found in document MPEG N12544, "Working Draft 2 of MVC extension for inclusion of depth maps", which requires at least two texture views to be MVC compatible. Furthermore, depth views are coded using existing AVC/MVC coding tools. An example of syntax and semantics of a 3DV-ATM bitstream and a decoding process for a 3DV-ATM bitstream may be found in document MPEG N12545, "Working Draft 1 of AVC compatible video with depth information", which requires at least one texture view to be AVC compatible and further texture views may be MVC compatible. The bitstream formats and decoding processes specified in the mentioned documents are compatible as described in the following. The 3DV-ATM configuration corresponding to the working draft of "MVC extension for inclusion of depth maps" (MPEG N12544) may be referred to as "3D High" or "MVC+D" (standing for MVC plus depth). The 3DV-ATM configuration corresponding to the working draft of "AVC compatible video with depth information" (MPEG N12545) may be referred to as "3D Extended High" or "3D Enhanced High" or "3D-AVC". The 3D Extended High configuration is a superset of the 3D High configuration. That is, a decoder supporting 3D Extended High configuration should also be able to decode bitstreams generated for the 3D High configuration.

A later draft version of the MVC+D specification is available as MPEG document N12923 ("Text of ISO/IEC 14496-10:2012/DAM2 MVC extension for inclusion of depth maps"). A later draft version of the 3D-AVC specification is available as MPEG document N12732 ("Working Draft 2 of AVC compatible video with depth").

Figure 10:
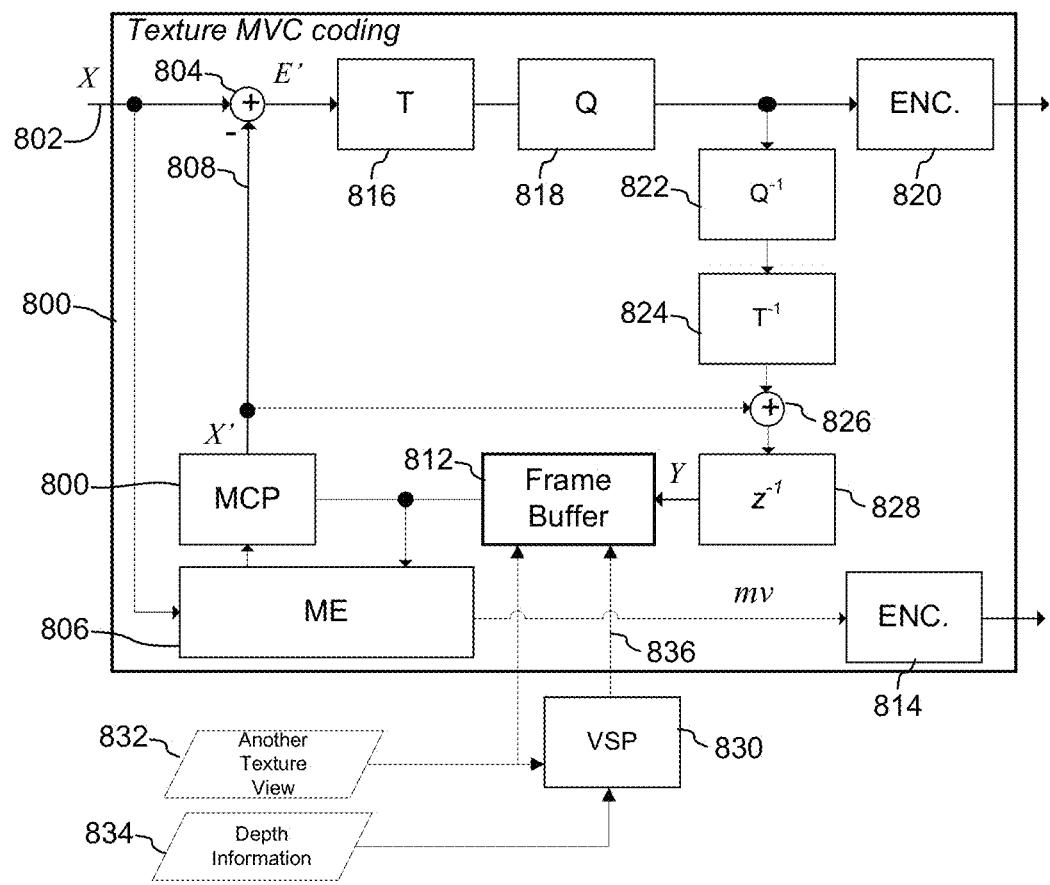
FIG. 10 shows an example processing flow for depth map coding within an encoder.

FIG. 10 shows an example processing flow for depth map coding for example in 3DV-ATM.

In some depth-enhanced video coding and bitstreams, such as MVC+D, depth views may refer to a differently structured sequence parameter set, such as a subset SPS NAL unit, than the sequence parameter set for texture views. For example, a sequence parameter set for depth views may include a sequence parameter set 3D video coding (3DVC) extension. When a different SPS structure is used for depth-enhanced video coding, the SPS may be referred to as a 3D video coding (3DVC) subset SPS or a 3DVC SPS, for example. From the syntax structure point of view, a 3DVC subset SPS may be a superset of an SPS for multiview video coding such as the MVC subset SPS.

A depth-enhanced multiview video bitstream, such as an MVC+D bitstream, may contain two types of operation points: multiview video operation points (e.g. MVC operation points for MVC+D bitstreams) and depth-enhanced operation points. Multiview video operation points consisting of texture view components only may be specified by an SPS for multiview video, for example a sequence parameter set MVC extension included in an SPS referred to by one or more texture views. Depth-enhanced operation points may be specified by an SPS for depth-enhanced video, for example a sequence parameter set MVC or 3DVC extension included in an SPS referred to by one or more depth views.

A depth-enhanced multiview video bitstream may contain or be associated with multiple sequence parameter sets, e.g. one for the base texture view, another one for the non-base texture views, and a third one for the depth views. For example, an MVC+D bitstream may contain one SPS NAL unit (with an SPS identifier equal to e.g. 0), one MVC subset SPS NAL unit (with an SPS identifier equal to e.g. 1), and one 3DVC subset SPS NAL unit (with an SPS identifier equal to e.g. 2). The first one is distinguished from the other two by NAL unit type, while the latter two have different profiles, i.e., one of them indicates an MVC profile and the other one indicates an MVC+D profile.

The coding and decoding order of texture view components and depth view components may be indicated for example in a sequence parameter set. For example, the following syntax of a sequence parameter set 3DVC extension is used in the draft 3D-AVC specification (MPEG N12732):

| seq_parameter_set_3dvc_extension( ) { | C | Descriptor |
|---|---|---|
| depth_info_present_flag | 0 | u(1) |
| if( depth_info_present_flag ) { | | |
| ... | | |
| for( i = 0; i<= num_views_minus1; i++ ) | | |
| depth_preceding_texture_flag[ i ] | 0 | u(1) |

The semantics of depth_preceding_texture_flag[i] may be specified as follows. depth_preceding_texture_flag[i] specifies the decoding order of depth view components in relation to texture view components. depth_preceding_texture_flag [i] equal to 1 indicates that the depth view component of the view with view_idx equal to i precedes the texture view component of the same view in decoding order in each access unit that contains both the texture and depth view components. depth_preceding_texture_flag[i] equal to 0 indicates that the texture view component of the view with view_idx equal to i precedes the depth view component of the same view in decoding order in each access unit that contains both the texture and depth view components.

A coded depth-enhanced video bitstream, such as an MVC+D bitstream or an AVC-3D bitstream, may be considered to include two types of operation points: texture video operation points, such as MVC operation points, and texture-plus-depth operation points including both texture views and depth views. An MVC operation point comprises texture view components as specified by the SPS MVC extension. A coded depth-enhanced video bitstream, such as an MVC+D bitstream or an AVC-3D bitstream, contains depth views, and therefore the whole bitstream as well as sub-bitstreams can provide so-called 3DVC operation points, which in the draft MVC+D and AVC-3D specifications contain both depth and texture for each target output view. In the draft MVC+D and AVC-3D specifications, the 3DVC operation points are defined in the 3DVC subset SPS by the same syntax structure as that used in the SPS MVC extension.

The coding and/or decoding order of texture view components and depth view components may determine presence of syntax elements related to inter-component prediction and allowed values of syntax elements related to inter-component prediction.

In the following some example coding and decoding methods which may be used in or with various embodiments of the invention are described. It needs to be understood that these coding and decoding methods are given as examples and embodiments of the invention may be applied with other similar coding methods and/or other coding methods utilizing inter-component redundancies or dependencies.

Depth maps may be filtered jointly for example using in-loop Joint inter-View Depth Filtering (JVDF) described as follows or a similar filtering process. The depth map of the currently processed view $V_c$ may be converted into the depth space (Z-space):

$$z = \frac{1}{\frac{v_1}{255} \cdot \left( \frac{1}{Z1_{near}} - \frac{1}{Z1_{far}} \right) + \frac{1}{Z1_{far}}}, \qquad (2)$$

Following this, depth map images of other available views ($V_{a1}$, $V_{a2}$) may be converted to the depth space and projected to the currently processed view $V_c$. These projections create several estimates of the depth value, which may be averaged in order to produce a denoised estimate of the depth value. Filtered depth value $\hat{z}_c$ of current view $V_c$ may be produced through a weighted average with depth estimate values $\hat{z}_{a \to c}$ projected from an available views $V_a$ to a currently processed view $V_c$.

$$\hat{z}_c = w_1 \cdot z_c + w_2 \cdot z_{a \to c}$$

where $\{w_1, w_2\}$ are weighting factors or filter coefficients for the depth values of different views or view projections.

Filtering may be applied if depth value estimates belong to a certain confidence interval, in other words, if the absolute difference between estimates is below a particular threshold (Th):

If $|z_{a \to c} - z_c| < Th$, $w_1 = w_2 = 0.5$
Otherwise, $w_1 = 1$, $w_2 = 0$ Parameter Th may be transmitted to the decoder for example within a sequence parameter set.

Figure 11:
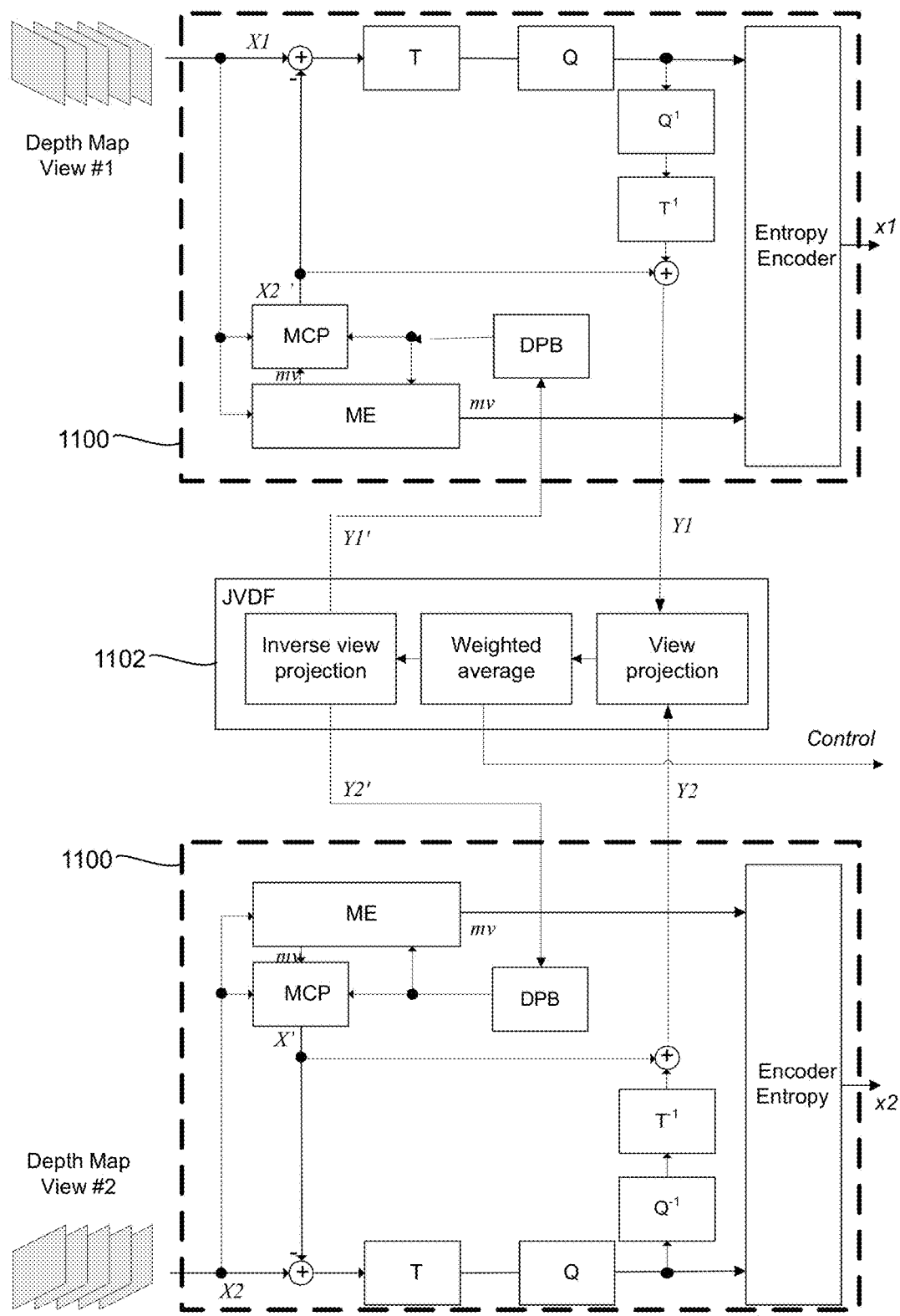
FIG. 11 shows an example of coding of two depth map views with in-loop implementation of an encoder.

FIG. 11 shows an example of the coding of two depth map views with in-loop implementation of JVDF. A conventional video coding algorithm, such as H.264/AVC, is depicted within a dashed line box 1100, marked in black color. The JVDF is depicted in the solid-line box 1102.

In a coding tool known as joint multiview video plus depth coding (JMVDC), the correlation between the multiview texture video and the associated depth view sequences is exploited. Although the pixel values are quite different between a texture video and its depth map sequence, the silhouettes and movements of the objects in the texture video and the associated depth map sequence are typically similar. The proposed JMVDC scheme may be realized by a combination of the MVC and SVC coding schemes. Specifically, JMVDC may be realized by embedding the inter-layer motion prediction mechanism of SVC into the prediction structure in MVC. Each view may be coded and/or regarded as of a two-layer representation, where the texture resides in the base layer and the depth in the enhancement layer, which may be coded using the coarse granular scalability (CGS) of SVC with only inter-layer motion prediction allowed. In addition, inter-view prediction is enabled both in the base layer (texture) and in the enhancement layer (depth) for non-base views. While the inter-layer motion prediction of JMVDC could be applied for any inter-view prediction structure used for the base layer, an encoder and decoder may be realized in such a manner that inter-view prediction only appears at IDR and anchor access units, as it may provide a reasonable compromise between complexity and compression efficiency and ease the implementation effort of JMVDC. In the following, the JMVDC scheme is described for the IDR/anchor and non-anchor access units when inter-view prediction is allowed only in IDR/anchor access units and disallowed in non-IDR/non-anchor access units.

Figure 12:
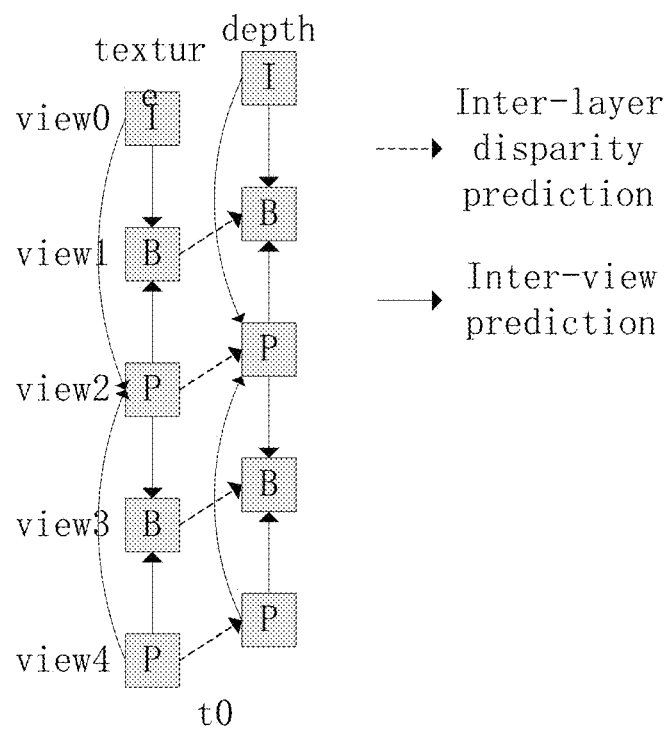
FIG. 12 shows an example of joint multiview video and depth coding of anchor pictures.
Figure 13:
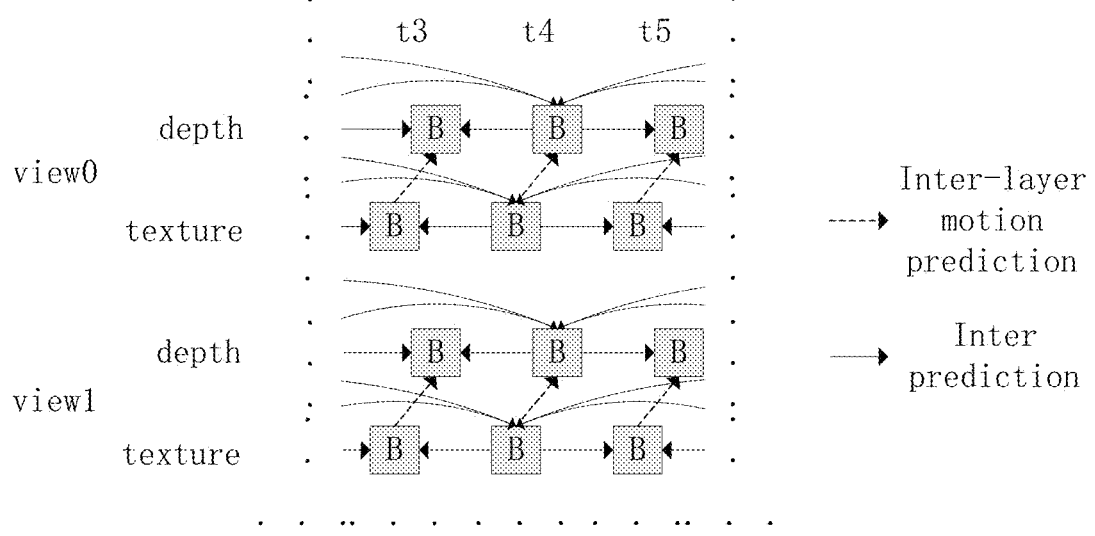
FIG. 13 shows an example of joint multiview video and depth coding of non-anchor pictures.

For IDR and anchor pictures, the JMVDC scheme may be applied as follows. A motion vector used in the inter-view prediction is called a disparity vector. As illustrated in FIG. 12, the disparity vectors of the multiview texture video are used as a prediction reference for derivation of the disparity vectors of multiview depth map in the inter-layer motion prediction process. In an example coding scheme, this prediction mechanism is referred as the inter-layer disparity prediction. For the coding of non-IDR/non-anchor pictures in JMVDC, the depth motion vectors for inter prediction may be predicted using the inter-layer motion prediction process from the respective texture motion vectors as depicted in FIG. 13.

The mode decision process for enhancement layer macroblocks may be identical for both anchor pictures and non-anchor pictures. The base mode may be added to the mode decision process and the motion/disparity vector of the co-located macroblock in the base layer may be chosen as a motion/disparity vector predictor for each enhancement layer macroblock.

The JMVDC tool may also be used in an arrangement where a depth view is regarded as the base layer and the respective texture view as the enhancement layer, and coding and decoding may be done otherwise as described above.

A coding tool known as inside-view motion prediction (IVMP) may operate as follows. In IVMP mode, the motion information, including mb_type, sub_mb_type, reference indices and motion vectors of the co-located macroblock in texture view component may be reused by the depth view component of the same view. A flag may be signaled in each macroblock or macroblock partition to indicate whether it uses the IVMP mode. If the spatial resolution of the depth view component differs from that of the texture view component, the motion vectors of the depth view components may be scaled proportionally to the ratio between the spatial resolutions of the texture view component and the depth view component, when they are used as the motion vectors of the co-located block or macroblock of the texture view component.

In the case of joint coding of texture and depth for depth-enhanced video, view synthesis can be utilized in the loop of the codec, thus providing view synthesis prediction (VSP). In VSP, a prediction signal, such as a VSP reference picture, is formed using a DIBR or view synthesis algorithm, utilizing texture and depth information. For example, a synthesized picture (i.e., VSP reference picture) may be introduced in the reference picture list in a similar way as it is done with interview reference pictures and inter-view only reference pictures. Alternatively or in addition, a specific VSP prediction mode for certain prediction blocks may be determined by the encoder, indicated in the bitstream by the encoder, and used as concluded from the bitstream by the decoder.

In MVC, both inter prediction and inter-view prediction use similar motion-compensated prediction process. Inter-view reference pictures and inter-view only reference pictures are essentially treated as long-term reference pictures in the different prediction processes. Similarly, view synthesis prediction may be realized in such a manner that it uses essentially the same motion-compensated prediction process as inter prediction and inter-view prediction. To differentiate from motion-compensated prediction taking place only within a single view without any VSP, motion-compensated prediction that includes and is capable of flexibly selecting mixing inter prediction, inter-prediction, and/or view synthesis prediction is herein referred to as mixed-direction motion-compensated prediction.

As reference picture lists in MVC and an envisioned coding scheme for MVD such as 3DV-ATM and in similar coding schemes may contain more than one type of reference pictures, i.e. inter reference pictures (also known as intra-view reference pictures), inter-view reference pictures, inter-view only reference pictures, and VSP reference pictures, a term prediction direction may be defined to indicate the use of intra-view reference pictures (temporal prediction), inter-view prediction, or VSP. For example, an encoder may choose for a specific block a reference index that points to an inter-view reference picture, thus the prediction direction of the block is inter-view.

To enable view synthesis prediction for the coding of the current texture view component, the previously coded texture and depth view components of the same access unit may be used for the view synthesis. Such a view synthesis that uses the previously coded texture and depth view components of the same access unit may be referred to as a forward view synthesis or forward-projected view synthesis, and similarly view synthesis prediction using such view synthesis may be referred to as forward view synthesis prediction or forward-projected view synthesis prediction.

Forward View Synthesis Prediction (VSP) may be performed as follows. View synthesis may be implemented through depth map (d) to disparity (D) conversion with following mapping pixels of source picture s(x,y) in a new pixel location in synthesised target image t(x+D,y).

$$t(\lfloor x+D \rfloor, y) = s(x, y), \quad (3)$$

$$D(s(x, y)) = \frac{f \cdot l}{z}$$

$$z = \left( \frac{d(s(x, y))}{255} \left( \frac{1}{Z_{near}} - \frac{1}{Z_{far}} \right) + \frac{1}{Z_{far}} \right)^{-1},$$

In the case of projection of texture picture, s(x,y) is a sample of texture image, and d(s(x,y)) is the depth map value associated with s(x,y).

If a reference frame used for synthesis is 4:2:0, the chroma components may be upsampled to 4:4:4 for example by repeating the sample values as follows:

$$s'_{chroma}(x,y) = s_{chroma}(\lfloor x/2 \rfloor, \lfloor y/2 \rfloor)$$

where $s'_{chroma}(\cdot,\cdot)$ is the chroma sample value in full resolution, and $s_{chroma}(\cdot,\cdot)$ is the chroma sample value in half resolution.

In the case of projection of depth map values, s(x,y)=d(x,y) and this sample is projected using its own value d(s(x,y))=d(x,y).

Warping may be performed at sub-pixel accuracy by upsampling on the reference frame before warping and downsampling the synthesized frame back to the original resolution.

The view synthesis process may comprise two conceptual steps: forward warping and hole filling. In forward warping, each pixel of the reference image is mapped to a synthesized image. When multiple pixels from reference frame are mapped to the same sample location in the synthesized view, the pixel associated with a larger depth value (closer to the camera) may be selected in the mapping competition. After warping all pixels, there may be some hole pixels left with no sample values mapped from the reference frame, and these hole pixels may be filled in for example with a line-based directional hole filling, in which a "hole" is defined as consecutive hole pixels in a horizontal line between two non-hole pixels. Hole pixels may be filled by one of the two adjacent non-hole pixels which have a smaller depth sample value (farther from the camera).

Warping and hole filling may be performed in a single processing loop for example as follows. Each pixel row of the input reference image is traversed from e.g. left to right, and each pixel in the input reference image is processed as follows:

The current pixel is mapped to the target synthesis image according to the depth-to-disparity mapping/warping equation above. Pixels around depth boundaries may use splatting, in which one pixel is mapped to two neighboring locations. A boundary detection may be performed every N pixels in each line of the reference image. A pixel may be considered a depth-boundary pixel if the difference between the depth sample value of the pixel and that of a neighboring one in the same line (which is N-pixel to the right of the pixel) exceeds a threshold (corresponding to a disparity difference of M pixels in integer warping precision to the synthesized image). The depth-boundary pixel and K neighboring pixels to the right of the depth-boundary pixel may use splatting. More specifically, N=4×UpRefs, M=4, K=16× UpRefs−1, where UpRefs is the up-sampling ratio of the reference image before warping.

When the current pixel wins the z-buffering, i.e. when the current pixel is warped to a location without previously warped pixel or with a previously warped pixel having a smaller depth sample value, the iteration is defined to be effective and the following steps may be performed. Otherwise, the iteration is ineffective and the processing continues from the next pixel in the input reference image.

If there is a gap between the mapped locations of this iteration and the previous effective iteration, a hole may be identified.

If a hole was identified and the current mapped location is at the right of the previous one, the hole may be filled.

If a hole was identified and the current iteration mapped the pixel to the left of the mapped location of the previous effective iteration, consecutive pixels immediately to the left of this mapped location may be updated if they were holes.

To generate a view synthesized picture from a left reference view, the reference image may first be flipped and then the above process of warping and hole filling may be used to generate an intermediate synthesized picture. The intermediate synthesized picture may be flipped to obtain the synthesized picture. Alternatively, the process above may be altered to perform depth-to-disparity mapping, boundary-aware splatting, and other processes for view synthesis prediction basically with reverse assumptions on horizontal directions and order.

In another example embodiment the view synthesis prediction may include the following. Inputs of this example process for deriving a view synthesis picture are a decoded luma component of the texture view component srcPicY, two chroma components srcPicCb and srcPicCr up-sampled to the resolution of srcPicY, and a depth picture DisPic.

Output of an example process for deriving a view synthesis picture is a sample array of a synthetic reference component vspPic which is produced through disparity-based warping, which can be illustrated with the following pseudo code:

```
for( j = 0; j < PicHeigh ; j++ ) {
    for( i = 0; i < PicWidth; i++ ) {
        dX = Disparity(DisPic(j,i));
        outputPicY[ i+dX, j ] = srcTexturePicY[ i, j ];
        if( chroma_format_idc = = 1 ) {
            outputPicCb[ i+dX, j ] = normTexturePicCb[ i, j ]
            outputPicCr[ i+dX, j ] = normTexturePicCr[ i, j ]
        }
    }
}
``` where the function "Disparity( )" converts a depth map value at a spatial location i,j to a disparity value dX, PicHeigh is the height of the picture, PicWidth is the width of the picture, srcTexturePicY is the source texture picture, outputPicY is the Y component of the output picture, outputPicCb is the Cb component of the output picture, and outputPicCr is the Cr component of the output picture.

Disparity is computed taking into consideration camera settings, such as translation between two views b, camera's focal length f and parameters of depth map representation (Znear, Zfar) as shown below.

$$dX(i, j) = \frac{f \cdot b}{z(i, j)}; \qquad (4)$$

$$z(i, j) = \frac{1}{\frac{DisPic(i, j)}{255} \cdot \left(\frac{1}{Z_{near}} - \frac{1}{Z_{far}}\right) + \frac{1}{Z_{far}}}$$

The vspPic picture resulting from the above described process may feature various warping artifacts, such as holes and/or occlusions and to suppress those artifacts, various post-processing operations, such as hole filling, may be applied.

However, these operations may be avoided to reduce computational complexity, since a view synthesis picture vspPic is utilized for a reference pictures for prediction and may not be outputted to a display.

In a scheme referred to as a backward view synthesis or backward-projected view synthesis, the depth map co-located with the synthesized view is used in the view synthesis process. View synthesis prediction using such backward view synthesis may be referred to as backward view synthesis prediction or backward-projected view synthesis prediction or B-VSP. To enable backward view synthesis prediction for the coding of the current texture view component, the depth view component of the currently coded/decoded texture view component is required to be available. In other words, when the coding/decoding order of a depth view component precedes the coding/decoding order of the respective texture view component, backward view synthesis prediction may be used in the coding/decoding of the texture view component.

With the B-VSP, texture pixels of a dependent view can be predicted not from a synthesized VSP-frame, but directly from the texture pixels of the base or reference view. Displacement vectors required for this process may be produced from the depth map data of the dependent view, i.e. the depth view component corresponding to the texture view component currently being coded/decoded.

Figure 17:
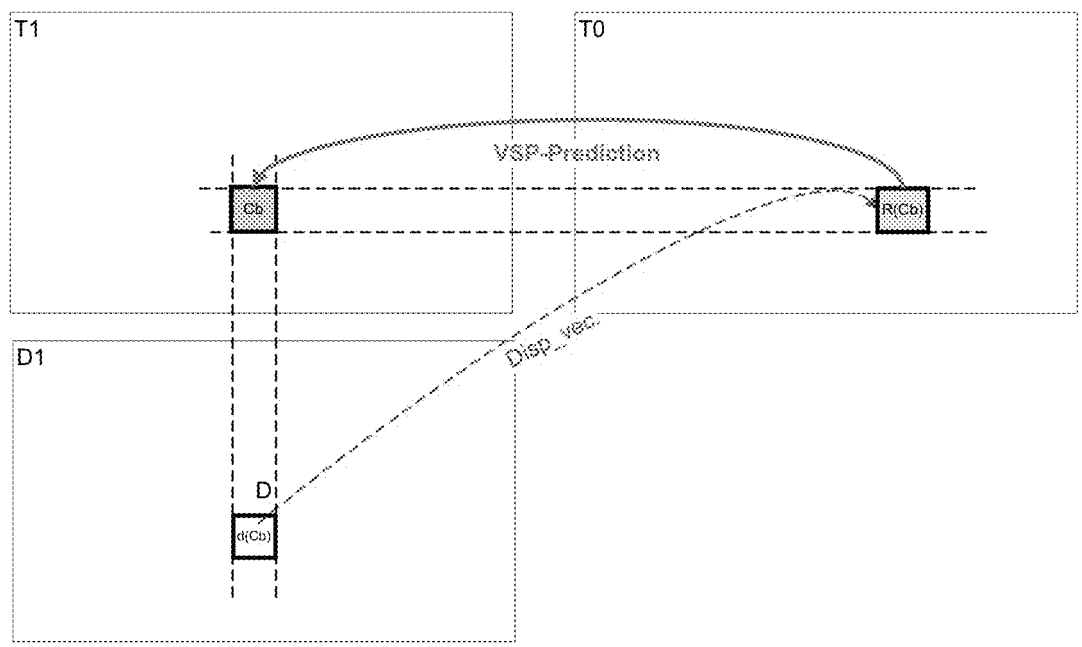
FIG. 17 illustrates an example of a backward view synthesis scheme.

The concept of B-VSP may be explained with reference to FIG. 17 as follows. Let us assume that the following coding order is utilized: (T0, D0, D1, T1). Texture component T0 is a base view and T1 is dependent view coded/decoded using B-VSP as one prediction tool. Depth map components D0 and D1 are respective depth maps associated with T0 and T1, respectively. In dependent view T1, sample values of currently coded block Cb may be predicted from reference area R(Cb) that consists of sample values of the base view T0. The displacement vector (motion vector) between coded and reference samples may be found as a disparity between T1 and T0 from a depth map value associated with a currently coded texture sample.

The process of conversion of depth (1/Z) representation to disparity may be performed for example with following equations:

$$Z(Cb(j,i)) = \frac{1}{\frac{d(Cb(j,i))}{255} \cdot \left(\frac{1}{Znear} - \frac{1}{Zfar}\right) + \frac{1}{Zfar}}; \quad (5)$$

$$D(Cb(j,i)) = \frac{f \cdot b}{Z(Cb(j,i))};$$

where j and i are local spatial coordinates within Cb, d(Cb(j,i)) is a depth map value in depth map image of a view #1, Z is its actual depth value, and D is a disparity to a particular view #0. The parameters f, b, Znear and Zfar are parameters specifying the camera setup; i.e. the used focal length (f), camera separation (b) between view #1 and view #0 and depth range (Znear,Zfar) representing parameters of depth map conversion.

A synthesized picture resulting from VSP may be included in the initial reference picture lists List0 and List 1 for example following temporal and inter-view reference frames. However, reference picture list modification syntax (i.e., RPLR commands) may be extended to support VSP reference pictures, thus the encoder can order reference picture lists at any order, indicate the final order with RPLR commands in the bitstream, causing the decoder to reconstruct the reference picture lists having the same final order.

VSP may also be used in some encoding and decoding arrangements as a separate mode from intra, inter, inter-view and other coding modes. For example, no motion vector difference may be encoded into the bitstream for a block using VSP skip/direct mode, but the encoder and decoder may infer the motion vector difference to be equal to 0 and/or the motion vector being equal to 0. Furthermore, the VSP skip/direct mode may infer that no transform-coded residual block is encoded for the block using VSP skip/direct mode.

Depth-based motion vector prediction (D-MVP) is a coding tool which takes in use available depth map data and utilizes it for coding/decoding of the associated depth map texture data. This coding tool may require depth view component of a view to be coded/decoded prior to the texture view component of the same view. The D-MVP tool may comprise two parts, direction-separated MVP and depth-based MV competition for Skip and Direct modes, which are described next.

Figure 14:
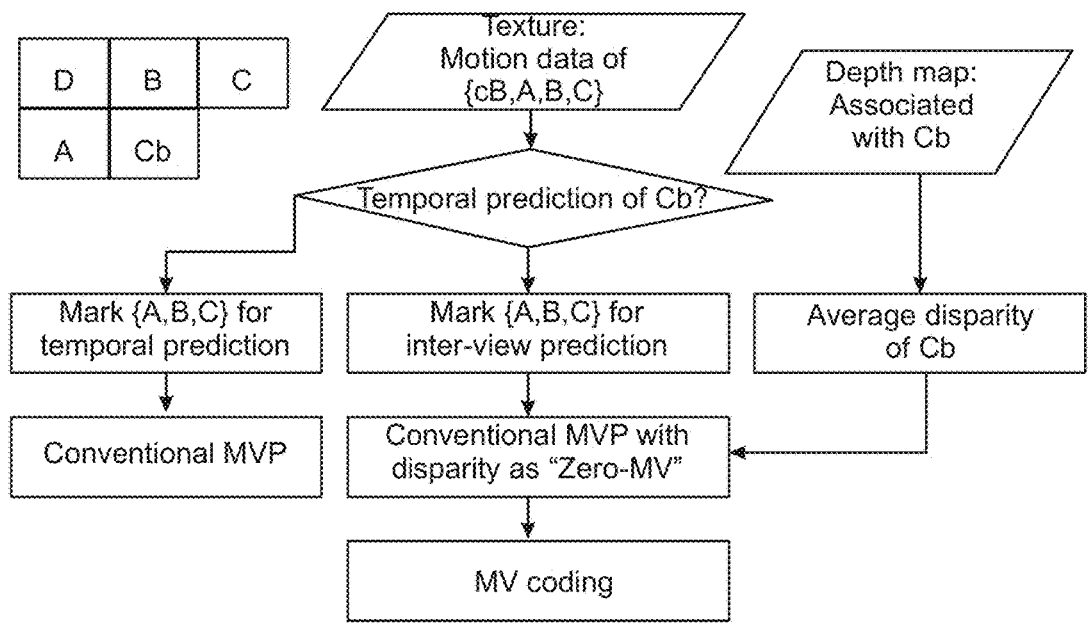
FIG. 14 depicts a flow chart of an example method for direction separated motion vector prediction.
Figure 15A:
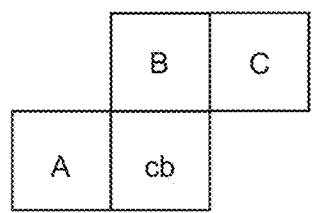
FIG. 15a shows spatial neighborhood of the currently coded block serving as the candidates for intra prediction.
Figure 15B:
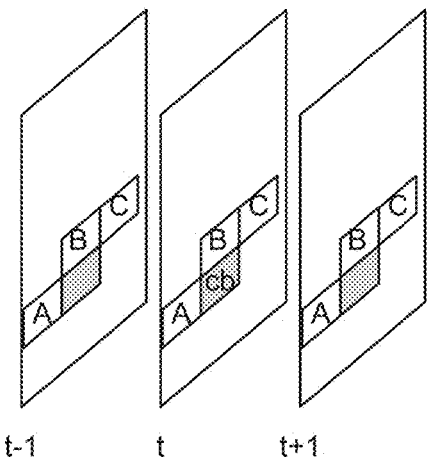
FIG. 15b shows temporal neighborhood of the currently coded block serving as the candidates for inter prediction.

Direction-separated MVP may be described as follows. All available neighboring blocks are classified according to the direction of their prediction (e.g. temporal, inter-view, and view synthesis prediction). If the current block Cb, see FIG. 15a, uses an inter-view reference picture, all neighboring blocks which do not utilize inter-view prediction are marked as not-available for MVP and are not considered in the conventional motion vector prediction, such as the MVP of H.264/AVC. Similarly, if the current block Cb uses temporal prediction, neighboring blocks that used inter-view reference frames are marked as not-available for MVP. The flowchart of this process is depicted in FIG. 14. The flowchart and the description below considers temporal and inter-view prediction directions only, but it could be similarly extended to cover also other prediction directions, such as view synthesis prediction, or one or both of temporal and inter-view prediction directions could be similarly replaced by other prediction directions.

If no motion vector candidates are available from the neighboring blocks, the default "zero-MV" MVP ($mv_y=0$, $mv_x=0$) for inter-view prediction may be replaced with $mv_y=0$ and $mv_x=\overline{D}(cb)$, where $\overline{D}(cb)$ is average disparity which is associated with current texture Cb and may be computed by:

$$\overline{D}(cb) = (1/N) \cdot \Sigma_i D(cb(i))$$

where i is index of pixels within current block Cb, N is a total number of pixels in the current block Cb.

Figure 16A:
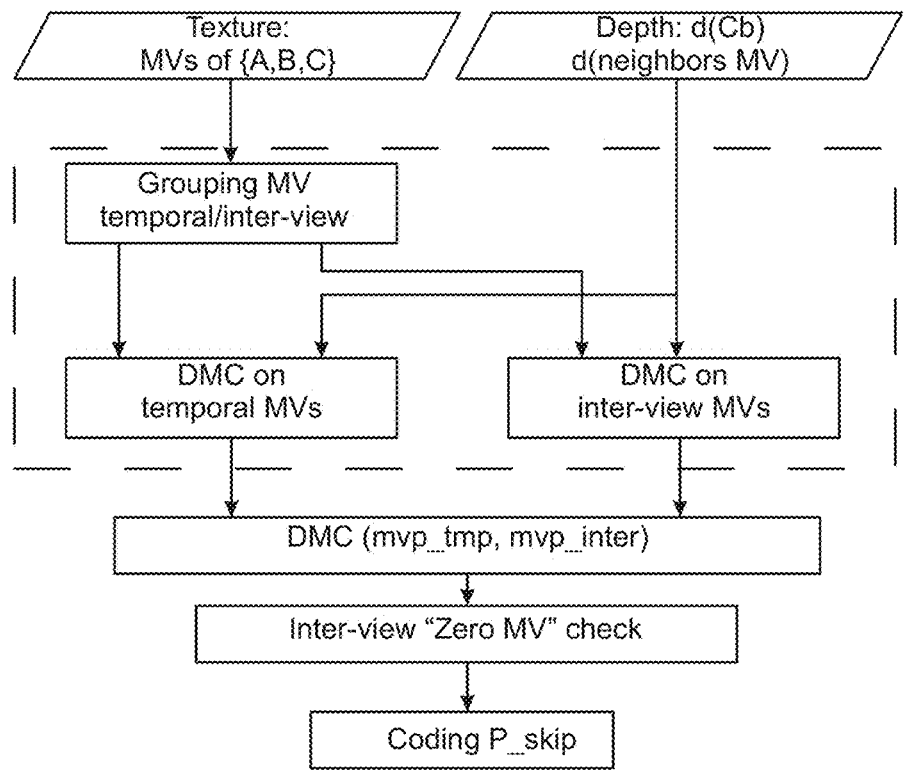
FIG. 16a depicts a flow chart of an example method of depth-based motion competition for a skip mode in P slices.
Figure 16B:
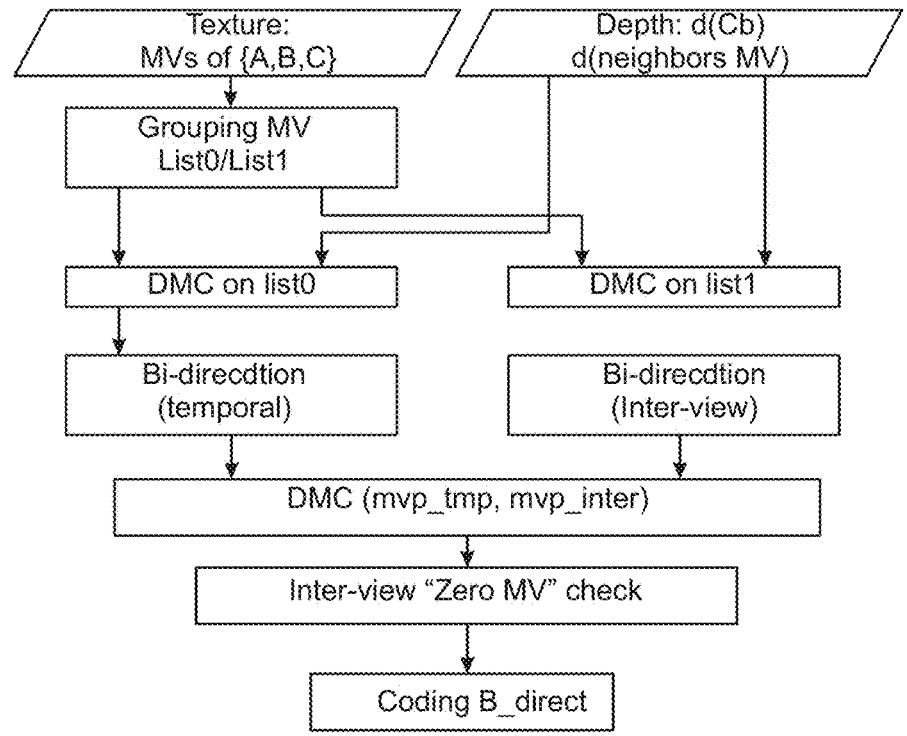
FIG. 16b depicts a flow chart of an example method of depth-based motion competition for a direct mode in B slices.

The depth-based MV competition for skip and direct modes may be described in the context of 3DV-ATM as follows. Flow charts of the process for the proposed Depth-based Motion Competition (DMC) in the Skip and Direct modes are shown in FIGS. 16a and 16b, respectively. In the Skip mode, motion vectors {$mv_i$} of texture data blocks {A, B, C} are grouped according to their prediction direction forming Group 1 and Group 2 for temporal and inter-view respectively. The DMC process, which is detailed in the grey block of FIG. 16a), may be performed for each group independently.

For each motion vector $mv_i$ within a given Group, a motion-compensated depth block $d(cb,mv_i)$ may be first derived, where the motion vector $mv_i$ is applied relatively to the position of d(cb) to obtain the depth block from the reference depth map pointed to by $mv_i$. Then, the similarity between d(cb) and $d(cb,mv_i)$ may be estimated by:

$$SAD(mv_i) = SAD(d(cb,mv_i),d(cb))$$

The $mv_i$ that provides a minimal sum of absolute differences (SAD) value within a current Group may be selected as an optimal predictor for a particular direction ($mvp_{dir}$)

$$mvp_{dir} = \arg\min_{mvp_{dir}} (SAD(mv_i))$$

Following this, the predictor in the temporal direction ($mvp_{tmp}$) is competed against the predictor in the inter-view direction ($mvp_{inter}$). The predictor which provides a minimal SAD can be gotten by:

$$mvp_{opt} = \arg\min_{mvp_{dir}} (SAD(mvp_{tmp}), SAD(mvp_{inter}))$$

Finally, $mvp_{opt}$ which refers to another view (inter-view prediction) may undergo the following sanity check: In the case of "Zero-MV" is utilized it is replaced with a "disparity-MV" predictor $mv_y=0$ and $mv_x=\overline{D}(cb)$, where $\overline{D}(cb)$ may be derived as described above.

The MVP for the Direct mode of B slices, illustrated in FIG. 16b), may be similar to the Skip mode, but DMC (marked with grey blocks) may be performed over both reference pictures lists (List 0 and List 1) independently. Thus, for each prediction direction (temporal or inter-view) DMC produces two predictors ($mvp0_{dir}$ and $mvp1_{dir}$) for List 0 and List 1, respectively. Following, the bi-direction compensated block derived from $mvp0_{dir}$ and $mvp1_{dir}$ may be computed as follows:

$$d(cb, mvp_{dir}) = \frac{d(cb, mvp0_{dir}) + d(cb, mvp1_{dir})}{2}$$

Then, SAD value between this bi-direction compensated block and Cb may be calculated for each direction independently and the MVP for the Direct mode may be selected from available $mvp_{inter}$ and $mvp_{tmp}$ as shown above for the skip mode. Similarly to the Skip mode, "zero-MV" in each reference list may be replaced with "disparity-MV", if $mvp_{opt}$ refers to another view (inter-view prediction).

Depth/disparity-based intra prediction for texture view for the purposes of multi-view coding (MVC), depth-enhanced video coding, multiview+depth (MVD) coding and multi-view with in-loop view synthesis (MVC-VSP) may be described as follows. Depth/disparity-based intra prediction of texture may be considered to include a set of new intra prediction mechanisms based on utilization of the depth or disparity information (Di) for a current block (cb) of texture data. It is assumed that the depth or disparity information (Di) for a current block (cb) of texture data is available through decoding of coded depth or disparity information or can be estimated at the decoder side prior to decoding of the current texture block, and this information can be utilized in intra prediction.

In the following, a texture block typically refers to a block of samples of a single color component of a texture picture, i.e. typically a block of samples of one of the luma or chroma components of a texture picture.

The encoder may include one or more of the following operations for coding of intra-coded texture blocks. It should be noted here that similar principles are also applicable at a decoder side for decoding of intra-coded texture blocks. While depth-based intra prediction for texture is described with reference to depth, it is to be understood that disparity or parallax could be used similarly in place of depth. The description refers to term block, which may be for example a macroblock similar to that used in H.264/AVC, a treeblock similar to that used in a HEVC WD, or anything alike.

Depth Boundary Detection

The encoder may apply depth boundary detection e.g. as follows. A depth boundary may also be referred to as a depth edge, a depth discontinuity, or a depth contour, for example. In the encoder, an associated (reconstructed/decoded) depth block is classified to either contain a depth boundary or not. The same depth boundary detection algorithm may also be performed in the decoder, and then both the encoder and decoder perform the depth boundary detection for reconstructed/decoded depth pictures. The detected depth boundaries may be used in one or more of the operations described below.

The encoder and the decoder may try to detect possible edges or other boundaries within a picture or a block e.g. by using an edge or boundary detection algorithm. There may be many possible algorithms which may be applied. For example, the depth boundary classification may be done as follows. The classification may use a Sobel operator using the following two 3×3 kernels to obtain a gradient magnitude image G:

$$G_x = \begin{bmatrix} -1 & 0 & +1 \\ -2 & 0 & +2 \\ -1 & 0 & +1 \end{bmatrix} * A$$

and $$G_y = \begin{bmatrix} -1 & -2 & -1 \\ 0 & 0 & 0 \\ +1 & +2 & +1 \end{bmatrix} * A$$

$$G = \sqrt{G_x^2 + G_y^2}$$

where A is the source image (the reconstructed depth image).

As sequences may have different dynamic sample value ranges in G value, G may be converted to image G' using histogram equalization. In the histogram equalization, the min and max values of G' may be set to 0 and 255, respectively. Further, a first threshold T1 and a second threshold T2 may also be set to appropriate values. The encoder or the decoder may examine if G'(x, y)>T1. If so, the point (x, y) is classified to the boundary points. When the histogram equalization has been performed for the current block, the number of possible boundary points in the current block may be checked to determine, if the number of boundary points in one block is larger than the second threshold T2. If so, this block is classified to contain a depth boundary.

The encoder may determine the value of any of the above-mentioned thresholds T1 and T2 for example based on encoding blocks with different values of the threshold and selecting the value of the threshold that is optimal according to the Lagrangian rate-distortion optimization equation. The encoder may indicate the determined values of the thresholds T1 and/or T2 within the bitstream, for example by encoding them as one or more syntax elements for example in a sequence parameter set, a picture parameter set, a slice parameter set, a picture header, a slice header, within a macroblock syntax structure, or anything alike. The decoder may determine the thresholds T1 and/or T2 based on the information encoded in the bitstream, such as one or more codewords indicating the value of thresholds T1 and/or T2.

A texture block contains, covers, includes, has, or is with a depth boundary when the depth block co-located with the texture block contains a depth boundary. Depth may be coded at a different spatial resolution than texture. Therefore, scaling according to the proportion of the spatial resolutions may be taken into account in the determination when a texture block contains or covers a depth boundary.

Depth-Based Picture Partitioning

The encoder may partition a picture on the basis of depth information. The encoder may code the picture partitioning into the bitstream, or the decoder may partition a picture on the basis of depth information. The encoder and decoder may change the block coding or decoding order according to the picture partitioning so that blocks of one picture partition may precede in coding or decoding order blocks of another picture partition.

The block coding order and respectively the decoding order may be changed so that texture blocks not containing a depth boundary are coded or decoded first e.g. in a raster-scan order while texture blocks including a depth boundary are skipped and coded or decoded subsequently. Texture blocks containing a depth boundary may be marked in encoding and/or decoding as not available for prediction for the blocks not containing a depth boundary (as if they were in a different slice and constrained intra prediction turned on).

The block coding order and respectively the decoding order may be changed so that texture blocks including a depth boundary are coded or decoded first e.g. in raster scan order, while texture blocks not containing a depth boundary are coded or decoded subsequently to the texture blocks including a depth boundary e.g. in a raster-scan order. Texture blocks not containing a depth boundary may be marked in encoding and/or decoding as not available for prediction for the blocks containing a depth boundary (as if they were in a different slice and constrained intra prediction turned on).

In the depth-based picture partitioning, the encoder may use slice_group_map_type 6 of flexible macroblock ordering of H.264/AVC, which enables to provide a macroblock-wise mapping from macroblocks to slice groups. The creation of the slice group map may be performed based on the classified depth edge macroblocks, i.e. all the macroblocks classified as not containing a depth edge belong to one slice group, and the macroblocks with a depth edge belong to another slice group.

The encoder and decoder may infer the slice group mapping based on the depth boundary classification of reconstructed/decoded depth view components. For example, all the macroblocks classified as not containing a depth edge belong to one slice group, and the macroblocks with a depth edge belong to another slice group.

In another example, all macroblocks of the same depth range may be classified in encoding and/or decoding to form a slice group while the macroblocks containing a depth edge may be classified in encoding and/or decoding to form their own slice group.

The slice group containing macroblocks classified to include a depth boundary may be coded or decoded after the other slice group(s). Alternatively, the slice group containing macroblocks classified to include a depth boundary may be coded or decoded before the other slice group(s).

The macroblocks are coded or decoded in raster-scan order or any other pre-defined order otherwise but the macroblocks containing a depth edge may be skipped and coded or decoded after all other macroblocks of the same slice. Alternatively, the macroblocks containing a depth edge may be coded or decoded before all other macroblocks of the same slice.

Depth-Based Block Partitioning

The encoder may partition a texture block on the basis of depth information. The encoder may perform block partitioning so that one set of block partitions contains a depth boundary while another set of block partitions does not contain any depth boundary. The encoder may select the block partitions using a defined criterion or defined criteria; for example, the encoder may select the size of blocks not containing a depth boundary to be as large as possible. The decoder may also run the same block partitioning algorithm, or the encoder may signal the used block partitioning to the decoder e.g. using conventional H.264/AVC block partitioning syntax element(s).

Intra-coded luma texture macroblocks may be partitioned in 16×16, 8×8, or 4×4 blocks for intra prediction, but it is obvious that also other block sizes may be applied. Furthermore, the blocks need not be squared blocks but other formats are also applicable. As a generalization, the block size may be represented as M×N in which M, N$\in Z_+$.

The block partitioning of the depth block may be used as the block partitioning for the respective or co-located texture block.

No block partitioning may be coded or indicated in the bitstream. Therefore, the encoder and decoder may perform the same depth-based block partitioning.

When information on the block partitioning is delivered from the encoder to the decoder, there may be many options for that. For example, the information on the block partitioning may be entropy coded to a bitstream. Entropy coding of the block partitioning may be performed in many ways. For example, the encoder signals the used block partitioning to the decoder e.g. using a H.264/AVC block partitioning syntax element(s). The block partitioning may be coded into the bitstream but the depth-based block partitioning is applied in both encoder and decoder to modify the context state of a context adaptive binary arithmetic coding (CABAC) or context-based variable length coding or any similar entropy coding in such a manner that the block partitioning chosen by the depth-based block partitioning method uses smaller amount of coded data bits. In effect, the likelihood of the block partitioning deduced by the depth-based block partitioning derivation is increased in the entropy coding and decoding.

The block partitioning may be coded into the bitstream but the code table or binarization table used in the block partitioning codeword may be dependent on the result of the depth-based block partitioning.

The used block partitioning method may be selected by the encoder e.g. through rate-distortion optimization and may be indicated by the encoder as a syntax element or elements or a value of a syntax element in the coded bitstream. The syntax element(s) may reside for example in the sequence parameter set, picture parameter set, adaptation parameter set, picture header, or slice header.

The encoder may, for example, perform conventional block partitioning selection e.g. using a rate-distortion optimization. If the rate-distortion cost of conventional block partitioning is smaller than that of the depth-based bock partitioning, the encoder may choose to use a conventional block partitioning and indicate the use of the conventional block partitioning in the bitstream for example in the slice header, macroblock syntax, or block syntax.

The decoder may decode the syntax element(s) related to the block partitioning method and decode the bitstream using the indicated block partitioning methods and related syntax elements.

The coding or decoding order of sub-blocks or block partitions within a block may be determined based on the depth boundary or boundaries. For example, in H.264/AVC based coding or decoding, the coding order of blocks according to the block partitioning within a macroblock may be determined based on the depth boundaries. The blocks without a depth boundary may be coded or decoded prior to the blocks having a depth boundary.

For example, for coding or decoding a texture macroblock containing a depth boundary in a H.264/AVC based coding/ decoding scheme, the 8×8 blocks not containing a depth boundary (if any) may be coded or decoded first. Following that, the 4×4 blocks not containing a depth boundary (which reside in those 8×8 blocks that contain depth boundaries) may be coded or decoded. Finally, the 4×4 blocks containing a depth boundary may be coded or decoded using for example a bi-directional intra prediction mode.

In another example for an H.264/AVC based coding/decoding scheme, the 4×4 texture blocks containing a depth boundary are coded or decoded first. Then, the remaining samples of the texture macroblock are predicted from the boundary samples of the neighboring texture macroblocks and the reconstructed/decoded 4×4 texture blocks including a depth boundary.

Block partitioning is conventionally performed using a regular grid of sub-block positions. For example, in H.264/AVC, the macroblock may be partitioned to 4×4 or larger blocks at a regular 4×4 grid within the macroblock. Block partitioning of texture blocks may be applied in a manner that at least one of the coordinates of a sub-block position differs from a regular grid of sub-block positions. Sub-blocks having a depth boundary may for example be selected in a manner that their vertical coordinate follows the regular 4×4 grid but that their horizontal coordinate is chosen for example to minimize the number of 4×4 sub-blocks having a depth boundary.

The block partitioning used for intra prediction of a texture block may differ from the block partitioning used for prediction error coding or decoding of the same texture block. For example, any of the methods above based on the detection of a depth boundary may be used for determining the block partitioning for intra prediction of a texture block, and a different block partitioning may be used for transform-coded prediction error coding or decoding. The encoder and/or the decoder may infer the block partitioning used for intra prediction of the texture based on the co-located or respective depth reconstructed or decoded depth. The encoder may encode into the bitstream the block partitioning for prediction error coding of the intra-coded texture block, and the decoder may decode the block partitioning used for prediction error decoding of the intra-coded texture block from the bitstream. The encoder may, for example, use rate-distortion optimization when selecting whether or not the intra prediction and prediction error coding/decoding use the same block partitioning.

Depth-Based Intra Prediction Mode Determination

The encoder and/or the decoder may determine an intra-prediction mode by using the depth information. The depth of the current texture block being coded or decoded may be compared to the depth of the neighboring texture blocks or boundary samples of the depth blocks co-located or corresponding to the neighboring texture blocks, and the intra prediction mode of the current texture block may be determined on the basis of this comparison. For example, if the depth of the current texture block is very similar to the depth of the boundary samples, a DC prediction may be inferred. In another example, a depth boundary is detected in the current depth block and a bi-directional intra prediction for the current texture block is inferred.

As the intra prediction mode may be inferred in the encoder and the decoder, no syntax element may be coded and bitrate may be reduced. The use of depth-based intra prediction mode determination may be signaled for example in the slice header and the encoder may turn a depth-based intra prediction mode on using rate-distortion optimized decision comparing a depth-based prediction mode determination and a conventional intra prediction mode determination and syntax element coding.

The intra prediction mode of the depth block may be used for intra prediction of the respective or co-located texture block (in both the encoder and decoder).

The depth of the current texture block being coded or decoded may be compared to the depth of the neighboring texture blocks or boundary samples of the depth blocks co-located or corresponding to the neighboring texture blocks, and the intra prediction mode of the current texture block may be determined on the basis of this comparison. For example, if the depth of the current texture block is very similar to the depth of the boundary samples, a DC prediction may be inferred or a conventional intra prediction mode signaling may be inferred. In another example, a depth boundary is detected in the current depth block and a bi-directional intra prediction for the current texture block is inferred.

Similarly to the block partitioning, there are multiple options for entropy coding of the intra prediction mode, including the following. The bi-directional intra prediction mode may be inferred when there is a depth boundary within the block, and otherwise conventional intra prediction may be used for the block, where encoder determines the intra prediction mode and indicates it in the bitstream. As the intra prediction mode is inferred in both the encoder and decoder, no syntax element is coded.

In another option, the intra prediction mode may be coded into the bitstream but the depth-based prediction of the intra prediction mode may be applied in both encoder and decoder to modify the context state of CABAC or context-based variable length coding or any similar entropy coding in such a manner that the intra prediction mode chosen by the depth-based algorithm may use a smaller amount of coded data bits. In effect, the likelihood of the intra prediction mode deduced by the depth-based algorithm may be increased in the entropy coding and decoding.

In yet another option the intra prediction mode may be coded into the bitstream but the code table or binarization table used in the intra prediction mode codeword may be dependent on the result of the depth-based algorithm.

The use of depth-based intra prediction mode determination may be signaled for example in the slice header, macroblock syntax, or block syntax and the encoder may turn it on using rate-distortion optimized decision comparing depth-based prediction mode determination and conventional intra prediction mode determination.

The encoder may, for example, perform conventional intra prediction mode selection e.g. using rate-distortion optimization. If the rate-distortion cost of conventional intra prediction is smaller than that of the depth-based intra prediction mode selection, the encoder may choose to use conventional intra prediction and indicate the use of the conventional intra prediction in the bitstream, for example in the slice header, macroblock syntax, or block syntax.

The decoder may decode the syntax element(s) related to the intra prediction mode and decode the bitstream using the indicated intra prediction mode and related syntax elements.

Depth-Based Sample Availability for Intra Prediction

The encoder and/or the decoder may also determine whether there exist one or more samples for intra prediction. Only samples that are classified in encoding and/or decoding to belong to the same object using as a sample being predicted may be used as a prediction source. The classification to the same object may be done e.g. through comparing depth sample values e.g. by considering only those sample locations for which depth sample values are sufficiently close to each other to belong to the same object.

In an example implementation, the encoder and/or decoder decisions on the intra coding mode and macroblock partitioning as well as on the intra prediction mode decisions for texture blocks may be done independently of the respective depth pictures. However, the availability information of texture samples for intra prediction may be modified according to the available depth information.

Bi-Directional Intra Prediction for Blocks Containing a Depth Boundary

It is also possible that the encoder and the decoder use bi-directional intra prediction for texture blocks containing a depth boundary. Bi-directional intra prediction may be more efficient when the depth components are encoded and decoded before the texture components. Hence, the depth components of possibly all neighboring blocks of the current block may be available when encoding or decoding the texture components of the current block.

A texture block to be coded or decoded may be divided into two or more depth regions. The boundary samples of neighboring texture blocks may be classified in encoding and/or decoding also to the equivalent two or more depth regions. Samples within a particular depth region in the block being coded or decoded may then be predicted only from the respective boundary samples of the neighboring blocks. Different prediction direction or intra prediction mode may be selected for different regions.

One or more of the following steps may be performed for bi- or multi-directional intra prediction of texture blocks containing a depth boundary.

a. A new intra prediction mode for bi-directional intra prediction is specified in addition to the regular intra modes as specified below.

b. The encoder makes a rate-distortion optimized decision of the block partitioning, such as macroblock or treeblock partitioning, and the coding modes used by including the new bi-directional intra prediction as one of the tested modes. As a generalization, there could be more than two intra prediction directions, i.e. tri-directional intra prediction or generally n-directional intra prediction, where n is a positive integer.

c. If the texture block (of any size and shape such as 16×16, 8×8, and 4×4) contains a depth boundary, the availability of block boundary samples at neighboring blocks may be determined. The block or macroblock coding and decoding order may be changed, and the block to be predicted may be surrounded from up to four sides by available block boundary samples at neighboring blocks.

d. If the available block boundary samples at neighboring texture blocks co-locate with depth samples that are from different depth ranges, then bi-directional intra prediction mode may be available for the encoder and/or the decoder.

The availability of the bi-directional intra prediction mode may be used to tune entropy coding e.g. by setting the probability of the bi-directional intra mode to zero in CABAC or selecting a code table that excludes the bi-directional intra mode in context-adaptive variable-length coding if the bi-directional intra prediction mode is not available.

e. Two most prominent depth regions may be selected in encoding and/or decoding from the available block boundary depth samples at neighboring blocks and from the depth block that co-locates the texture block being coded. For example, the two depth regions having the most samples in the depth block may be selected provided that block boundary depth samples at neighboring blocks for them are also available.

f. Each sample in the depth block may be mapped to one of the two most prominent depth regions, e.g. according to closest absolute difference to the median or average depth value of the depth region. As a result each sample in the texture block being coded may be mapped either depth region, which may be denoted as a depth region 0 or a depth region 1.

Steps e and f may be performed for example as follows: Let Dmax and Dmin be the maximum value and minimum value, respectively, in the reconstructed depth block that co-locates the texture block. Let a threshold value DThres= (Dmax+Dmin)/2. Samples in depth region 0 are such that for which depth<=DThres. Samples in depth region 1 are such that for which depth>DThres.

Depth regions may be determined to be contiguous. For example, a Wedgelet partitioning may be used in both encoder and decoder. For a Wedgelet partition, the two regions are defined to be separated by a straight line. The separation line is determined by the start point S and the end point P, both located on different borders of the block. The separation line may be described by the equation of a straight line. The start and end point for the Wedgelet partitioning may be determined for example by minimizing a cost function as follows. Different possibilities for S and P are tested and the respective cost is derived. For example, all possible combinations of S and P may be tested. For each pair of S and P, a representative value for region 0 and 1 is first determined for example by averaging the depth sample values in region 0 and 1, respectively. Then a cost may be counted for example by deriving a sum of absolute differences of the depth samples relative to the representative value of region 0 or 1, depending on which region the depth sample has been divided according to S and P. The values of S and P minimizing the cost are selected for the Wedgelet partitioning.

In some cases, the depth regions may be determined to be contiguous but may not be required to be separated by a straight line.

g. Intra prediction for the texture block may be performed separately for depth region 0 and depth region 1. Different intra prediction direction may be selected for depth region 0 than for depth region 1. The prediction direction may be inferred by both the encoder and decoder. Alternatively, the prediction direction may be determined by the encoder and signaled in the bitstream. In the latter case, two prediction direction codewords are coded, one for depth region 0 and another for depth region 1.

The sample availability for intra prediction may be depth-based, e.g. as described above. Another similar alternative is to classify the samples in the neighboring blocks that may be used for intra prediction to region 0 or region 1 by comparing their depth value with the threshold DThres. Samples from neighboring blocks classified in region 0 may be used to predict the samples of the region 0 in the current block being coded or decoded, and samples from neighboring blocks classified in region 1 are not used to predict the samples of the region 0 in the current block being coded or decoded. Region 1 of the current block being coded or decoded may be handled similarly.

The block or macroblock coding or decoding order may be changed, and a block to be predicted may be surrounded from up to four sides by available block boundary samples at neighboring blocks, and hence the intra prediction modes and the block boundary samples at neighboring blocks that they use may also differ from those currently in H.264/AVC or HEVC or any similar coding or decoding method or system. For example, the H.264/AVC intra prediction modes may be changed as follows.

In DC mode the region 0/1 is set to be the mean value of samples at neighboring blocks that surround the current block from any direction and that are also in the region 0/1.

In horizontal/vertical mode, if boundary samples of blocks from both sides of the current block are available, the boundary samples are weighted according to the Euclidean spatial distance to the sample being predicted. For example, if a horizontal coordinate of prediction sample p1 is x1=7 and a horizontal coordinate of prediction sample p2 is x2=16 and a horizontal coordinate of the sample being predicted is x=10, and horizontal prediction is used, the prediction sample may be derived using $m=(x2-x1)=9$ as $((m-(x-x1))*p1+(m-(x2-x))*p2)/m=((9-(10-7))*p1+(9-(16-10))*p2)/9=(6*p1+3*p2)/9$. If only one boundary sample is available, it is used as such as a prediction. If no boundary samples are available, the value obtained by through DC prediction may be used.

Depth-Weighted Intra Prediction

The encoder and the decoder may use the depth information for weighting purposes in intra prediction. The depth-based weight for intra prediction of texture may be a non-binary value, such as a fractional value, that is based on the difference between the depth of the texture sample being predicted and the depth of the prediction sample.

More than one prediction sample may be used for predicting a single sample. Furthermore, a binary weight may be used, i.e. if a prediction sample is classified to belong to a different depth region as the sample being predicted, a weight of 0 may be used. Otherwise, an equal weight for all prediction samples may be used. In some cases, an additional multiplicative weight may have been determined based on Euclidean spatial distance between the prediction sample and the sample being predicted.

In some cases, the depth-based weight may be a non-binary value, such as a fractional value. For example, the following derivation may be used. Let the depth value of the sample being predicted be denoted d. Let the prediction samples be denoted pi and the depth value of prediction samples be denoted di, where i is an index of the prediction samples. The depth of prediction samples may also include values that are derived from multiple depth samples, such as the average of all boundary samples of neighboring depth blocks that classified to belong to the same depth region as the depth of the sample being predicted. Let S be equal to $\Sigma abs(di-D)$ over all values of i=1 to n, inclusive, where n is the number of prediction samples. Let wi defined for each prediction be equal to $(S-\Sigma abs(dj-D))/S$ for values of j=1 to n, inclusive, where j≠i. The prediction sample p may then be derived as $\Sigma(wi*pi)$ over all values of i=1 to n, inclusive.

It is to be understood that while many of the coding tools have been described in the context of a particular codec, such as 3DV-ATM, they could similarly be applied to other codec structures, such as a depth-enhanced multiview video coding extension of HEVC.

As described above, coded and/or decoded depth view components may be used for example for one or more of the following purposes: i) as prediction reference for other depth view components, ii) as prediction reference for texture view components for example through view synthesis prediction, iii) as input to DIBR or view synthesis process performed as post-processing for decoding or pre-processing for rendering/displaying. In many cases, a distortion in the depth map causes an impact in a view synthesis process, which may be used for view synthesis prediction and/or view synthesis done as post-processing for decoding. Thus, in many cases a depth distortion may be considered to have an indirect impact in the visual quality/fidelity of rendered views and/or in the quality/fidelity of prediction signal. Decoded depth maps themselves might not be used in applications as such, e.g. they might not be displayed for end-users. The above-mentioned properties of depth maps and their impact may be used for rate-distortion-optimized encoder control. Rate-distortion-optimized mode and parameter selection for depth pictures may be made based on the estimated or derived quality or fidelity of a synthesized view component. Moreover, the resulting rate-distortion performance of the texture view component (due to depth-based prediction and coding tools) may be taken into account in the mode and parameter selection for depth pictures. Several methods for rate-distortion optimization of depth-enhanced video coding have been presented that take into account the view synthesis fidelity. These methods may be referred to as view synthesis optimization (VSO) methods.

Figure 8:
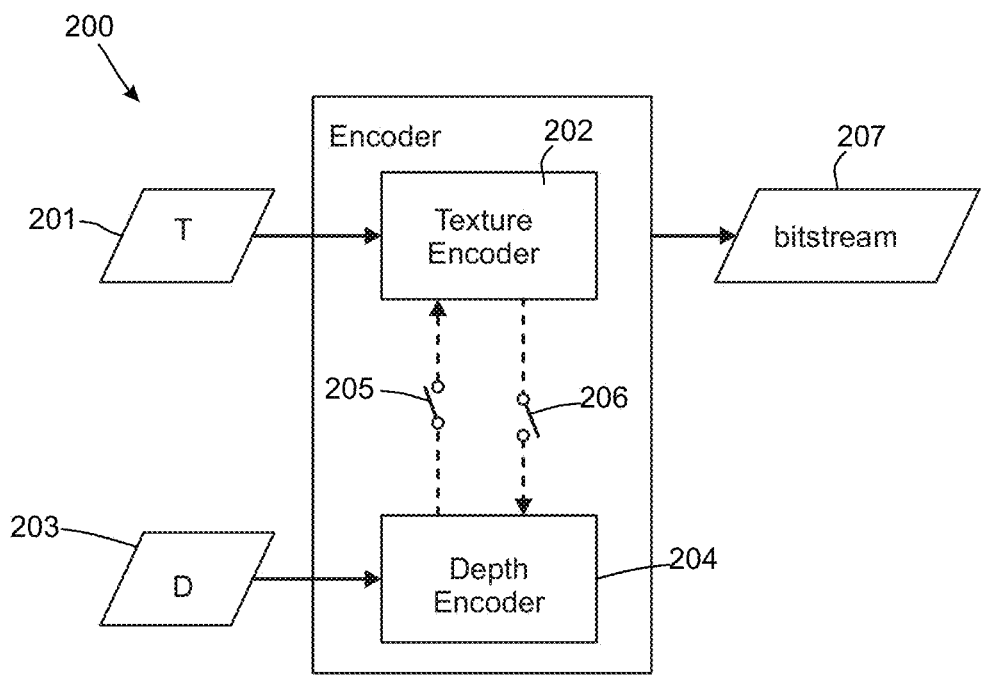
FIG. 8 shows a high level flow chart of an embodiment of an encoder capable of encoding texture views and depth views.
Figure 9:
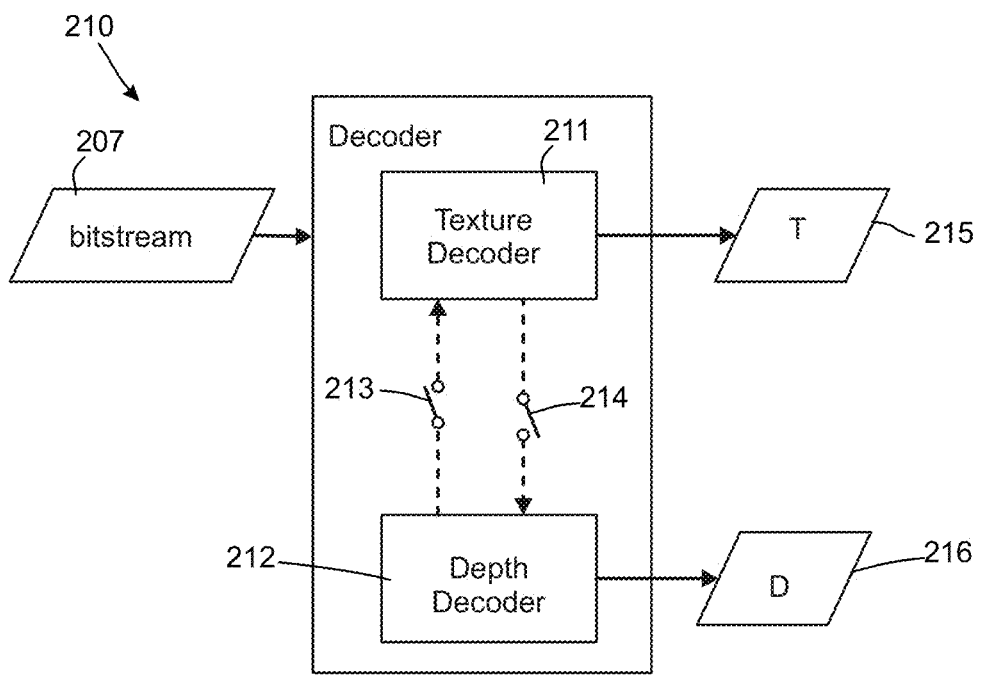
FIG. 9 shows a high level flow chart of an embodiment of a decoder capable of decoding texture views and depth views.

A high level flow chart of an embodiment of an encoder 200 capable of encoding texture views and depth views is presented in FIG. 8 and a decoder 210 capable of decoding texture views and depth views is presented in FIG. 9. On these figures solid lines depict general data flow and dashed lines show control information signaling. The encoder 200 may receive texture components 201 to be encoded by a texture encoder 202 and depth map components 203 to be encoded by a depth encoder 204. When the encoder 200 is encoding texture components according to AVC/MVC a first switch 205 may be switched off. When the encoder 200 is encoding enhanced texture components the first switch 205 may be switched on so that information generated by the depth encoder 204 may be provided to the texture encoder 202. The encoder of this example also comprises a second switch 206 which may be operated as follows. The second switch 206 is switched on when the encoder is encoding depth information of AVC/MVC views, and the second switch 206 is switched off when the encoder is encoding depth information of enhanced texture views. The encoder 200 may output a bitstream 207 containing encoded video information.

The decoder 210 may operate in a similar manner but at least partly in a reversed order. The decoder 210 may receive the bitstream 207 containing encoded video information. The decoder 210 comprises a texture decoder 211 for decoding texture information and a depth decoder 212 for decoding depth information. A third switch 213 may be provided to control information delivery from the depth decoder 212 to the texture decoder 211, and a fourth switch 214 may be provided to control information delivery from the texture decoder 211 to the depth decoder 212. When the decoder 210 is to decode AVC/MVC texture views the third switch 213 may be switched off and when the decoder 210 is to decode enhanced texture views the third switch 213 may be switched on. When the decoder 210 is to decode depth of AVC/MVC texture views the fourth switch 214 may be switched on and when the decoder 210 is to decode depth of enhanced texture views the fourth switch 214 may be switched off. The Decoder 210 may output reconstructed texture components 215 and reconstructed depth map components 216.

Many video encoders utilize the Lagrangian cost function to find rate-distortion optimal coding modes, for example the desired macroblock mode and associated motion vectors. This type of cost function uses a weighting factor or 2 to tie together the exact or estimated image distortion due to lossy coding methods and the exact or estimated amount of information required to represent the pixel/sample values in an image area. The Lagrangian cost function may be represented by the equation:

$$C=D+\lambda R$$

where C is the Lagrangian cost to be minimised, D is the image distortion (for example, the mean-squared error between the pixel/sample values in original image block and in coded image block) with the mode and motion vectors currently considered, λ is a Lagrangian coefficient and R is the number of bits needed to represent the required data to reconstruct the image block in the decoder (including the amount of data to represent the candidate motion vectors).

A coding standard may include a sub-bitstream extraction process, and such is specified for example in SVC, MVC, and HEVC. The sub-bitstream extraction process relates to converting a bitstream by removing NAL units to a sub-bitstream. The sub-bitstream still remains conforming to the standard. For example, in a draft HEVC standard, the bitstream created by excluding all VCL NAL units having a temporal_id greater than or equal to a selected value and including all other VCL NAL units remains conforming. Consequently, a picture having temporal_id equal to TID does not use any picture having a temporal_id greater than TID as inter prediction reference.

Parameter set syntax structures of other types than those presented earlier have also been proposed. In the following paragraphs, some of the proposed types of parameter sets are described.

It has been proposed that at least a subset of syntax elements that have conventionally been included in a slice header are included in a GOS (Group of Slices) parameter set by an encoder. An encoder may code a GOS parameter set as a NAL unit. GOS parameter set NAL units may be included in the bitstream together with for example coded slice NAL units, but may also be carried out-of-band as described earlier in the context of other parameter sets.

The GOS parameter set syntax structure may include an identifier, which may be used when referring to a particular GOS parameter set instance for example from a slice header or another GOS parameter set. Alternatively, the GOS parameter set syntax structure does not include an identifier but an identifier may be inferred by both the encoder and decoder for example using the bitstream order of GOS parameter set syntax structures and a pre-defined numbering scheme.

The encoder and the decoder may infer the contents or the instance of GOS parameter set from other syntax structures already encoded or decoded or present in the bitstream. For example, the slice header of the texture view component of the base view may implicitly form a GOS parameter set. The encoder and decoder may infer an identifier value for such inferred GOS parameter sets. For example, the GOS parameter set formed from the slice header of the texture view component of the base view may be inferred to have identifier value equal to 0.

A GOS parameter set may be valid within a particular access unit associated with it. For example, if a GOS parameter set syntax structure is included in the NAL unit sequence for a particular access unit, where the sequence is in decoding or bitstream order, the GOS parameter set may be valid from its appearance location until the end of the access unit. Alternatively, a GOS parameter set may be valid for many access units.

The encoder may encode many GOS parameter sets for an access unit. The encoder may determine to encode a GOS parameter set if it is known, expected, or estimated that at least a subset of syntax element values in a slice header to be coded would be the same in a subsequent slice header.

A limited numbering space may be used for the GOS parameter set identifier. For example, a fixed-length code may be used and may be interpreted as an unsigned integer value of a certain range. The encoder may use a GOS parameter set identifier value for a first GOS parameter set and subsequently for a second GOS parameter set, if the first GOS parameter set is subsequently not referred to for example by any slice header or GOS parameter set. The encoder may repeat a GOS parameter set syntax structure within the bitstream for example to achieve a better robustness against transmission errors.

Syntax elements which may be included in a GOS parameter set may be conceptually collected in sets of syntax elements. A set of syntax elements for a GOS parameter set may be formed for example on one or more of the following basis:

Syntax elements indicating a scalable layer and/or other scalability features

Syntax elements indicating a view and/or other multiview features

Syntax elements related to a particular component type, such as depth/disparity

Syntax elements related to access unit identification, decoding order and/or output order and/or other syntax elements which may stay unchanged for all slices of an access unit Syntax elements which may stay unchanged in all slices of a view component Syntax elements related to reference picture list modification Syntax elements related to the reference picture set used Syntax elements related to decoding reference picture marking Syntax elements related to prediction weight tables for weighted prediction Syntax elements for controlling deblocking filtering Syntax elements for controlling adaptive loop filtering Syntax elements for controlling sample adaptive offset Any combination of sets above For each syntax element set, the encoder may have one or more of the following options when coding a GOS parameter set:

The syntax element set may be coded into a GOS parameter set syntax structure, i.e. coded syntax element values of the syntax element set may be included in the GOS parameter set syntax structure.

The syntax element set may be included by reference into a GOS parameter set. The reference may be given as an identifier to another GOS parameter set. The encoder may use a different reference GOS parameter set for different syntax element sets.

The syntax element set may be indicated or inferred to be absent from the GOS parameter set.

The options from which the encoder is able to choose for a particular syntax element set when coding a GOS parameter set may depend on the type of the syntax element set. For example, a syntax element set related to scalable layers may always be present in a GOS parameter set, while the set of syntax elements which may stay unchanged in all slices of a view component may not be available for inclusion by reference but may be optionally present in the GOS parameter set and the syntax elements related to reference picture list modification may be included by reference in, included as such in, or be absent from a GOS parameter set syntax structure. The encoder may encode indications in the bitstream, for example in a GOS parameter set syntax structure, which option was used in encoding. The code table and/or entropy coding may depend on the type of the syntax element set. The decoder may use, based on the type of the syntax element set being decoded, the code table and/or entropy decoding that is matched with the code table and/or entropy encoding used by the encoder.

The encoder may have multiple means to indicate the association between a syntax element set and the GOS parameter set used as the source for the values of the syntax element set. For example, the encoder may encode a loop of syntax elements where each loop entry is encoded as syntax elements indicating a GOS parameter set identifier value used as a reference and identifying the syntax element sets copied from the reference GOP parameter set. In another example, the encoder may encode a number of syntax elements, each indicating a GOS parameter set. The last GOS parameter set in the loop containing a particular syntax element set is the reference for that syntax element set in the GOS parameter set the encoder is currently encoding into the bitstream. The decoder parses the encoded GOS parameter sets from the bitstream accordingly so as to reproduce the same GOS parameter sets as the encoder.

A header parameter set (HPS) was proposed in document JCTVC-J0109 (http://phenix.int-evry.fr/jct/doc_end_user/current_document.php?id=5972). An HPS is similar to GOS parameter set. A slice header is predicted from one or more HPSs. In other words, the values of slice header syntax elements can be selectively taken from one or more HPSs. If a picture consists of only one slice, the use of HPS is optional and a slice header can be included in the coded slice NAL unit instead. Two alternative approaches of the HPS design were proposed in JCTVC-J109: a single-AU HPS, where an HPS is applicable only to the slices within the same assess unit, and a multi-AU HPS, where an HPS may be applicable to slices in multiple access units. The two proposed approaches are similar in their syntax. The main differences between the two approaches arise from the fact that the single-AU HPS design requires transmission of an HPS for each access unit, while the multi-AU HPS design allows re-use of the same HPS across multiple AUs.

A camera parameter set (CPS) can be considered to be similar to APS, GOS parameter set, and HPS, but CPS may be intended to carry only camera parameters and view synthesis prediction parameters and potentially other parameters related to the depth views or the use of depth views.

Figure 2:
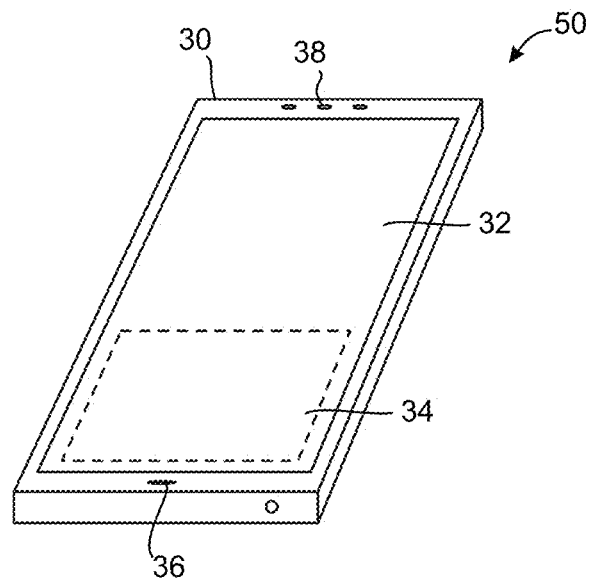
FIG. 2 shows schematically a user equipment suitable for employing some embodiments of the invention.

FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. In some embodiments the apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
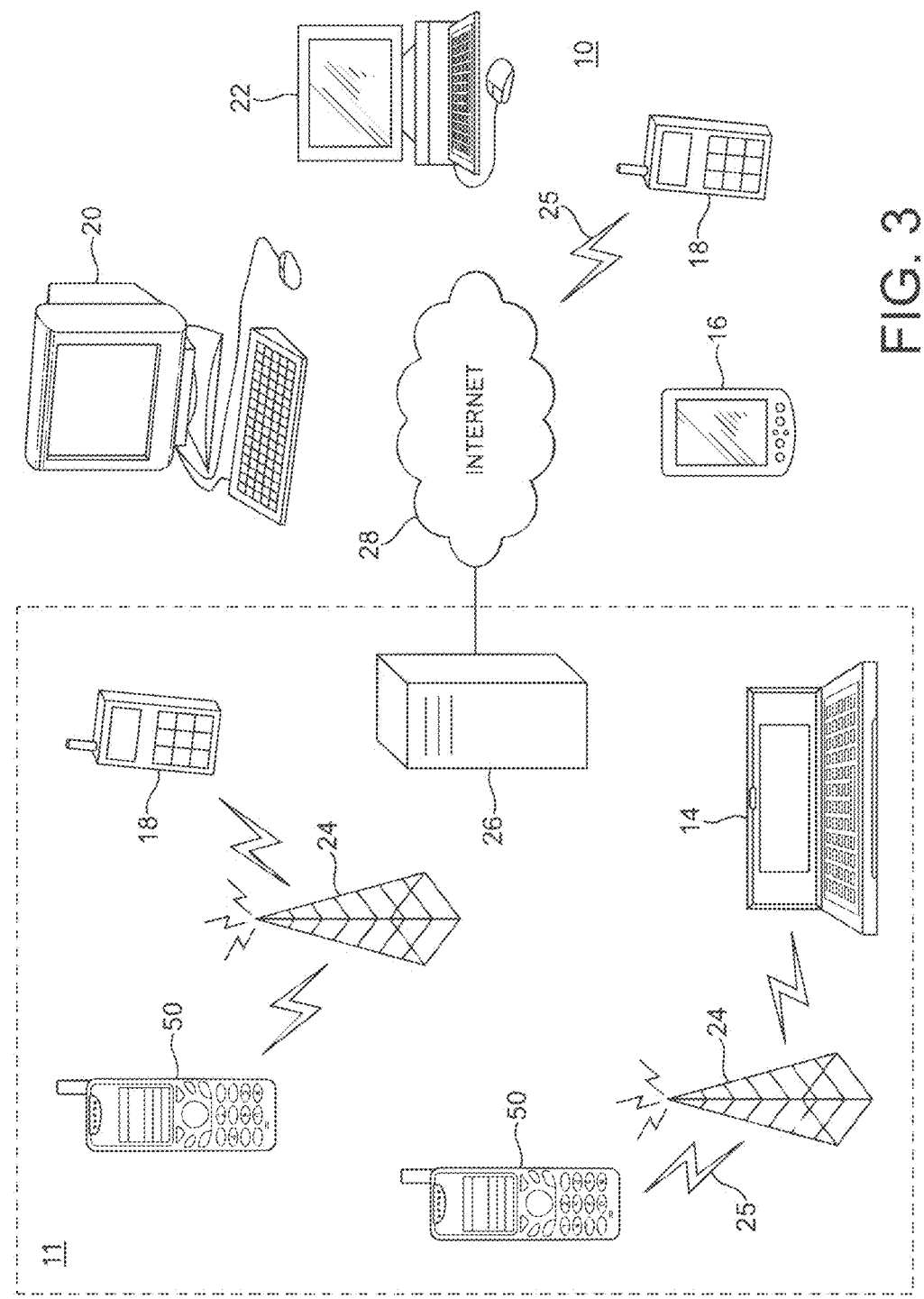
FIG. 3 further shows schematically electronic devices employing embodiments of the invention connected using wireless and wired network connections.

FIG. 3 shows an arrangement for video coding comprising a plurality of apparatuses, networks and network elements according to an example embodiment. With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
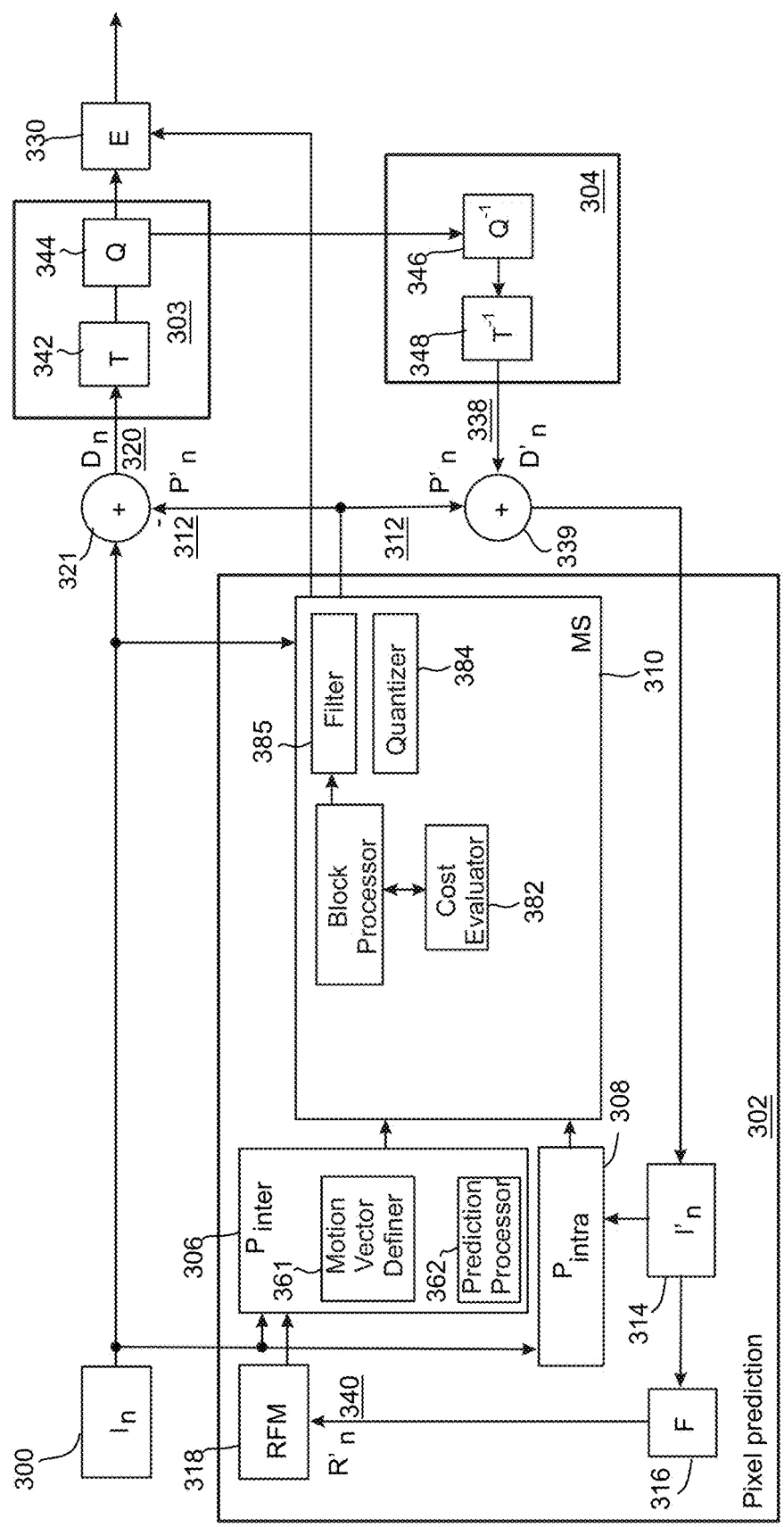
FIG. 4a shows schematically an embodiment of the invention as incorporated within an encoder.
Figure 4B:
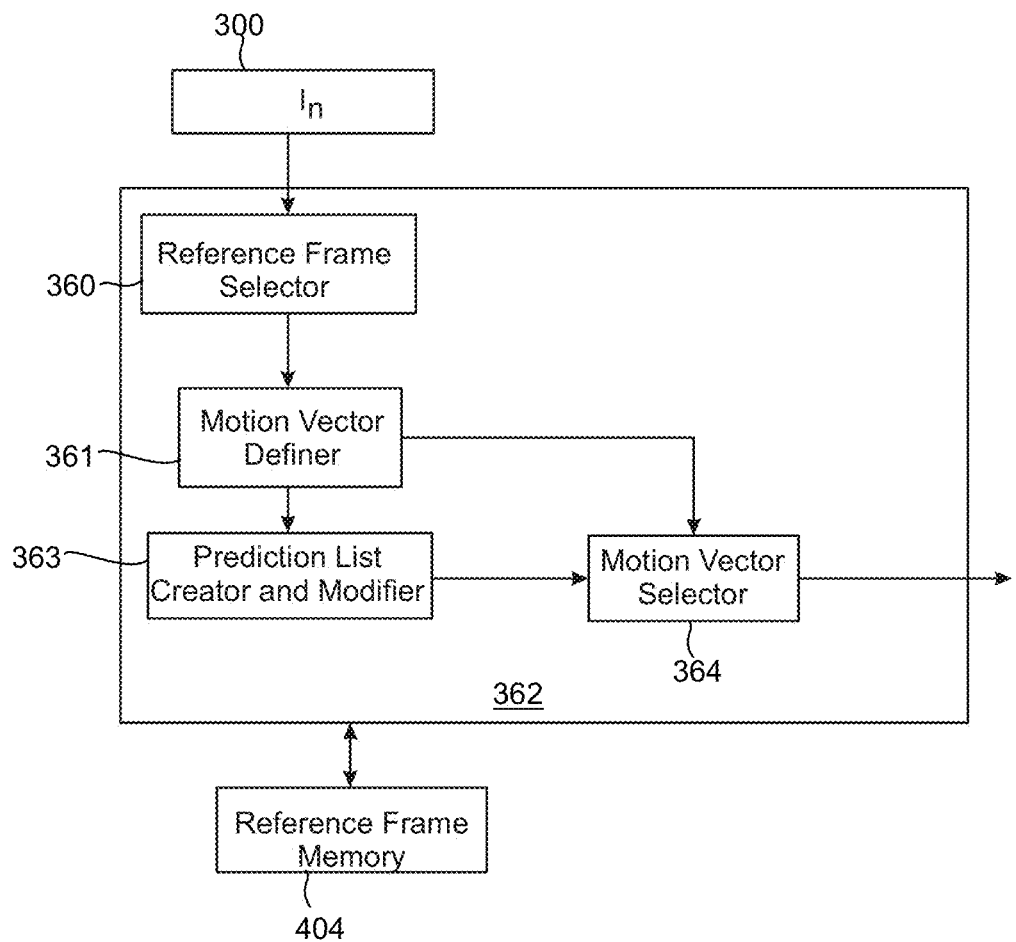
FIG. 4b shows schematically an embodiment of an inter predictor according to some embodiments of the invention.

FIGS. 4a and 4b show block diagrams for video encoding and decoding according to an example embodiment.

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. In this embodiment the mode selector 310 comprises a block processor 381 and a cost evaluator 382. The encoder may further comprise an entropy encoder 330 for entropy encoding the bit stream.

FIG. 4b depicts an embodiment of the inter predictor 306. The inter predictor 306 comprises a reference frame selector 360 for selecting reference frame or frames, a motion vector definer 361, a prediction list former 363 and a motion vector selector 364. These elements or some of them may be part of a prediction processor 362 or they may be implemented by using other means.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of a current frame or picture). The output of both the inter-predictor and the intra-predictor are passed to the mode selector 310. Both the inter-predictor 306 and the intra-predictor 308 may have more than one intra-prediction modes. Hence, the inter-prediction and the intra-prediction may be performed for each mode and the predicted signal may be provided to the mode selector 310. The mode selector 310 also receives a copy of the image 300.

The mode selector 310 determines which encoding mode to use to encode the current block. If the mode selector 310 decides to use an inter-prediction mode it will pass the output of the inter-predictor 306 to the output of the mode selector 310. If the mode selector 310 decides to use an intra-prediction mode it will pass the output of one of the intra-predictor modes to the output of the mode selector 310.

The mode selector 310 may use, in the cost evaluator block 382, for example Lagrangian cost functions to choose between coding modes and their parameter values, such as motion vectors, reference indexes, and intra prediction direction, typically on block basis. This kind of cost function may use a weighting factor lambda to tie together the (exact or estimated) image distortion due to lossy coding methods and the (exact or estimated) amount of information that is required to represent the pixel values in an image area: $C=D+\text{lambda} \times R$, where C is the Lagrangian cost to be minimized, D is the image distortion (e.g. Mean Squared Error) with the mode and their parameters, and R the number of bits needed to represent the required data to reconstruct the image block in the decoder (e.g. including the amount of data to represent the candidate motion vectors).

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations. In many embodiments the reference frame memory 318 may be capable of storing more than one decoded picture, and one or more of them may be used by the inter-predictor 306 as reference pictures against which the future images 300 are compared in inter prediction operations. The reference frame memory 318 may in some cases be also referred to as the Decoded Picture Buffer.

The operation of the pixel predictor 302 may be configured to carry out any known pixel prediction algorithm known in the art.

The pixel predictor 302 may also comprise a filter 385 to filter the predicted values before outputting them from the pixel predictor 302.

The operation of the prediction error encoder 302 and prediction error decoder 304 will be described hereafter in further detail. In the following examples the encoder generates images in terms of 16×16 pixel macroblocks which go to form the full image or picture. However, it is noted that FIG. 4a is not limited to block size 16×16, but any block size and shape can be used generally, and likewise FIG. 4a is not limited to partitioning of a picture to macroblocks but any other picture partitioning to blocks, such as coding units, may be used. Thus, for the following examples the pixel predictor 302 outputs a series of predicted macroblocks of size 16×16 pixels and the first summing device 321 outputs a series of 16×16 pixel residual data macroblocks which may represent the difference between a first macroblock in the image 300 against a predicted macroblock (output of pixel predictor 302).

The prediction error encoder 303 comprises a transform block 342 and a quantizer 344. The transform block 342 transforms the first prediction error signal 320 to a transform domain. The transform is, for example, the DCT transform or its variant. The quantizer 344 quantizes the transform domain signal, e.g. the DCT coefficients, to form quantized coefficients.

The prediction error decoder 304 receives the output from the prediction error encoder 303 and produces a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal approximately and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter parameters.

In the following the operation of an example embodiment of the inter predictor 306 will be described in more detail. The inter predictor 306 receives the current block for inter prediction. It is assumed that for the current block there already exists one or more neighboring blocks which have been encoded and motion vectors have been defined for them. For example, the block on the left side and/or the block above the current block may be such blocks. Spatial motion vector predictions for the current block can be formed e.g. by using the motion vectors of the encoded neighboring blocks and/or of non-neighbor blocks in the same slice or frame, using linear or non-linear functions of spatial motion vector predictions, using a combination of various spatial motion vector predictors with linear or non-linear operations, or by any other appropriate means that do not make use of temporal reference information. It may also be possible to obtain motion vector predictors by combining both spatial and temporal prediction information of one or more encoded blocks. These kinds of motion vector predictors may also be called as spatio-temporal motion vector predictors.

Reference frames used in encoding may be stored to the reference frame memory. Each reference frame may be included in one or more of the reference picture lists, within a reference picture list, each entry has a reference index which identifies the reference frame. When a reference frame is no longer used as a reference frame it may be removed from the reference frame memory or marked as "unused for reference" or a non-reference frame wherein the storage location of that reference frame may be occupied for a new reference frame.

As described above, an access unit may contain slices of different component types (e.g. primary texture component, redundant texture component, auxiliary component, depth/disparity component), of different views, and of different scalable layers. A component picture may be defined as a collective term for a dependency representation, a layer representation, a texture view component, a depth view component, a depth map, or anything like. Coded component pictures may be separated from each other using a component picture delimiter NAL unit, which may also carry common syntax element values to be used for decoding of the coded slices of the component picture. An access unit can consist of a relatively large number of component pictures, such as coded texture and depth view components as well as dependency and layer representations. The coded size of some component pictures may be relatively small for example because they can be considered to represent deltas relative to base view or base layer and because depth component pictures may be relatively easy to compress. When component picture delimiter NAL units are present in the bitstream, a component picture may be defined as a component picture delimiter NAL unit and the subsequent coded slice NAL units until the end of the access unit or until the next component picture delimiter NAL unit, exclusive, whichever is earlier in decoding order.

In MVC+D as specified in MPEG document N12923 as well as 3D-AVC as specified in MPEG document N12732, the number of depth views in a bitstream is required to be equal to the number of texture views in the same bitstream. Furthermore, the depth views in a bitstream are required to co-locate with the texture views of the same bitstream. In other words, the depth views of a bitstream represent the depth or disparity information of the texture views of the bitstream. Furthermore, the samples of a depth picture are required to cover the same spatial area of than the samples of the respective texture picture. In other words, depth information for each texture sample is present in a depth picture and there are no samples in a depth picture for which the respective texture sample or samples would not be present in a texture picture.

However, it may be desirable that the number of depth views in a bitstream is unequal to the number of texture views in the same bitstream, and/or that some or all of the depth views do not co-locate with any of the texture views, and/or that the depth pictures cover a different spatial area with respect to the respective texture pictures. Examples of why such schemes may be desirable include but are not limited to those given in the following paragraphs.

In some 3D video and image capturing systems a specific sensor or sensor array, for example based on time-of-flight principle, may be used for depth or distance sensing and such sensor or sensor array may be different from that or those used for capturing regular color image/images, e.g. charge-coupled device (CCD) sensor or complementary metal oxide semiconductor (CMOS) sensor. The differences may include different resolutions, aspect ratios, spatial locations, with respect to captured 3D scene and/or camera parameters for texture and depth sensors. Depth pictures are therefore captured from a different viewpoint (i.e. from a different location of the depth sensor/sensors) compared to the viewpoint of the texture pictures (i.e. the location of the color image sensor/sensors). Consequently, the output of the capturing system may comprise depth views that are not co-located with texture views, since the respective sensors are in different spatial location within the capturing device or multi-device arrangement, such as a camera rig. A depth sensor may also have different characteristics compared to a color image sensor e.g. when it comes to physical size of the sensor and pixel/sample resolution, sample aspect ratio and/or picture aspect ratio. Alternatively or in addition, a depth sensor might not be calibrated jointly with color image sensor(s) or depth images might not be rectified with color images. Alternatively or in addition, a depth sensor may have different camera parameters, e.g. extrinsic and intrinsic camera parameters, such as focal length, when compared to those of a color image sensor. It should therefore be understood that the image area covered by a depth sensor may be unequal compared to that covered by a color image sensor in the same 3D capturing system.

A camera may include an optical arrangement, such as micro-lenses, and/or optical filters passing only certain wavelength ranges. In such arrangements, for example, different sensor arrays or different parts of a sensor array may be used to capture different wavelength ranges. In another example, a lenslet array is used, and each lenslet views the scene at a slightly different angle. Consequently, the image may consist of an array of micro-images, each corresponding to one lenslet, which represent the scene captured at slightly different angles. Furthermore, depth ranging for example using infrared wavelength may be done with such a micro-lens or lenslet arrangement or similar. However, the viewpoint of the depth view in such an arrangement may be slightly different from that of a texture view even if both were captured with the same sensor. Consequently, the output of the capturing system may comprise depth views that are not co-located with texture views.

In stereo matching, a disparity search may be performed in a one-directional manner, i.e. for each sample in a first view component (e.g. a picture of the left view), the corresponding sample in a second view component (e.g. a picture of the right view) is searched. However, in order to find a disparity for each sample in the second view component, it may be needed that the stereo matching is performed again at least for some samples to find a corresponding sample in the first view component. There may be several reasons to perform stereo matching only in one direction, i.e. for one view (or generally for a subset of views) including but not limited to the following:

1. Stereo matching or depth estimation may be done for a subset of views to save computational resources and/or memory resources and/or battery power/charging level. To produce a second view of depth, depth estimation should be repeated, which may double computation and memory requirements.
2. The content may be intended and/or restricted to be modified only in such a manner that a synthesized view is located relatively close to the view for which the depth picture is derived such that the view synthesis quality is concluded or estimated to be sufficiently good even if only a subset of views are associated with respective depth views.
3. It may be known or signaled that the rendering device performs DIBR in such a manner that a synthesized view is located relatively close to the view for which the depth picture is derived such that the view synthesis quality is concluded or estimated to be sufficiently good even if only a subset of views are associated with respective depth views.

With reference to items 2 and 3 in the list above, an example of a bitstream comprising two texture views and one depth view, referred to as 2T+1D, can be considered. 2T+1D format can enable rendering capabilities through Depth Image-based Rendering. A virtual texture view can be synthesized within some viewing angle range from an available texture view. Being combined with a second texture view displayed together with synthesized view, 2T+1D scheme can enable stereoscopic displays with adjustable stereo baseline functionality. It should be understood that high quality view synthesis may be available within a smaller viewing range compared to the conventional 2T+2D MVD data due to occlusion/disocclusions that may appear in synthesized views. However, it is believed that some use cases and/or applications might be satisfied with a rendering range provided by 2T+1D format and advanced post-processing techniques, such as in-painting or hole filling, would be able to conceal the occlusion/disocclusions problem.

In some capturing arrangements, there are more than one color image sensor, e.g. a stereoscopic color image camera, and a ranging or distance sensing camera (or generally many depth ranging cameras). Through stereo matching or depth estimation, one or more depth views may be obtained, but depth views may represent a subset of the viewpoints compared to those of the texture views obtained by the color image sensors (e.g. due to any of the reasons explained above). In addition, there may be depth views originating from the ranging sensor(s), which are not co-located with the texture views.

It may be desirable to encode and consequently decode a smaller number of depth views compared to the number of texture views in order to e.g. reduce power consumption, processing power usage, memory access bandwidth and memory space requirements. For example, coding/decoding a single view of depth map data instead of two views can provide complexity reduction for codec compared to the complete MVD data comprising two views of texture and depth.

Therefore, in the present invention methods for encoding, decoding, and processing depth-enhanced multiview video are presented, where there may be an unequal number of texture and depth views, and/or some of the texture views might not have a co-located depth view, and/or some of the depth views might not have a co-located texture view, some of the depth view components might not be temporally coinciding with texture view components or vice versa, co-located texture and depth views might cover a different spatial area, and/or there may be more than one type of depth view components. Some, non-limiting embodiments of the invention are presented below.

In description of various embodiments, terms co-located, collocated, and overlapping may be used interchangeably to indicate that a certain sample or area in a texture view component represents the same physical objects or fragments of 3D scene as a certain co-located/collocated/overlapping sample or area in a depth view component. In some embodiments, the sampling grid of a texture view component may be the same as the sampling grid of a depth view component, i.e. one sample of a component image, such as a luma image, of a texture view component corresponds to one sample of a depth view component, i.e. the physical dimensions of a sample match between a component image, such as a luma image, of a texture view component and the corresponding depth view component. In some embodiments, sample dimensions (twidth×theight) of a sampling grid of a component image, such as a luma image, of a texture view component may be an integer multiple of sample dimensions (dwidth×dheight) of a sampling grid of a depth view component, i.e. twidth=m×dwidth and theight=n×dheight, where m and n are positive integers. In some embodiments, dwidth=m×twidth and dheight=n×theight, where m and n are positive integers. In some embodiments, twidth=m×dwidth and theight=n×dheight or alternatively dwidth=m×twidth and dheight=n×theight, where m and n are positive values and may be non-integer. In these embodiments, an interpolation scheme may be used in the encoder and in the decoder and in the view synthesis process and other processes to derive co-located sample values between texture and depth. In some embodiments, the physical position of a sampling grid of a component image, such as a luma image, of a texture view component may match that of the corresponding depth view and the sample dimensions of a component image, such as a luma image, of the texture view component may be an integer multiple of sample dimensions (dwidth×dheight) of a sampling grid of the depth view component (or vice versa)—then, the texture view component and the depth view component may be considered to be co-located and represent the same viewpoint. In some embodiments, the position of a sampling grid of a component image, such as a luma image, of a texture view component may have an integer-sample offset relative to the sampling grid position of a depth view component, or vice versa. In other words, a top-left sample of a sampling grid of a component image, such as a luma image, of a texture view component may correspond to the sample at position (x, y) in the sampling grid of a depth view component, or vice versa, where x and y are non-negative integers in a two-dimensional Cartesian coordinate system with non-negative values only and origo in the top-left corner. In some embodiments, the values of x and/or y may be non-integer and consequently an interpolation scheme may be used in the encoder and in the decoder and in the view synthesis process and other processes to derive co-located sample values between texture and depth. In some embodiments, the sampling grid of a component image, such as a luma image, of a texture view component may have unequal extents compared to those of the sampling grid of a depth view component. In other words, the number of samples in horizontal and/or vertical direction in a sampling grid of a component image, such as a luma image, of a texture view component may differ from the number of samples in horizontal and/or vertical direction, respectively, in a sampling grid of a depth view component and/or the physical width and/or height of a sampling grid of a component image, such as a luma image, of a texture view component may differ from the physical width and/or height, respectively, of a sampling grid of a depth view component. In some embodiments, non-uniform and/or non-matching sample grids can be utilized for texture and/or depth component. A sample grid of depth view component is non-matching with the sample grid of a texture view component when the sampling grid of a component image, such as a luma image, of the texture view component is not an integer multiple of sample dimensions (dwidth×dheight) of a sampling grid of the depth view component or the sampling grid position of a component image, such as a luma image, of the texture view component has a non-integer offset compared to the sampling grid position of the depth view component or the sampling grids of the depth view component and the texture view component are not aligned/rectified. This could happen for example on purpose to reduce redundancy of data in one of the components or due to inaccuracy of the calibration/rectification process between a depth sensor and a color image sensor.

In some embodiments of the invention, an encoder inputs a different number of depth views compared to the number of texture views and/or omits encoding of depth views in such a manner that the number of coded depth views differs from the number of coded texture views. Additionally or alternatively, the encoder may input or conclude that at least one depth view for encoding has a different viewpoint or is not co-located with any of the texture views for encoding. In some embodiments, the number of coded depth views may be equal to the number of coded texture views but at least one coded depth view has a different viewpoint or is not co-located with any of the coded texture views. For example, depth views may not collocate with any of present texture view and represent information from a viewing angle spaced between present texture views or outside of a viewing angle of the present texture views.

In various embodiments, the encoder and/or another unit connected to the encoder (e.g. an application using the encoder) may perform one or more of the following steps among others:

1. Determining which ones of the input texture and depth views are encoded.
2. Determining inter-view prediction hierarchy of texture views and depth views.
3. Determining view component order within an access unit, also referred to as AU view component order.
4. Encoding one or more indications of which ones of the input texture and depth views are encoded, inter-view prediction hierarchy of texture views and depth views, and/or AU view component order into a bitstream.
5. As a response of a depth view required as a reference or input for prediction (such as view synthesis prediction, inter-view prediction, inter-component prediction, and/or alike) and/or for view synthesis performed as post-processing for decoding and the depth view not input to the encoder or determined not to be coded, performing the following:
    Deriving the depth view, one or more depth view components for the depth view, or parts of one or more depth view components for the depth view on the basis of coded depth views and/or coded texture views and/or reconstructed depth views and/or reconstructed texture views or parts of them. The derivation may be based on view synthesis or DIBR, for example.
    Using the derived depth view as a reference or input for prediction (such as view synthesis prediction, inter-view prediction, inter-component prediction, and/or alike) and/or for view synthesis performed as post-processing for decoding.
6. Inferring the use of one or more coding tools, modes of coding tools, and/or coding parameters for coding a texture view based on the presence or absence of a respective coded depth view and/or the presence or absence of a respective derived depth view. In some embodiments, when a depth view is required as a reference or input for prediction (such as view synthesis prediction, inter-view prediction, inter-component prediction, and/or alike) but is not encoded, the encoder may
    derive the depth view; or
    infer that coding tools causing a depth view to be required as reference or input for prediction are turned off; or
    select one of the above adaptively and encode the chosen option and related parameter values, if any, as one or more indications into the bitstream.
7. Forming an inter-component prediction signal or prediction block or alike from a depth view component (or, generally from one or more depth view components) to a texture view component (or, generally to one or more texture view components) for a subset of predicted blocks in a texture view component on the basis of availability of co-located samples or blocks in a depth view component. Similarly, forming an inter-component prediction signal or a prediction block or alike from a texture view component (or, generally from one or more texture view components) to a depth view component (or, generally to one or more depth view components) for a subset of predicted blocks in a depth view component on the basis of availability of co-located samples or blocks in a texture view component.
8. Forming a view synthesis prediction signal or a prediction block or alike for a texture block on the basis of availability of co-located depth samples.

It should be understood that the above-mentioned steps need not be executed in the order given above. For example, steps 1 to 3 may be considered related and may be performed as a joint process or in a different order than presented above.

In some embodiments, the encoder and/or another unit connected to the encoder (e.g. an application using the encoder) makes a decision which ones of the input texture and depth views are encoded. The decision may be made for example once per content item (e.g. a video file) or session (e.g. a video telephone connection or call), or a decision may be made multiple times during content item or session, i.e. the coded texture and depth views may be allowed to change within a content item or session. The encoder process or reasoning for making a decision on coded texture and depth views may include but is not limited to one or more of the following:

1. The encoder may be configured to input the number of coded depth views and/or the number of coded texture views e.g. from application settings.
2. The encoder may determine which depth views are coded based on the view synthesis, inter-view, and/or inter-component prediction hierarchy in use. If a depth view is used as a reference for prediction for view synthesis, inter-view and/or inter-component prediction, the encoder may determine to code the depth view. Otherwise, if a depth view is not used as a reference for prediction for view synthesis, inter-view and/or inter-component prediction, the encoder may determine to omit the encoding of the depth view.
3. Similarly to the previous item, the encoder may select which depth views are coded and which depth views are omitted based on the inter-component prediction tools and/or which type of view synthesis prediction (such as forward VSP or backward VSP) are in use, i.e. based on whether a depth view is needed for coding any other view or views. Such determination may be based for example on one or more of the following:

The encoder may perform an optimization process which coded texture and depth views, inter-component coding and/or view synthesis prediction tools, and AU view component order perform better than some others for example in rate-distortion (or some other cost) metrics.

The encoder may be configured to use or may determine to use certain coding tools, coding modes, and/or coding parameters, which impose constraints on which depth views are coded. For example, if forward VSP is used as described earlier, both the texture view component and the respective depth view component of a view that is used as a reference for view synthesis prediction may be required to be coded.
4. The encoder may execute a VSO method or alike to determine if a coded depth view would bring a rate-distortion (or other cost metrics) benefit for other views that would be able to use the coded depth view as a reference for prediction (such as view synthesis, inter-view, or inter-component prediction). For the VSO method or alike, the encoder may use for example only the view components of the first access unit or the first GOP. If the coding and decoding process enable deriving a depth view on the basis of coded depth views and/or coded texture views and/or reconstructed depth views and/or reconstructed texture views or parts of them, the VSO method or alike of the encoder may compare the rate-distortion (or other cost metrics) impact of coding the depth view or deriving the depth view as part of the coding/decoding process. If a coded depth view brings a rate-distortion benefit, the encoder may determine to encode the depth view—otherwise, the encoder may determine to omit the encoding of the depth view.
5. The encoder may be configured to input the expected or known viewpoints or the expected or known range of viewpoints for synthesized view components for view synthesis done as post-processing for decoding. The encoder may execute a VSO method or alike to determine if a coded depth view would bring a rate-distortion (or other cost metrics) benefit for the expected or known viewpoints or the expected or known range of viewpoints for synthesized view components (compared to synthesizing the same viewpoints on the basis of the depth views that would otherwise be available). For the VSO method or alike, the encoder may use for example only the view components of the first access unit or the first GOP. If a coded depth view brings a rate-distortion benefit, the encoder may determine to encode the depth view— otherwise, the encoder may determine to omit the encoding of the depth view.

Determining inter-view prediction hierarchy of texture views and depth views may be done in the encoder for example as follows.

In some embodiments, the encoder may be configured to choose certain identical inter-view dependency order for texture views and depth views. Alternatively or in addition, the encoder may perform an optimization process which identical inter-view dependency order performs better than some others for example using rate-distortion metrics.

In some embodiments, the encoder selects the inter-view dependency order for texture views differently from depth views. For example, the encoder may be configured to choose certain inter-view dependency order for texture views and depth views. Alternatively or in addition, the encoder may perform an optimization process which inter-view dependency order performs better than some others for texture views and depth views for example using rate-distortion metrics.

In some embodiments, the encoder may, alternatively or additionally to selection of inter-view dependency order in other embodiments, select the inter-view dependency order for texture and depth views and/or the AU view component order based on the type of depth maps within the depth views and/or the types of prediction depth maps are used. If more than one depth map represents disparity, the encoder may select the inter-view dependency order and/or the AU view component order for depth views in such a manner that the inter-view dependency order and/or the AU view component order of depth views is aligned with the order of views over which the disparity maps are derived. Furthermore, if the encoder uses backward VSP, the encoder may select inter-view dependency order of texture views and the AU view component of texture and depth views in such a manner that backward VSP using the depth view component representing disparity maps can be used directly, without converting sample values of the depth view component. In an example three cameras in a one-dimensional parallel setup were used to capture a multiview video sequence and stereo matching was used to generate two disparity maps, the first disparity map including disparity values from the left camera to the right camera and the second disparity map including disparity values from the right camera to the mid camera. Continuing the same example, backward VSP may be used and texture views may be coded in the order of the left view, the right view, and the mid view. The first disparity map may be coded prior to the second disparity map. The first disparity map and a texture view component of the left view may be used in backward VSP for a texture view component of the right view. Subsequently, the second disparity map and the texture view component of the right view may be used in backward VSP for a texture view component of the mid view.

In the following paragraphs, exemplary descriptions and/or further details of some of the encoder processes or reasoning for making a decision on coded texture and depth views are given.

As stated above, in some embodiments the encoder may determine which depth views are coded based on the inter-view and inter-component prediction hierarchy in use. The encoder may be configured to input the inter-view and/or inter-component prediction dependency hierarchy, and/or pre-defined inter-view and/or inter-component prediction dependency hierarchy may be used, or a cost function, such as rate-distortion optimization, may be performed to determine the inter-view and/or inter-component prediction dependency hierarchy. The encoder may also determine the coding/decoding order of texture and depth view components, which may be based on the determination of the inter-view and inter-component prediction dependency hierarchy. Alternatively, the encoder may be configured to input the coding/decoding order of texture and depth view components, or may use a pre-defined coding/decoding order of texture and depth view components, or a cost function, such as rate-distortion optimization, may be performed to determine coding/decoding order of texture and depth view components. Consequently, based on the coding/decoding order of texture and depth view components, the encoder may determine the inter-view and/or inter-component prediction dependency hierarchy.

For example, the encoder is configured to use "PIP" inter-view prediction hierarchy for coding of three views. In the PIP inter-view prediction hierarchy, the middle texture view is coded as a base texture view and the texture views on the left and on the right may use inter-view prediction from the base texture view. Continuing the same example, the encoder is configured not to use inter-component prediction and the use view synthesis prediction for the texture views on the left and on the right (i.e. the "P" texture views). If forward VSP is used, the middle depth view is needed to form a view synthesis prediction signal and determined to be coded by the encoder, and consequently coding of the depth views on the left and on the right may be omitted. If backward VSP is used, the middle depth view might not be needed to form a view synthesis prediction signal and its coding may be omitted, while the left and right depth views are used to form view synthesis prediction signal and are therefore determined to be coded by the encoder. Since in the mentioned backward VSP case the middle depth view is not coded, one of the left view and the right view may be selected as a base depth view while the other one may use inter-view prediction from the base depth view.

In some embodiments, the encoder may be configured to input the expected or known viewpoints or the expected or known range of viewpoints for synthesized view components for view synthesis done as post-processing for decoding. For example, the user may assist in content encoding to set a range of viewpoints that result into a desirable multi-view rendering experience. In another example, disparity characteristics and/or respective perceived depth characteristics, such as maximum positive disparity and/or minimum negative disparity and/or disparity distribution, resulting from different synthesized views may be used to determine the desired/allowed synthesized viewpoints or the desired/allowed synthesized viewpoint range. In another example, the encoding side is capable of receiving information of the display and viewing environment of the decoding side device(s) or terminal(s). For example, in a video telephone or video conferencing application, there can be provided a signaling mechanism that a receiver (which may also be referred to as the decoding side) indicates characteristics of its rendering environment to the encoding side. These characteristics may include but are not limited to one or more of the following: the number of views displayed simultaneously, horizontal and vertical resolution of the display or viewing window in terms of samples or component samples (e.g. red, green, and blue pixel components), which may be given separately for each view, horizontal and vertical size of the display area or viewing window, the viewing distance (e.g. a recommended viewing distance or a detected viewing distance of one or more viewers), the views or viewpoints being displayed and/or the baseline difference/distance between the views or viewpoints being displayed. As the characteristics may be varying as a function of time, the receiver may have means to signal new values of the characteristics during a session. For example, one or more new codec control messages may be specified similarly to the codec control messages specified in IETF RFC 5104. The codec control messages may use the Audio-Visual Profile with Feedback (AVPF, IETF RFC 4585) to convey messages over the Real-Time Transport Control Protocol (RTCP, IETF RFC 3550).

On the basis of the expected or known viewpoints or the expected or known range of viewpoints for synthesized view components for view synthesis done as post-processing for decoding, the encoder may execute a VSO method or alike to determine if a coded depth view would bring a rate-distortion (or other cost metrics) benefit for the expected or known viewpoints or the expected or known range of viewpoints for synthesized view components (compared to synthesizing the same viewpoints on the basis of the depth views that would otherwise be available). For the VSO method or alike, the encoder may use for example only the view components of the first access unit or the first GOP. If a coded depth view brings a rate-distortion benefit, the encoder may determine to encode the depth view—otherwise, the encoder may determine to omit the encoding of the depth view.

In some embodiments, the encoder side and/or the decoder side may use forward view synthesis of depth view components into the expected or known viewpoints or the expected or known range of viewpoints for synthesized view components. Subsequently, the encoder side and/or the decoder side may use backward view synthesis of texture view components based on the forward-synthesized depth view components. In some embodiments, the encoder may execute a VSO method or alike to determine if a coded depth view without a respective coded texture view in combination with the described view synthesis process would bring a rate-distortion (or other cost metrics) benefit for the expected or known viewpoints or the expected or known range of viewpoints for synthesized view components (compared to synthesizing the same viewpoints on the basis of the depth views that would otherwise be coded). In some embodiments, the encoder may be pre-defined or configured to input depth views or viewpoints that are to be coded without the respective texture view component. In some embodiments, the encoder might not receive as input the depth views that do not have a respective texture view and the encoder may subsequently perform forward view synthesis of depth views to generate such a depth view that is not received as input and is to be encoded. The encoder may encode one or more indications on the use and parameters of forward depth view synthesis and backward texture view synthesis and include the one or more indications in the bitstream for example in a video parameter set, a sequence parameter set, a supplemental enhancement information, or any other syntax structure. The decoder may receive and decode from the bitstream one or more indications on the use and parameters of forward depth view synthesis and backward texture view synthesis and perform view synthesis prediction and/or view synthesis by post-processing of decoding according to the decoded indications.

In some embodiments, the encoder may be configured to input or to generate a non-linear disparity map, which might not represent real-world disparity but rather in which disparities are spatially or locally adapted. The spatial or local adaptation may be performed for example in a user-assisted manner and/or through solving an energy minimization problem. The energy minimization problem may for example be formulated in terms of an equation or formula with several terms which may include but are not limited to sparse stereo correspondences, visual importance or saliency, and temporal consistency. A non-linear disparity map may for example indicate a different disparity for a foreground object compared to the actual disparity of the foreground object, while the disparity of the background of the scene may reflect its actual disparity. A non-linear disparity map may be input or generated by the encoder for a viewpoint of a coded texture view component and the non-linear disparity map may be used for forward view synthesis by the encoder side and/or the decoder side (in view synthesis prediction and/or view synthesis for post-processing of decoding). Alternatively or in addition, a non-linear disparity map may be input or generated by the encoder for a viewpoint for which no texture view component is coded and the non-linear disparity map may be used for backward view synthesis by the encoder side and/or the decoder side (in view synthesis prediction and/or view synthesis for post-processing of decoding). In some embodiments, the encoder encodes and includes one or more indications of the use and parameters for a non-linear disparity map into the bitstream (e.g. in a sequence parameter set or a supplemental enhancement information message or any other syntax structure). For example, the encoder may include a range or a list of viewpoints (e.g. as translational camera position relative to a reference camera position) for which the non-linear disparity map may be applied using pre-defined, linear, or signaled scaling of the disparity values in the non-linear disparity map. The encoder may encode the non-linear disparity map identically or similarly to any other type of depth or disparity maps, and the decoder may decode the non-linear disparity map identically or similarly to any other type of depth or disparity maps. In some embodiments, the decoder receives from the bitstream and decodes one or more indications of the use and parameters for a non-linear disparity map. The decoder may conclude based on the one or more indications that a viewpoint required for view synthesis prediction or desired for rendering/displaying is within a range or list of viewpoints where the non-linear disparity map can be applied. The decoder may subsequently apply a disparity compensation or view synthesis or DIBR algorithm to generate a view component for the required/desired viewpoint on the basis of the non-linear disparity map. If a view is determined to be synthesized at the viewpoint corresponding to a received non-linear disparity map, view synthesis or DIBR can be applied on the basis of the non-linear disparity map and would be similar to backward view synthesis. If a view is determined to be synthesized at a viewpoint not co-locating with any coded non-linear disparity map, forward view synthesis may be directly applied from a viewpoint for which both a texture view and a depth/disparity view are available (either received or synthesized in a preceding step). Alternatively or in addition, forward view synthesis of a depth/disparity view, e.g. on the basis of the non-linear disparity map, may first be done to the desired viewpoint resulting e.g. into a scaled non-linear disparity map. The scaled non-linear disparity map may then be used for backward view synthesis to obtain a synthesized texture view for the desired viewpoint.

In some embodiments, the encoder may encode more than one depth view for the same viewpoint or camera position. Reasons for the encoder or encoding side to encode more than one depth view for the same viewpoint may include but are not limited to one or more of the following:

A first depth view and a second depth view to be coded for the same viewpoint may have a different origin. For example, the first depth view may originate from a depth range sensor and is projected to the viewpoint and the second depth view may result from stereo matching between a pair of color images of a stereoscopic camera. In another example, a camera arrangement with three color image sensors may be used. The first depth view for the mid camera may be generated through stereo matching of the left view/camera and the mid camera, while the second depth view for the mid camera may be generated through stereo matching of the right view/camera and the mid camera. The decoder side may for example fuse for example through averaging or median filtering depth samples from different depth maps representing the same viewpoint (and the same time instant) and use the fused depth samples in view synthesis.

A first depth view and a second depth view to be coded for the same viewpoint may represent depth or disparity that is to be applied towards a specific or indicated direction or viewpoint relative to the viewpoint of the first and second depth views. For example, a first depth view may represent a disparity map that may be applied for forward view synthesis towards left from the viewpoint of the first and second depth views and the second depth view may represent a disparity map that may be applied for forward view synthesis towards right from the viewpoint of the first and second depth views. The decoder side may choose the applied depth view among many depth views for the same view point to be used in view synthesis based on the direction of the synthesized viewpoint relative to the viewpoint of the depth view.

A first depth view and a second depth view to be coded for the same viewpoint may represent different non-linear disparity maps that may be applied in different display arrangements or viewing situations. The encoder may indicate the display arrangement or viewing situation associated with a depth view within the bitstream, for example in a video parameter set structure, a sequence parameter set structure, a SEI message, or any other syntax structure. The display arrangement or view situation may be characterized by one or more parameters and coded as one or more syntax elements. For example, the parameters characterizing the display arrangement or viewing situation may include but are not limited to one or more of the following: the picture aspect ratio of the view(s) to be displayed, the sample aspect ratio of the view(s) to be displayed, the perceived depth range or approximate/exact perceived depth statistics of the view(s) to be displayed, the reference display width and/or viewing distance for a viewing situation. The decoder side may choose the non-linear disparity map to be used for view synthesis based on the known or estimated display characteristics and/or viewing conditions for example in a manner that selected known or estimated display characteristics and/or viewing conditions match with parameters signaled in the bitstream for the selected non-linear disparity map and/or the difference of the known or estimated display characteristics and/or viewing conditions relative to the parameters signaled in the bitstream for the selected non-linear disparity map is as small as possible.

In some embodiments, the encoder may be pre-defined, may input controls to use, or may determine to use one or more of the following cases of temporally unpaired depth views:
  a different picture rate in coding of one or more depth views when compared to the picture rate of some other depth views and/or texture views;
  unsynchronized capturing, i.e. different capturing (and consequently potentially also different output or display) instances between pictures of a depth view compared to pictures of another depth view and/or pictures of a texture view, even if the picture rate in these views were the same;
  non-time-overlapping and/or irregular capturing periods, e.g. a depth view may be captured for a shorter time compared to a texture view or capturing of a depth view may be paused for a short duration and continued after that short duration.

Reasons for the encoder side to use or code one or more temporally unpaired depth views may include but are not limited to one or more of the following:
  A depth view may originate from a sensor that has inherently a different temporal resolution or picture rate than color image sensors in the same capturing arrangement and consequently depth views derived by applying stereo matching to texture views obtained with color image sensors. For example, a ranging camera may operate at a temporal resolution of 15 pictures per second, whereas a color image sensor may operate at a temporal resolution of 60 frames per second.
  In some embodiments, the encoder and/or the decoder may use a picture rate upsampling process to increase the picture rate of a depth view for example to be the same as the picture rate of a texture view. Many picture rate upsampling methods exist and any method or any combination of methods could be used. A picture rate upsampling method may for example scale motion vectors of a bitstream in such a manner that the motion vectors would apply to intermediate temporal positions for which pictures are synthesized in temporal domain by applying motion compensation. Alternatively or in addition, a picture rate upsampling method may estimate the motion field(s) of a coded/decoded picture for example with a block matching algorithm that may be tuned to favour smooth motion fields and subsequently scale the obtained motion field(s) for motion-compensating intermediate temporal positions. The encoder may execute a rate-distortion optimization method, a VSO method, or alike to determine the picture rate of a depth view, wherein picture rate upsampling of the depth view may be taken into account. The encoder may encode one or more indications of the used or assumed picture rate upsampling algorithm and its parameters. The decoder may decode one or more indications of the used or assumed picture rate upsampling algorithm and its parameters for a depth view. The decoder may apply a picture rate upsampling method for example to derive a depth view that has an equal picture rate compared to a decoded texture view.
  The encoder may be configured to use or determine to use inter-component prediction and/or view synthesis prediction and/or alike only for certain access units or time instances and/or certain view components within certain access units or time instances. For example, the encoder may execute a VSO method or alike to determine whether or not inter-component prediction from a depth view and/or view synthesis based on the depth view and/or alike is beneficial according to rate-distortion or some other cost metrics. The encoder may estimate and determine that it is beneficial to code a depth view at a certain picture rate for example from the point of view of rate-distortion or some other cost metrics. Alternatively or in addition, the encoder may determine that it is beneficial to code or omit the coding of a depth view component for example based on rate-distortion or some other cost metrics.
  The encoder side may estimate or detect available network throughput or congestion characteristics and determine whether or not to encode depth view components accordingly. Consequently, a coded depth view may have a varying picture rate.

Various embodiments may be applied with temporally unpaired depth views for example in one or more of the following bases:
  The picture rate and/or capturing/displaying instances of a temporally unpaired depth view may be adjusted (e.g. through picture rate upsampling or picture rate downsampling/decimation) to match a picture rate and/or capturing/displaying instances of other depth view(s) and/or texture view(s).
  The encoder and the decoder may use inter-component prediction from a depth view and/or view synthesis prediction based on the depth view and/or alike for those access units or time instances where a depth view component of the depth view is coded. When a depth view component is not coded, the encoder and the decoder may conclude that no inter-component prediction from the depth view and/or view synthesis prediction based on the depth view and/or alike is used.
  The decoder side may apply view synthesis based on a depth view only for those access units or time instances for which a depth view component of the depth view is coded and received. The decoder side may for example apply view synthesis based on a second depth view that is available for an access unit or time instance for which a depth view component of a first depth view is not coded and/or received. For example, a 3-view bitstream may have the depth view for a central viewpoint coded at 60 pictures per second, while the depth views of the viewpoints on the left and on the right viewpoint may be coded at a rate of 30 pictures per second. The decoding end may perform view synthesis for every other access unit based on the depth pictures of all three depth views, while view synthesis for the remaining access units may be performed based on the central depth view only. In such a view synthesis process, temporal smoothing of depth pictures and/or synthesized texture pictures may be applied to achieve a reasonably stable quality of synthesized views.

As remarked earlier, there are different types of depth pictures and different semantics for the sample values of depth pictures. In some embodiments, a first depth view may have a different type and/or different semantics of sample values than those of a second depth view within the same bitstream. Reasons for such unpaired depth view type may include but are not limited to one or more of the following:

- A first depth view and a second depth view may have a different origin. For example, the first depth view may originate from a depth range sensor and the second depth view may result from stereo matching between a pair of color images of a stereoscopic camera. The first depth view originating from a depth range sensor may use for example a type representing an inverse of real-world distance (Z) value or directly representing a real-world distance. The second depth view originating from stereo matching may represent for example a disparity map.
- It may be required by a prediction mechanism and/or a coding/decoding tool that a certain type of a depth view is used. In other words, a prediction mechanism and/or a coding/decoding tool may have been specified and/or implemented in a manner that it can only use certain type or types of depth maps as input. As different prediction mechanisms and/or coding/decoding tools may be used for different views, the encoder may choose different types of depth views depending on the prediction mechanisms and/or coding/decoding tools used for the views affected by the prediction mechanisms and/or coding/decoding tools.
- It may be beneficial for the coding and/or decoding operation to use a certain type of a depth view for a first viewpoint and another type of a depth view for a second viewpoint. The encoder may choose a type of a depth view that can be used for view synthesis prediction and/or inter-component prediction and/or alike without any or with a small number of computational operations and with a smaller number or smaller complexity of computations than with another type of a depth view. For example, in many coding arrangements inter-component prediction and view synthesis prediction are not used for the base texture view. The depth view for the same viewpoint may therefore represent for example an inverse of a real-world distance value, which facilitates forward view synthesis based on the base texture view and the corresponding depth view. Continuing the same example, a non-base texture view may be coded and decoded using backward view synthesis prediction. Consequently, the depth view corresponding to the non-base texture view may represent disparity, which may be used directly to obtain disparity compensation or warping for the backward view synthesis without a need to convert depth values to disparity values. Consequently, the number of computational operations needed for backward view synthesis prediction may be reduced compared to the number of operations required when the corresponding depth view represents for example an inverse of a real-world distance.
- A first depth view may have semantics of the sample values of depth that may differ for the semantics of the sample values of in a second depth view, wherein the semantics may differ based on parameter values related to depth sample quantization or a dynamic range of depth sample values or a dynamic range of real-world depth or disparity represented by depth sample values, for example based on a disparity range, a depth range, a closest real-world depth value or a farthest real-world depth value represented by a depth view or a view component within the depth view. For example, a first depth view or a first depth view component (within the first depth view) may have a first minimum disparity and/or a first maximum disparity, which may be associated with the first depth view or the first depth view component and may be indicated in the bitstream e.g. by the encoder, while a second depth view or a second depth view component (within the second depth view) may have a second minimum disparity and/or a second maximum disparity, which may be associated with the second depth view or the second depth view component and may be indicated in the bitstream. In this example, the first minimum disparity differs from the second minimum disparity and/or the first maximum disparity differs from the second maximum disparity.

In some embodiments, the types of depth pictures and/or semantics for the sample values of depth pictures may change within a depth view e.g. as a function of time.

In some embodiments, determining view component order within an access unit, also referred to as AU view component order, may be performed as follows.

Figure 7:
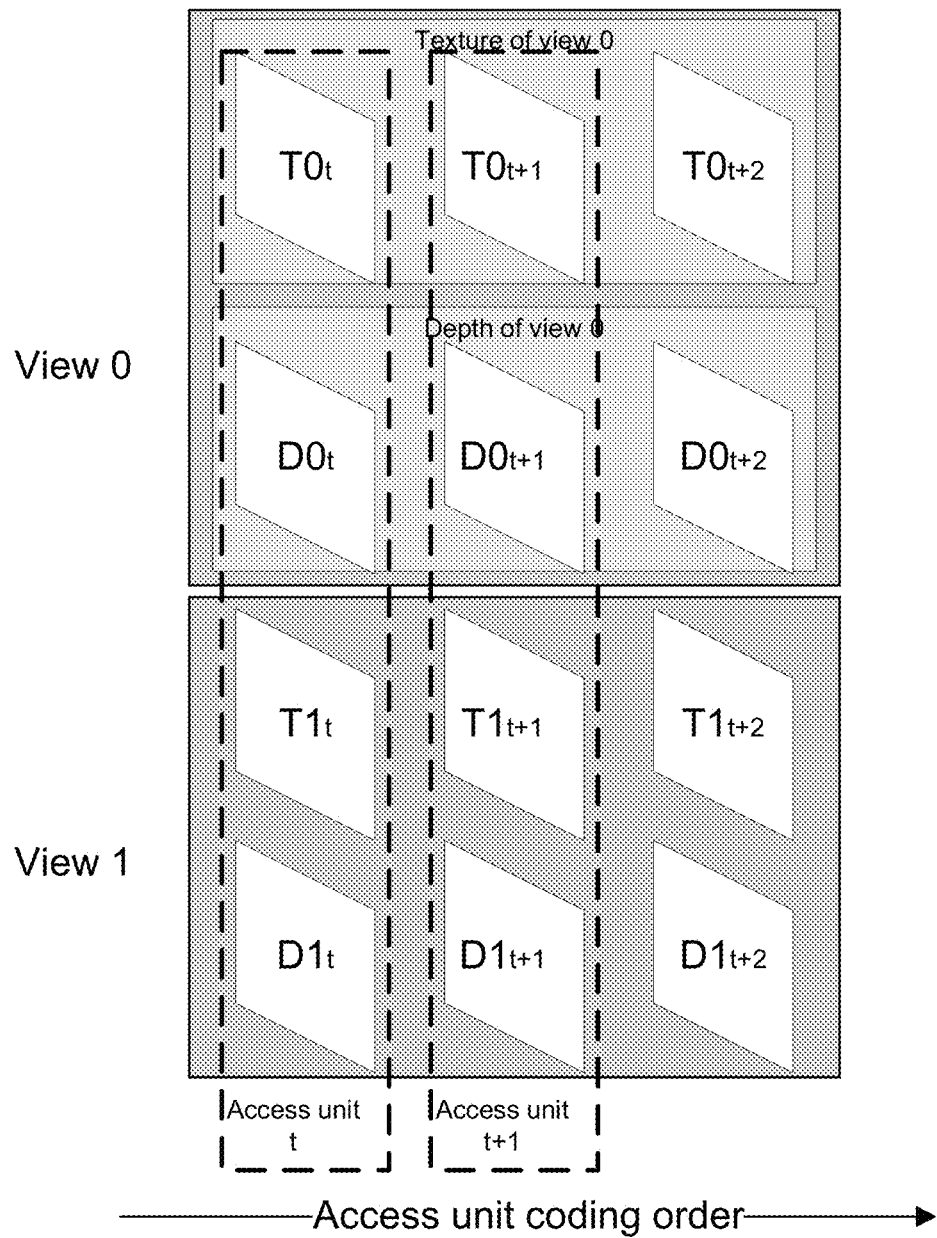
FIG. 7 shows an example of definition and coding order of access units.

The coding and decoding order of texture and depth view components within an access unit may be such that the data of a coded view component is not interleaved by any other coded view component, and the data for an access unit is not interleaved by any other access unit in the bitstream/decoding order. For example, there may be two texture and depth views ($T0_t$, $T1_t$, $T0_{t+1}$, $T1_{t+1}$, $T0_{t+2}$, $T1_{t+2}$, $D0_t$, $D1_t$, $D0_{t+1}$, $D1_{t+1}$, $D0_{t+2}$, $D1_{t+2}$) in different access units (t, t+1, t+2), as illustrated in FIG. 7, where the access unit t consisting of texture and depth view components ($T0_t$,$T1_t$, $D0_t$,$D1_t$) precedes in bitstream and decoding order the access unit t+1 consisting of texture and depth view components ($T0_{t+1}$, $T1_{t+1}$, $D0_{t+1}$, $D1_{t+1}$).

The coding and decoding order of view components within an access unit may be governed by the coding format or determined by the encoder. The determined inter-view prediction hierarchy as well as the determined texture and depth views to be coded may restrict the coding and decoding order. The texture view components of the same access units may be coded in view dependency order, indicated by the view order index. Likewise, the depth view components of the same access units may be coded in view dependency order.

A texture view component may be coded before the respective depth view component of the same view, and hence such depth view components may be predicted from the texture view components of the same view. Such texture view components may be coded for example by MVC encoder and decoded by MVC decoder. An enhanced texture view component refers herein to a texture view component that is coded after the respective depth view component of the same view and may be predicted from the respective depth view component. For example, depth-based motion vector prediction (D-MVP) may be used in enhanced texture view component. In some embodiments, a depth view component may be coded before the respective texture view component of the same view, and hence such texture view components may be predicted from the depth view components of the same view. An encoder may therefore select the coding, bitstream, and decoding order of a depth view component and a texture view component of the same view based on the inter-component prediction tools and/or which type of view synthesis prediction (such as forward VSP or backward VSP) it determines to use. Such determination may be based for example on one or more of the following:

If the encoded bitstream is desired to be compatible with a decoder capable of decoding single- or multi-view texture video, the encoder may decide not to use depth-based texture coding tools for a selected number of texture views and consequently code texture views prior to the respective depth views.

The encoder may perform an optimization process which inter-component coding tools and AU view component order performs better than some others for example in rate-distortion metrics.

The encoder may be configured to use or may determine to use certain coding tools, coding modes, and/or coding parameters, which impose constraints on the AU view component order. For example, if forward VSP is used as described earlier, both the texture view component and a depth view component of a view that is used as a reference for view synthesis prediction should precede in AU view component order the texture view component that is coded/decoded and for which the synthesized reference component is derived.

In some embodiments, the inter-view dependency orders of texture and depth views as well as the use of inter-component coding and view synthesis prediction and other coding tools may together have an impact on determining the coded texture and depth views as well as the AU view component order.

Examples are given in the following: If three views are coded and the encoder determined to use the PIP inter-view prediction hierarchy for texture views T0, T1, and T2, respectively (the midmost view is the base view, while the two other views are non-base views), and the IBP inter-view prediction hierarchy for depth views D0, D1, and D2, respectively (the left view is the base view, the right view may be predicted from the left view, and the middle view may be predicted from the left view and/or the right view), and the encoder decides to use the D-MVP coding tool or any other depth-based texture coding tool for non-base view texture coding, and inter-component prediction tools are not used for the base view of texture, the following constraints on AU view component order may be inferred in the encoder. As T1 is independently coded of D0, D1, and D2, it can have any order with respect to them. T0 requires D0 to be decoded before it, and similarly T2 requires D2 to be decoded before it, as the decoded sample values of D0 and D2 are used in the D-MVP tool for decoding T0 and T2, respectively. D1 is not used as inter-component prediction reference for T1 (or any other texture view), so its location in AU view component order is only governed by the inter-view dependency order of depth. Consequently, assuming that no view synthesis prediction is in use, for example the following AU view component orders are possible: (T1, D0, D2, D1, T0, T2); (T1, D0, T0, D2, T2, D1); (T1, D0, D2, D1, T0, T2); (D0, D2, D1, T1, T0, T2). Furthermore, since D1 is not used as a reference for predicting any other view its encoding may be omitted altogether, i.e. for example the following AU view component orders are possible: (T1, D0, D2, T0, T2); (T1, D0, T0, D2, T2); (D0, D2, T1, T0, T2).

In example embodiments, common notation for arithmetic operators, logical operators, relational operators, bit-wise operators, assignment operators, and range notation e.g. as specified in H.264/AVC or a draft HEVC may be used. Furthermore, common mathematical functions e.g. as specified in H.264/AVC or a draft HEVC may be used and a common order of precedence and execution order (from left to right or from right to left) of operators e.g. as specified in H.264/AVC or a draft HEVC may be used.

In example embodiments, the following descriptors may be used to specify the parsing process of each syntax element.

b(8): byte having any pattern of bit string (8 bits).

se(v): signed integer Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with the most significant bit written first.

ue(v): unsigned integer Exp-Golomb-coded syntax element with the left bit first.

An Exp-Golomb bit string may be converted to a code number (codeNum) for example using the following table:

| Bit string | codeNum |
| --- | --- |
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

A code number corresponding to an Exp-Golomb bit string may be converted to se(v) for example using the following table:

| codeNum | syntax element value |
| --- | --- |
| 0 | 0 |
| 1 | 1 |
| 2 | −1 |
| 3 | 2 |
| 4 | −2 |
| 5 | 3 |
| 6 | −3 |
| . . . | . . . |

In example embodiments, syntax structures, semantics of syntax elements, and decoding process may be specified as follows. Syntax elements in the bitstream are represented in bold type. Each syntax element is described by its name (all lower case letters with underscore characters), optionally its one or two syntax categories, and one or two descriptors for its method of coded representation. The decoding process behaves according to the value of the syntax element and to the values of previously decoded syntax elements. When a value of a syntax element is used in the syntax tables or the text, it appears in regular (i.e., not bold) type. In some cases the syntax tables may use the values of other variables derived from syntax elements values. Such variables appear in the syntax tables, or text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

In example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

In some embodiments, the encoder indicates the texture views and the depth views present in the coded video sequence or bitstream for example in one or more video parameter set syntax structures and/or one or more sequence parameter set syntax structure and/or any other syntax structures. For example, the encoder may encode coded slices of non-base texture views in such a manner that they activate a sequence parameter set including a list or a loop of view identifier values indicating the texture views present in the coded video sequence for which the sequence parameter set is activated. Continuing the same example, the encoder may encode coded slices of depth views in such a manner that they activate a sequence parameter set including a list or a loop of view identifier values indicating the depth views present in the coded video sequence for which the sequence parameter set is activated. In some embodiments, the encoder may be restricted to encode and indicate depth views that are a subset of texture views, i.e. a subset of texture views have associated depth views while the remaining texture views do not have associated depth views, and each depth view co-locates or is associated with a texture view. Such a restriction may be indicated by the encoder, for example, as part of an indicated profile for the coded video sequence or bitstream, while may be indicated through a profile_idc syntax element or similar syntax element or elements and/or through a flag or another indication e.g. in a sequence parameter set or a video parameter set or a similar syntax structure. In other words, in some embodiments there may be fewer depth view components than texture view components, while the present depth view components represent the same views as represented by some of the present texture view components.

In an example, a subset sequence parameter set for 3D video coding includes the base SPS data and the sequence parameter set 3DVC extension as follows.

| subset_seq_parameter_set_rbsp( ) { | C | Descriptor |
|---|---|---|
| seq_parameter_set_data( ) | 0 | |
| . . . /* profile-specific part for non-3DVC profiles */ | | |
| if( profile_idc = = ANY_3DVC_PROFILE ) { | | |
|     bit_equal_to_one /* equal to 1 */ | 0 | f(1) |
|     seq_parameter_set_3dvc_extension( ) | 0 | |
| } | | |
| additional_extension3_flag | 0 | u(1) |
| if( additional_extension3_flag = = 1 ) | | |
|     while( more_rbsp_data( ) ) | | |
|         additional_extension3_data_flag | 0 | u(1) |
| rbsp_trailing_bits( ) | 0 | |
| } | | |

In the example, the constant ANY_3DVC_PROFILE may be the profile_idc value for any profile for depth-enhanced video coding.

In an example, the encoder may indicate the texture views and the depth views present in the coded video sequence in a sequence parameter set 3DVC extension using the following syntax:

| seq_parameter_set_3dvc_extension( ) { | C | Descriptor |
|---|---|---|
| num_views_minus1 | 0 | ue(v) |
| for( i = 0, NumDepthViews = 0; i <= num_views_minus1; i++ ) { | | |
|     view_id[ i ] | 0 | ue(v) |
|     depth_view_present_flag[ i ] | 0 | u(1) |
|     NumDepth Views += depth_view_present_flag[ i ] | | |
|     texture_view_present_flag[ i ] | 0 | u(1) |
| } | | |
| . . . | | | depth_view_present_flag[i] equal to 0 specifies that there is no depth view having a view_id equal to view_id[i]. depth_view_present_flag[i] equal to 1 specifies that there is a depth view having a view_id equal to view_id[i]. texture_view_present_flag[i] equal to 0 specifies that there is no texture view having a view_id equal to view_id[i]. texture_view_present_flag[i] equal to 1 specifies that there is a texture view having a view_id equal to view_id[i].

In some embodiments, the encoder may indicate a type of a depth view in the coded video sequence or bitstream for example in one or more video parameter set syntax structures and/or one or more sequence parameter set syntax structure and/or any other syntax structures. Continuing the example above, the encoder may indicate a type of the depth view by adding depth_representation_type[i] syntax element in a sequence parameter set 3DVC extension as follows:

| seq_parameter_set_3dvc_extension( ) { | C | Descriptor |
|---|---|---|
|   num_views_minus1 | 0 | ue(v) |
|   for( i = 0, NumDepthViews = 0; i <= num_views_minus1; i++ ) { | | |
|     view_id[ i ] | 0 | ue(v) |
|     depth_view_present_flag[ i ] | 0 | u(1) |
|     NumDepth Views += depth_view_present_flag[ i ] | | |
|     if( depth_view_present_flag[ i ] ) | | |
|       depth_representation_type[ i ] | 0 | ue(v) |
|     texture_view_present_flag[ i ] | 0 | u(1) |
|   } | | |
|   ... | | | depth_representation_type[i] specifies the representation format of a depth view with view order index equal to i, for example as specified in the table below in which disparity specifies the horizontal displacement between two texture views and Z value specifies the distance from a camera.

| depth_representation_type | Interpretation |
|---|---|
| 0 | Each luma sample value of a depth view represents an inverse of Z value normalized in range from 0 to 255 |
| 1 | Each luma sample value of a depth view represents disparity normalized in range from 0 to 255 |
| 2 | Each luma sample value of a depth view represents Z value normalized in range from 0 to 255 |

In some embodiments, the encoder may indicate a type of a depth view alternatively or additionally to the sequence level indication(s), such as those described above for the sequence parameter set, in a camera parameter set, an adaptation parameter set, or any other syntax structure that may be activated for a subset of a coded video sequence, such as for selected access units or view components. If present, the sequence level indication(s) may be valid until the first camera parameter set or similar is activated and/or when no camera parameter set or similar is indicated to be active.

In some embodiments, a sequence parameter set 3DVC extension as specified above or any similar syntax structure may be activated for or associated with one or more depth views but not activated for any texture views. Consequently, an encoder may indicate the inter-view prediction relation or hierarchy of depth views in the sequence parameter set 3DVC extension or any similar syntax structure and omit the inter-view prediction relation or hierarchy of texture views. For example, the sequence parameter set 3DVC extension may include the following syntax:

| seq_parameter_set_3dvc_extension( ) { | C | Descriptor |
|---|---|---|
|   ... | | |
|   for( i = 1; i < NumDepthViews; i++ ) { | | |
|     num_anchor_refs_l0[ i ] | 0 | ue(v) |
|     for( j = 0; j < num_anchor_refs_l0[ i ]; j++ ) | | |
|       anchor_ref_l0[ i ][ j ] | 0 | ue(v) |
|     num_anchor_refs_l1[ i ] | 0 | ue(v) |
|     for( j = 0; j < num_anchor_refs_l1[ i ]; j++ ) | | |
|       anchor_ref_l1[ i ][ j ] | 0 | ue(v) |
|   } | | |
|   for( i = 1; i < NumDepthViews; i++ ) { | | |
|     num_non_anchor_refs_l0[ i ] | 0 | ue(v) |
|     for( j = 0; j < num_non_anchor_refs_l0[ i ]; j++ ) | | |
|       non_anchor_ref_l0[ i ][ j ] | 0 | ue(v) |
|     num_non_anchor_refs_l1[ i ] | 0 | ue(v) |
|     for( j = 0; j < num_non_anchor_refs_l1[ i ]; j++ ) | | |
|       non_anchor_ref_l1[ i ][ j ] | 0 | ue(v) |
|   } | | |
|   ... | | |

The semantics of the syntax elements in the above described part of the sequence parameter set 3DVC extension and variables derived from them may be specified identically or similarly to the respective syntax elements in the sequence parameter set MVC extension (presented previously), but the semantics may apply only to depth views. For example, view order index VOIdx values may be specifically derived for depth views on the basis of a sequence parameter set 3DVC extension, whereas a different set of view order index VOIdx values may be derived for texture views on the basis of a sequence parameter set MVC extension.

Alternatively to the previous syntax example, an encoder may indicate the inter-view prediction relation or hierarchy of depth views in the sequence parameter set 3DVC extension or any similar syntax structure and omit the inter-view prediction relation or hierarchy of texture views but use the same assignment of view order index VOIdx values to texture views and depth views. For example, the sequence parameter set 3DVC extension may include the following syntax:

| seq_parameter_set_3dvc_extension( ) { | C | Descriptor |
|---|---|---|
|   ... | | |
|   for( i = 1; i <= num_views_minus1; i++ ) { | | |
|     if( depth_view_present_flag[ i ] ) { | | |
|       num_anchor_refs_l0[ i ] | 0 | ue(v) |
|       for( j = 0; j < num_anchor_refs_l0[ i ]; j++ ) | | |
|         anchor_ref_l0[ i ][ j ] | 0 | ue(v) |
|       num_anchor_refs_l1[ i ] | 0 | ue(v) |
|       for( j = 0; j < num_anchor_refs_l1[ i ]; j++ ) | | |
|         anchor_ref_l1[ i ][ j ] | 0 | ue(v) |
|     } | | |
|   } | | |
|   for( i = 1; i <= num_views_minus1; i++ ) { | | |
|     if( depth_view_present_flag[ i ] ) { | | |
|       num_non_anchor_refs_l0[ i ] | 0 | ue(v) |
|       for( j = 0; j < num_non_anchor_refs_l0[ i ]; j++ ) | | |
|         non_anchor_ref_l0[ i ][ j ] | 0 | ue(v) |
|       num_non_anchor_refs_l1[ i ] | 0 | ue(v) |
|       for( j = 0; j < num_non_anchor_refs_l1[ i ]; j++ ) | | |
|         non_anchor_ref_l1[ i ][ j ] | 0 | ue(v) |
|     } | | |
|   } | | |
|   ... | | |

The semantics of the syntax elements in the above described part of the sequence parameter set 3DVC extension and variables derived from them may be specified identically or similarly to the respective syntax elements in the sequence parameter set MVC extension (presented previously), but the semantics may apply only to depth views. View order index VOIdx values may be derived for both texture views and depth views on the basis of a sequence parameter set 3DVC extension.

In both above-described syntax examples of indicating the inter-view prediction relation or hierarchy of depth views, the association of VOIdx values to view_id values according to a decoding process for depth-enhanced video, e.g. the decoding process for MVC+D, may differ from that of a decoding process for multiview video, e.g. the decoding process for MVC. Hence, the derivation of VOIdx values from the same bitstream may differ when the bitstream is decoded using a decoding process of depth-enhanced video compared to when the bitstream is decoded using a decoding process for multiview video (without consideration of depth views).

In some embodiments, the encoder indicates properties of depth views and texture views in the bitstream, such as properties related to used sensor, optical arrangement, capturing conditions, camera settings, and used representation format such as resolution. The indicated properties may be specific for an indicated depth view or texture view or may be shared among many indicated depth views and/or texture views. For example, the properties may include but are not limited to one or more of the following:

- spatial resolution e.g. in terms of horizontal and vertical sample counts in the view components;
- bit-depth and/or dynamic range of the samples;
- focal length which may be separated to a horizontal and vertical component;
- principal point which may be separated to a horizontal and vertical component;
- extrinsic camera/sensor parameters such as a translation matrix of the camera/sensor position;
- a relative position of a sampling grid of a depth view component with respect to a texture view component, e.g. the horizontal and vertical coordinate within a luma picture corresponding to the top-left sample in the sampling grid of a depth view component, or vice versa;
- a relative horizontal and/or vertical sample aspect ratio of a depth sample with respect to a luma or a chroma sample of a texture view component, e.g. a horizontal multiplication factor (exactly or approximately) equal to dwidth÷twidth and a vertical multiplication factor (exactly or approximately) equal to dheight÷theight, where dwidth, twidth, dheight, and theight or sample dimensions as described earlier;
- a horizontal and/or vertical sample spacing for texture view component and/or depth view component, which may be used to indicate a sub-sampling scheme (potentially without preceding low-pass filtering).

For example, in some embodiments, the following syntax element or similar syntax element(s) may be added to the sequence parameter set 3DVC extension syntax structure or any similar syntax structure:

| seq_parameter_set_3dvc_extension( ) { | C | Descriptor |
|---|---|---|
| ... | | |
| depth_loc_offset | 0 | ue(v) |
| } | | |

In some embodiments, the depth_loc_offset syntax element may be specified as follows: depth_loc_offset specifies the horizontal offset of the location of the leftmost sample column of a decoded depth view component (after cropping as specified in a sequence parameter set) with respect to the leftmost sample column of the decoded texture view component (after cropping as specified in a sequence parameter set) of the same view_id in terms of number of luma samples of the decoded texture view component. In some embodiments, the depth_loc_offset syntax element may be specified as follows: depth_loc_offset specifies the horizontal offset of the location of the leftmost sample column of a decoded depth view component (without cropping as specified in a sequence parameter set) with respect to the leftmost sample column of the decoded texture view component (without cropping as specified in a sequence parameter set) of the same view_id in terms of number of luma samples of the decoded texture view component.

In some embodiments, the depth_loc_offset syntax element and related syntax elements may be specified to indicate a relative position of a sampling grid of a depth view component with respect to a texture view component in a different manner additionally or alternatively. For example, it may be specified using a syntax element whether the offset is relative to the left or right border of the texture view component and/or a different precision, such as a quarter sample precision may be used.

In some embodiments, the presence of the depth_loc_offset syntax element and/or similar syntax elements and/or related syntax elements may depend on one or more of the following:

- The presence of the depth_loc_offset syntax element and/or similar syntax elements and/or related syntax elements may depend on the type of depth views. For example, the depth_loc_offset syntax element may be specified to be present when depth view components represent disparity pictures and may be specified to be absent when depth view components represent distance information (e.g. an inverse of real-world distance value or a real-world distance value itself).
- The presence of the depth_loc_offset syntax element and/or similar syntax elements and/or related syntax elements may depend on the view dependency order and/or AU view component order. For example, a base depth view may cover the same area as a base texture view, enabling forward view synthesis where the base depth and texture views are inputs, but a non-base depth view may only cover an area that overlaps in terms of field of view with other depth views.

In some embodiments, the encoder may encode texture views and respective texture views as if their sampling grids were aligned and cover the same spatial area. If a depth view covers a smaller area than the respective depth view, the encoder may indicate the position of a sampling grid or an effective sample array of a depth view component with an indicated cropping rectangle, such as with the frame_crop_left_offset, frame_crop_right_offset, frame_crop_top_offset, and frame_crop_bottom_offset syntax elements of the seq_parameter_set_data data structure of H.264/AVC. For example, if no depth sample values are available for a number of sample columns on the left of a depth view component, this number of sample columns may be indicated with a frame_crop_left_offset value.

In some embodiments, the encoder may indicate parameters related to depth view derivation within a bitstream. These parameters may include but are not limited to the following:

one or more indications of the method to be used for depth view derivation and related parameter values used to control the method;

a list of viewpoints (e.g. view identifier values) to which an indicated depth view can be projected and/or a threshold value or values indicating how much, e.g. in terms of camera translation in Euclidean metrics, the projected viewpoint can differ from a viewpoint of a coded depth view.

The encoder may encode and include the properties of depth views and texture views and/or parameters related to depth view derivation in one or more syntax structures such as video parameter set, sequence parameter set, camera parameter set, video usability information, SEI message, or alike.

In some embodiments, the encoder may indicate parameters and parameter values related to view synthesis which may be done as post-processing for example in an SEI message or as video usability information or in other syntax structures. These parameters may specifically include such that address cases where there may be an unequal number of texture and depth views, and/or some of the texture views might not have a co-located depth view, and/or some of the depth views might not have a co-located texture view, and/or co-located texture and depth views might cover a different spatial area. These parameters related to view synthesis which may be done as post-processing (after decoding) may include but are not limited to:

any subset of parameters listed above for the properties of depth views and texture views in the bitstream;

any subset of parameters related to depth view derivation a range of viewpoints or a list of viewpoints that are allowed to be synthesized as post-processing after decoding, e.g. a value providing the absolute value of translational difference (along the axis of cameras in a one-dimensional parallel camera setup) from a viewpoint of coded texture view may be given;

estimated, approximate or exact disparity characteristics and/or respective perceived depth characteristics, such as maximum positive disparity and/or minimum negative disparity and/or disparity distribution resulting from indicated coded or synthesized viewpoints;

one or more estimates or values of distortion or other cost metrics related to indicated synthesized viewpoints.

Encoding indication(s) of the inter-view prediction hierarchies in a bitstream may be performed for example by coding indications in the video parameter set and/or sequence parameter set, for example using syntax of or similar to the sequence parameter set MVC extension. The encoder may indicate which video parameter set or sequence parameter set is in use by coding a parameter set identifier into a VCL NAL unit, such that it activates the parameter set including the inter-view prediction hierarchy description.

In some embodiments, the indicated inter-view dependency order for texture views is allowed to be different from that for depth views. For example, the sequence parameter set MVC extension need not have identical content for texture view components compared to its content for depth view components, thus an inter-view dependency order for texture views is allowed to be different from that for depth views.

In some embodiments, the present depth view components and texture view components and/or their properties and/or the AU view component order may be indicated in an access unit level for example in a picture parameter set, an adaptation parameter set, or an access unit delimiter. In some embodiments, the present depth view components and texture view components and/or their properties and/or the AU view component order may be indicated in a level below the access unit, such as a GOS parameter set, a picture header, a component picture delimiter, a component picture header, or a slice header, and the present depth view components and texture view components and/or their properties and the AU view component order may be required to be identical in all syntax structures valid for the same access unit.

In some embodiments, more than one set of present texture and depth view components and/or AU view component orders may be specified for example in a parameter set, such as a video parameter set or a sequence parameter set, for example using syntax similar to those presented above. Each list of present texture and depth view components and/or AU view component order may be associated with a view presence identifier, for example an integer value starting from 0 and incremented by 1 in the order the lists of present texture and depth view components and/or AU view component orders are specified in the parameter set. A view presence identifier value may be included for example in coded video sequence, GOP, or access unit level to indicate which texture and depth views are present and/or which AU view component order is in use for the respective coded video sequence, GOP, or access unit. The view presence identifier may be included for example in a picture parameter set, a GOS parameter set, an access unit delimiter, a picture header, a component picture delimiter, a component picture header, or a slice header. The view presence identifier value may be required to be identical in all syntax structures valid for the same access unit.

In some embodiments, the indication(s) which texture and depth views are present and the AU view component order may be specified for example in a parameter set or any other syntax structure such as those mentioned above with syntax and semantics that allow different texture and depth views being to be present as well as different AU view component orders to be used in the bitstream and thus in encoding and decoding. For example, present depth and texture views and an AU view component order may be specified with a list or a sequence of constraints capable of indicating for example that specific depth view components precede in AU view component order a particular texture view component. An item in the list or sequence of constraints may include a type of the constraint and indications of the concerned depth and texture view components. For example, the type of the constraint may indicate that depth view components are required to appear earlier than particular texture view component in AU view component order, and include a range or list of depth view components (e.g. their view order index values), and e.g. the view order index value of the texture view component. For example, it may be specified that in a stereoscopic depth-enhanced bitstream, both depth view components (D0 and D1) appear earlier than the non-base texture view component (T1) in an access unit. This constraint would suit/allow two AU view component orders: (D0, D1, T0, T1) and (T0, D0, D1, T1).

In some embodiments, the depth and texture view components that are present and the AU view component order may be implicitly indicated by the appearance order of view components in the bitstream.

In some embodiments, depth views may use a different active sequence parameter set from the active sequence parameter set of the texture view. Furthermore, one depth view may use (i.e. may have activated) a different sequence parameter from that of another depth view. Likewise, one texture view may use (i.e. may have activated) a different sequence parameter from that of another texture view.

In some embodiments, the semantics of a subset of syntax elements included in a sequence parameter set may depend on whether the sequence parameter set is referred to by or is active for a texture view component or for a depth view component. Specifically, the semantics of a subset of syntax elements included in a sequence parameter set may apply to one or more texture views if the sequence parameter set is referred to by or is active for a texture view component. Specifically, the semantics of a subset of syntax elements included in a sequence parameter set may apply to one or more depth views if the sequence parameter set is referred to by or is active for a depth view component, whereas another subset of syntax elements in the sequence parameter set may apply collectively to texture and depth views. For example, if VUI parameters are included in the sequence parameter set data syntax structure of a 3DVC subset SPS, they may apply collectively to both the depth views referring to 3DVC subset SPS and the corresponding texture views, except for the aspect ratio information and the bitstream restriction information, if present, which apply only to the depth views referring to the 3DVC subset SPS. The aspect ratio information and the bitstream restriction information for the texture views may be present in the vui_parameters( )) syntax structure included in an MVC subset SPS.

In some embodiments, an encoder may indicate the required size of the decoded picture buffer (DPB) using a unit comprising both a decoded texture view component and a decoded depth view component. The indication may be done as part of VUI and may be done for example using the max_dec_frame_buffering syntax element or similar. As texture views and depth views may be unpaired, such a unit comprising both a decoded texture view component and a decoded depth view component may be suboptimal. Thus, in some embodiments, an encoder may indicate the required size of the DPB through means that enables finer granularity for memory allocation and hence more efficient memory usage. Such means may include but are not limited to one or more of the following:

The unit for indicating the DPB size may be selected in such a manner that a decoded texture view component is an integer multiple of the unit and a decoded depth view component is also an integer multiple of the unit. For example, if the unit is selected to be the size of the chroma component of a decoded texture view component, then the each decoded texture view component (of chroma format 4:2:0) takes 6 units and each decoded depth view component (of one quarter of the size of the luma component of the texture view component) takes 1 unit. The encoder may indicate in the bitstream, for example in a sequence parameter set, which unit is used in indicated the DPB size.

Two DPB sizes may be indicated, one for decoded texture view components and another one for decoded depth view components. Respectively, a separate DPB may be used for decoded texture view components than that for decoded depth view components—however, the output process may be aligned or synchronized in such a manner that decoded texture and depth view components of the same access unit may be output essentially at the same time.

The DPB size of for the depth views may be inherited to the same as that for the texture views in terms of frame buffers. A separate DPB may be used for decoded texture view components than that for decoded depth view components—however, the output process may be aligned or synchronized in such a manner that decoded texture and depth view components of the same access unit may be output essentially at the same time.

The indicated size of the DPB may be used in the HRD. The HRD and/or the DPB may be a part of the encoding process or connected to the encoding process, and the HRD and/or the DPB may be used to control the encoding process. The DPB may a part of the decoding process or connected to the decoding process. The indicated size of the DPB may be used in the decoder for allocating or reserving memory for decoded texture and depth view components.

In some embodiments, the DPB may be operated separately for texture view components and depth view components and terms texture DPB and depth DPB may be used respectively. Each of the frame buffers of the texture DPB may contain a decoded texture frame view component, a decoded depth frame view component, a decoded complementary texture field view component pair, or a single (non-paired) decoded texture field view component that is marked as "used for reference" (reference pictures) or is held for future output (reordered or delayed pictures) or is held as reference for inter-view prediction (inter-view only reference components). Each of the frame buffers of the depth DPB may contain a decoded depth frame view component, a decoded complementary depth field view component pair, or a single (non-paired) decoded depth field view component that is marked as "used for reference" (reference pictures) or is held for future output (reordered or delayed pictures) or is held as reference for inter-view prediction (inter-view only reference components). The operation of the DPB may for example comprise picture decoding, picture output, picture marking (e.g. as "used for reference" and "unused for reference") and picture removal from the DPB. Picture output may be based on picture output times that may be indicated in the bitstream or by external means, or it may be based on a "bumping" process, which may free or unallocated frame buffers of the DPB when all available frame buffers have become occupied.

In some embodiments, a "bumping" process for the DPB may operate jointly or synchronously for texture and depth view components even if the DPB otherwise operates separately for depth view components and texture view components, e.g. there is a depth DPB and a texture DPB. A "bumping" process operating jointly for texture and depth view components may output a texture view component and a depth view component having an equal value of view_id and/or any other view identifier syntax element or variable essentially together or next to each other.

An example of a DPB "bumping" process operating jointly for texture and depth view components is provided in the following. The described "bumping" process may be invoked for particular texture view and depth view with view order index VOIdx, with each "view component" being replaced by "texture view component" or "depth view component", "frame view component" being replaced by "texture frame view component" or "depth frame view component", and "field view component" being replaced by "texture field view component". During the invocation of the process for a particular texture view, only the texture view components of the particular view are considered while respective depth view components may be cropped and output too. During the invocation of the process for a particular depth view, only the depth view components of the particular view are considered and frame buffers containing view components of other views are not emptied. The DPB fullness represents the total number of non-empty frame buffers, including frame buffers that contain view components of other views. The DPB fullness represents the total number of non-empty frame buffers, including frame buffers that contain view components of other views, for the texture DPB or the depth DPB depending on whether the process is invoked for a texture view or a depth view, respectively.

Continuing the example of a DPB "bumping" process operating jointly for texture and depth view components is provided in the following, the "bumping" process may comprise one or more of the following steps:

1. The picture or complementary reference field pair that is considered first for output is selected as follows:
   a. The frame buffer is selected that contains the picture having the smallest value of PicOrderCnt( ) (i.e. picture order count) of all pictures in the DPB marked as "needed for output".
   b. Depending on the frame buffer, the following applies:
      If this frame buffer contains a complementary non-reference field pair with both fields marked as "needed for output" and both fields have the same PicOrderCnt( ) the first of these two fields in decoding order is considered first for output.
      Otherwise, if this frame buffer contains a complementary reference field pair with both fields marked as "needed for output" and both fields have the same PicOrderCnt( ) the entire complementary reference field pair is considered first for output.
      Otherwise, the picture in this frame buffer that has the smallest value of PicOrderCnt( ) is considered first for output.
2. Depending on whether a single picture or a complementary reference field pair is considered for output, the following applies:
   If a single picture is considered first for output, this picture is cropped, using the cropping rectangle specified in the active sequence parameter set for the picture, the cropped picture is output, and the picture is marked as "not needed for output".
   Otherwise (a complementary reference field pair is considered first for output), the two fields of the complementary reference field pair are both cropped, using the cropping rectangle specified in the active sequence parameter set for the pictures, the two fields of the complementary reference field pair are output together, and both fields of the complementary reference field pair are marked as "not needed for output".
3. If there is a single depth view component or a complementary depth view component pair having the same values of view_id and PicOrderCnt( ) as the single picture or the complementary reference field pair considered for output, the single depth view component or the complementary depth view component pair are output as in step 2.
4. The frame buffer that included the picture or complementary reference field pair that was cropped and output is checked, and when any of the following conditions are true, the frame buffer is emptied and the DPB fullness is decremented by 1:
   The frame buffer contains a non-reference non-paired field.
   The frame buffer contains a non-reference frame.
   The frame buffer contains a complementary non-reference field pair with both fields marked as "not needed for output".
   The frame buffer contains a non-paired reference field marked as "unused for reference".
   The frame buffer contains a reference frame with both fields marked as "unused for reference".
   The frame buffer contains a complementary reference field pair with both fields marked as "unused for reference" and "not needed for output".

A "bumping" process may be invoked for example in one or more of the following cases.

There is no empty frame buffer (i.e., DPB fullness is equal to DPB size) and an empty frame buffer is needed for storage of an inferred "non-existing" frame.

The current picture is an IDR picture and no_output_of_prior_pics_flag is not equal to 1 and is not inferred to be equal to 1.

The current picture includes a memory management control causing marking of all prior pictures as "unused for reference".

There is no empty frame buffer (i.e., DPB fullness is equal to DPB size) and an empty frame buffer is needed for storage of a decoded (non-IDR) reference picture or a reference base picture.

There is no empty frame buffer (i.e., DPB fullness is equal to DPB size) and the current picture is a non-reference picture that is not the second field of a complementary non-reference field pair and the current picture is intended for output and there are pictures in the DPB that are marked as "needed for output" that precede the current non-reference picture in output order, so an empty buffer is needed for storage of the current picture.

There is no empty frame buffer (i.e., DPB fullness is equal to DPB size) and the current picture is a non-reference picture that is not the second field of a complementary non-reference field pair and the current picture is needed as inter-view only reference picture, so an empty buffer is needed for storage of the current picture.

In some embodiments, the encoder may be capable of parallel processing for example through multiple processors and/or processing cores, a graphics processing unit (GPU), or anything alike. The encoder may assign texture and depth view components for encoding on different parallel processing units for example in an order determined by the inter-view prediction hierarchy and an inter-component dependency hierarchy, which may be determined for example according to the inter-component prediction tools to be used. When assigning view components for encoding in parallel processing units, the encoder should ensure that no processing is halted due to waiting of completion of encoding in another parallel processing unit. The completion order of encoding of view components might not be the same as the order the view components were assigned to be encoded in different parallel processing units. For example, in some coding arrangements depth view components may have a lower spatial resolution compared to that of texture view components, hence the encoding of depth view components is also likely to take a smaller processing time compared to that for the texture view components. The parallel processing units may be configured to output the encoded slices or view components into the bitstream at the order that they are completed. Consequently, in some embodiments, the AU view component order may be determined by the completion order of encoding of view components in one or more parallel processing units. In some embodiments, the depth view component or components that are in the tail of the completion order of encoding of view components may be omitted or discarded from the bitstream.

In many embodiments, the coding format allows to have the texture and depth view components of an access unit in any order with respect to each other as long as the ordering obeys both inter-view and inter-component prediction hierarchy. In other words, many coding formats have such constraints that enable decoding of the received bitstream in a linear order, e.g. in the order NAL units are received in the bitstream. That is, a received view component may be allowed to have dependencies on data appearing earlier in the bitstream and may be disallowed to have dependencies on data appearing later in the bitstream. The encoder may ensure that such constraints are obeyed in the bitstream by encoding view components in respective order and/or buffering the encoded data, re-ordering the buffered data such that the constraints are obeyed, and writing the re-ordered data into the bitstream. Furthermore, the encoder may determine not to encode or discard one or more view components in such a manner that such constraints are obeyed in the bitstream.

In some embodiments, the encoder may conclude that a depth view is required as a reference or input for prediction (such as view synthesis prediction, inter-view prediction, inter-component prediction, and/or alike) and is not input to the encoder or determined not to be coded. In such a case, the encoder may Derive the depth view, one or more depth view components for the depth view, or parts of one or more depth view components for the depth view on the basis of coded depth views and/or coded texture views and/or reconstructed depth views and/or reconstructed texture views or parts of them; and Use the derived depth view as a reference or input for prediction (such as view synthesis prediction, inter-view prediction, inter-component prediction, and/or alike) and/or for view synthesis performed as post-processing for decoding.

An example embodiment of derivation a depth view component is provided next. It should be understood that the same or a similar process may be used to derive the depth view entirely, other depth view components for the depth view, or parts of one or more depth view components for the depth view. A forward VSP process or alike may be applied to one or more reconstructed depth view components, typically of the same access unit. A depth view component may be considered as an input picture to be warped as well as a source of the per-pixel disparity information according to which warping may be performed. In other words, a depth view component is re-projected to another viewpoint using a forward VSP process. Advanced methods, such as hole filling, to improve the quality of the re-projected depth view component may be used.

For example, an encoder may conclude that a depth view component is needed for DMVP or alike but that no depth view component has been coded for the required view. The encoder may then derive the depth view component using forward VSP or a similar process. Subsequently, the encoder may use the derived depth view component similarly or identically as if the derived depth view component were a reconstructed depth view component resulting from coding the depth view component. In some embodiments, the encoder may also use more than one reconstructed depth view component as a source for the derived depth view component. For example, the encoder may derive multiple candidate depth view components, each with a different source depth view component and/or a different derivation process and/or different parameters applied in a derivation process. The encoder may then apply filtering between the candidate depth view component to obtain a derived depth view component. The filtering may include but is not limited to one or more of the following: averaging, median filtering, linear or non-linear fusing. The filtering may also be confidence-weighted, e.g. a hole-filled sample may have a lower confidence and hence lower weight in the derived depth view component compared to a higher confidence and hence higher weight of a warped sample.

In some embodiments, an entity, herein referred to as a bitstream modifier, modifies a bitstream in such a manner that the bitstream is not fully decoded and re-encoded but rather lighter-weight processing for the bitstream is performed. For example, selected NAL units of the original/input bitstream may be discarded (i.e. not included) into the modified bitstream. The bitstream modifier may for example be a part of a server, a media-aware network element (MANE), a receiver, a media player, or a decoder. The bitstream modifier may determine to modify or may be configured to modify the bitstream for example based on estimated or prevailing downlink network conditions or throughput and/or estimated or known capacity or operating mode of the decoding side for example in terms of the type of the used display (e.g. monoscopic, stereoscopic, autostereoscopic), desired views to be displayed, computational capacity, available memory, and/or memory access bandwidth. In some embodiments, the bitstream modifier may operate similarly to an encoder as described above for determining whether or not a depth view or certain depth view components within a depth view are included in or omitted/discarded from the modified bitstream. For example, the bitstream modifier may conclude based on one or more indications included in the bitstream, similarly to a decoder, that a depth view is not used as a reference for prediction for view synthesis, inter-view and/or inter-component prediction and consequently the bitstream modifier may determine to omit the depth view from the modified bitstream. Alternatively or in addition, the bitstream modifier may be configured to input the expected or known viewpoints or the expected or known range of viewpoints for synthesized view components for view synthesis done as post-processing for decoding. The bitstream modifier may execute a VSO method or alike to determine if a coded depth view would bring a rate-distortion (or other cost metrics) benefit for the expected or known viewpoints or the expected or known range of viewpoints for synthesized view components (compared to synthesizing the same viewpoints on the basis of the depth views that would otherwise be available). Alternatively or in addition, the bitstream modifier may conclude view components that are not needed for decoding or output on the basis of mentioned capabilities and/or operation mode of the decoding side and on indications included in the bitstream and omit at least some of these unnecessary coded view components from the modified bitstream. The bitstream modifier may operate similarly to a decoder when receiving and decoding syntax elements and parameter values from the bitstream. The bitstream modifier may operate in a streaming manner, e.g. one access unit, coded picture, or NAL unit at a time rather than a whole bitstream at a time.

In various embodiments, the decoder or the decoder side may perform one or more of the following steps among others:
1. Receiving and decoding one or more indications of coded texture and depth views, inter-view prediction hierarchy of texture views and depth views, and/or AU view component order from a bitstream.

2. When a depth view required as a reference or input for prediction (such as view synthesis prediction, inter-view prediction, inter-component prediction, and/or alike) but not included in the received bitstream, deriving the depth view; or inferring that coding tools causing a depth view to be required as reference or input for prediction are turned off; or selecting one of the above based on one or more indications received and decoded from the bitstream.

3. Inferring the use of one or more coding tools, modes of coding tools, and/or coding parameters for decoding a texture view based on the presence or absence of a respective coded depth view and/or the presence or absence of a respective derived depth view.

4. Forming an inter-component prediction signal or prediction block or alike from a depth view component (or, generally from one or more depth view components) to a texture view component (or, generally to one or more texture view components) for a subset of predicted blocks in a texture view component on the basis of availability of co-located samples or blocks in a depth view component. Similarly, forming an inter-component prediction signal or prediction block or alike from a texture view component (or, generally from one or more texture view components) to a depth view component (or, generally to one or more depth view components) for a subset of predicted blocks in a depth view component on the basis of availability of co-located samples or blocks in a texture view component.

5. Forming a view synthesis prediction signal or prediction block or alike on the basis of availability of co-located depth samples.

6. When a depth view required as a reference or input for prediction for view synthesis performed as post-processing, deriving the depth view.

7. Determining view components that are not needed for decoding or output on the basis of mentioned signalling and configuring the decoder to avoid decoding these unnecessary coded view components.

The decoder may receive and decode indications of coded texture and depth views, inter-view prediction hierarchy of texture views and depth views, and AU view component order from a bitstream for example as follows. The decoder may conclude one or more of the active video parameter set or similar, the active sequence parameter set(s) or similar, the active picture parameter set(s) or similar, and the active adaptation parameter set(s) or similar for example based on the parameter set identifiers included in one or more coded slice syntax structures being decoded. For example, in some embodiments, the decoder may activate a parameter set per each texture view or depth view, while the same parameter set may be activated for multiple views. A list or loop of view identifiers or similar for texture views and depth views may be present in one or more of parameter set structures. There may be an unequal number of view identifiers or similar indicated for the texture views than indicated for the depth views and/or some or all of the view identifier values indicated for texture views may differ from those indicated for depth views. The inter-view prediction hierarchy may be present in one or more of these parameter set structures. In some embodiments, it is allowed to have the inter-view prediction hierarchy for texture views differing from that for depth views, and consequently the decoder may conclude that different parameter set or a different part of a parameter set is referred to from texture and depth views from which the inter-view dependency hierarchy may be decoded. In some embodiments, the presence of texture and depth view components and/or the inter-view prediction hierarchy of texture and depth views is indicated with the access unit and/or coded slice for example as a view order index which may be present in an access unit delimiter, component picture delimiter, slice header, or anything alike, and the decoder may parse the inter-view prediction hierarchy information for example from the view order index syntax element or alike. In some embodiments, the presence of texture and depth view components may be indicated implicitly by view identifier values, view order index values or similar identifier values included in or inferred for coded slice NAL units or similar coded video structures or units for an access unit. Moreover, the inter-view prediction hierarchy may be indicated implicitly by the decoding/bitstream order of texture or depth view components within an access unit.

The decoder may receive and decode one or more indications of the AU view component order from the bitstream for example as follows. The indications of the AU view component order may be any of those mentioned above or any similar indications. The decoder may for example conclude which parameter set is active and decode the part of the active parameter set that indicates the AU view component order. In some embodiments, the decoder may decode an index of the AU view component order to be used for example from a picture parameter set and use the index to conclude which one of the AU view component orders included in an active video parameter set or sequence parameter is used for the access units referring to the picture parameter set.

In some embodiments, the decoder may use the decoded or concluded information on which texture and depth view components are present as well as the decoded or concluded AU view component order for error resilience against transmission errors, corruption of mass memory medium, or anything alike as follows. The decoder may conclude that decoding of a new/next view component is started for example when the bitstream contains a component picture delimiter NAL unit, a component picture header, or a slice header indicating a different view order index and/or a different view component type (e.g. depth or texture) compared to the previous those of the previous slice. The decoder may compare the view component type and the indicator of the view component, such as the view order index, to those that the AU view component order infers for the next view component. If both the view component type and the indicator of the view component both match the ones expected based on the AU view component order, the decoder may conclude that no loss of an entire view component has happened. If either or both of the view component type and the indicator of the view component do not match with the ones expected based on the AU view component order, the decoder may conclude a loss of an entire view component. In some embodiments, more than one AU view component order is possible, and the decoder may therefore check if the next view component conforms to any of the possible AU view component orders. In some embodiments, the bitstream input to the decoder may have undergone bitstream extraction or pruning, while the indication of the AU view component order may reflect the bitstream prior to pruning. For example, in some embodiments, it may be possible to remove all depth view components from the bitstream, while the remaining bitstream is conforming, i.e. can be decoded. In some embodiments, the decoder may conclude whether a loss of a view component is/can be intentional or is/can be accidental for example based on indications whether inter-component coding tools are used and for which views they are or may be used. If the decoder concludes that a first view component is or may be required for a coding tool used in coding/decoding another view component, the decoder may conclude that a loss of the first view component is accidental.

Example embodiments of inferring the use of one or more coding tools, modes of coding tools, and/or coding parameters based on the presence or absence of a respective coded depth view and/or the presence or absence of a respective derived depth view in the encoder and/or in the decoder are provided in the following paragraphs.

In some embodiments, one or more coding tools using inter-component dependency from depth to texture, such as D-MVP, depth-based intra prediction for texture, or JMVDC with depth in the base layer and texture in the enhancement layer, is used in encoding and decoding if the depth view component of a view is present in the bitstream and precedes, in AU view component order, the texture view component of the same view or if the depth view component is derived. In some embodiments, if the depth view component of a view succeeds, in AU view component order, the texture view component of the same view or is not present, the encoder indicates whether or not the depth view component is derived in the bitstream and may indicate the derivation method and/or parameter values for the derivation method in the bitstream. The decoder may receive, from the bitstream, and decode the indication(s) whether or not a depth view is derived. If the depth view is indicated to be derived, the decoder may receive from the bitstream and decode indications which derivation method and/or which parameter values for the derivation method are used and derives the depth view (or parts of it needed as a reference or source for prediction) accordingly. In some embodiments, if the depth view component of a view precedes, in AU view component order, the texture view component of the same view or if the depth view component is derived, the encoder indicates the use of one or more coding tools using inter-component dependency from depth to texture, such as D-MVP, depth-based intra prediction for texture, or JMVDC with depth in the base layer and texture in the enhancement layer, in the bitstream, while if the depth view component of a view is not present in the bitstream or succeeds, in AU view component order, the texture view component of the same view, the encoder does not indicate the use of one or more coding tools using inter-component dependency from depth to texture in the bitstream. The decoder may conclude from the presence or absence of view components and/or whether derivation of a depth view component is performed or allowed and/or from the decoded AU view component order whether the indications of the one or more coding tools using inter-component dependency from depth to texture, such as D-MVP, are present in the bitstream, and if they are present, decodes them from the bitstream, and decodes the coded video data based on the concluded or decoded use of the depth-based texture coding tools. In some embodiments, the use of a depth-based coding tool and the derivation of a depth view are coded into one syntax element or a specific value or values of a syntax element indicate the use of a depth-based coding tool and the derivation of a depth view.

In some embodiments, one or more coding tools using inter-component dependency from texture to depth, such as JMVDC with texture in the base layer and depth in the enhancement layer, is used in encoding and decoding if the texture view component of a view precedes, in AU view component order, the depth view component of the same view and the depth view component is present in the bitstream. In some embodiments, if the depth view component of a view succeeds, in AU view component order, the texture view component of the same view and is present in the bitstream, the encoder indicates the use of one or more coding tools using inter-component dependency from texture to depth, such as JMVDC with texture in the base layer and depth in the enhancement layer, in the bitstream, while if the depth view component of a view precedes, in AU view component order, the texture view component of the same view or is not present in the bitstream, the encoder does not indicate the use of one or more coding tools using inter-component dependency from texture to depth in the bitstream. The decoder concludes from the decoded or concluded presence and absence the decoded AU view component order whether the indications of the one or more coding tools using inter-component dependency from texture to depth are present in the bitstream, and if they are present, decodes them from the bitstream, and decodes the coded video data based on the concluded or decoded use of the texture-based depth coding tools.

In some embodiments, the encoder and decoder may conclude that if there are at least two depth view components consecutively in the AU view component order, the JVDF process or any other multiview depth filtering may be performed after reconstructing or decoding the last depth view component of such consecutive depth view components in the AU view component order. All the reconstructed or decoded depth view components up to the last one of the consecutive depth view components in AU view component order may take part in the JVDF process or alike. Consequently, the number of depth samples projected or warped to the same pixel or sample location may be greater than that resulting if JVDF or any other multiview depth filtering were applied after a smaller number, such as after each, depth view component had been reconstructed or decoded. Due to the greater number of depth samples mapped to the same pixel location, the filtering process may succeed better. For example, weighted averaging may be applied if a majority of depth/disparity values mapped to a pixel location fall into a confidence interval among those depth/disparity values only, thus outlier depth/disparity values may be excluded.

In some embodiments, the encoder may indicate with indication(s) in the bitstream that a coding tool is used when a sufficient combination of texture views and corresponding depth views as well as unpaired texture and depth views is present and the view component order associated with or signaled for the coding tool is fulfilled. The sufficient combination of texture and depth views may be signaled for one or more coding tools and/or may be pre-defined or known for one or more coding tools. Otherwise, the coding tool may not be used. In other words, if a particular view component is encoded into the bitstream, if the earlier view components within the access unit enable the use of certain coding tool, and if the use of the coding tool is turned on with an indication, the encoder may use the coding tool for encoding the particular view component. For example, if a depth view component is being encoded, the texture view component of the same view as the depth view component being encoded has already been encoded, and the use of IVMP has been enabled in the sequence parameter set or anything alike, the encoder may use IVMP to encode the current depth view component. The decoder may conclude the use of the coding tool respectively to the encoder. That is, if a particular view component is being decoded from the bitstream, if the earlier view components within the access unit enable the use of certain coding tool, and if the use of the coding tool is indicated in the bitstream, the decoder may use the coding tool for decoding the particular view component. For example, if a depth view component is being decoded, the texture view component of the same view as the depth view component being decoded has already been decoded, and the use of IVMP has been enabled in the sequence parameter set or anything alike, the decoder may use IVMP to decode the current depth view component. In some embodiments, indication(s) in the bitstream that a coding tool is used may be specific to a particular indicated view component or to a set of particular indicated view components, while the indication(s) that the coding tool is used may be valid only when to a view component order associated or signaled with the coding tool is fulfilled for the indicated particular view components.

In some embodiments, the encoder and decoder may reconfigure/re-initialize MVP candidate and/or merge lists analogous to those specified in HEVC depending on absence/presence of coded components/views. Said reconfiguration/re-initialization may be implemented with explicit signaling over the bitstream or implicitly at the encoder side and/or the decoder side.

In some embodiments, the encoder and/or the decoder may form an inter-component prediction signal or prediction block or alike from a depth view component (or generally from one or more depth view components) to a texture view component (or, generally to one or more texture view components) for a subset of predicted blocks in a texture view component on the basis of availability of co-located samples or blocks in a depth view component as follows. In some embodiments, in the derivation of a co-located sample or block, disparity and/or motion compensation may be applied, i.e. a disparity or motion vector or alike may be applied to derive a location of a prediction block from the location of a block being predicted, where the disparity or motion vector or alike may be indicated in the bitstream and/or derived from a depth view component. In some embodiments, the encoder and/or the decoder conclude if a co-located depth block is available for a texture block being coded/decoded. The process of concluding may comprise one or more of the following steps:

If no depth view component has been reconstructed, decoded, or derived with the same view identifier as that of the texture view component being encoded/decoded, a co-located depth block is not available.

Otherwise, if the reconstructed/decoded/derived depth view component co-locates and covers the same area than the texture view component being encoded/decoded, a co-located depth block is available.

Otherwise, if the texture block being encoded/decoded overlaps with a depth block in the reconstructed/decoded/derived depth view component, a co-located depth block is available. In other words, if the texture block being encoded/decoded is within the picture area covered by the reconstructed/decoded/derived depth view component, a co-located depth block is available.

In some embodiments, the encoder and/or the decoder may form an inter-component prediction signal or prediction block or alike from a texture view component (or generally from one or more texture view components) to a depth view component (or, generally to one or more depth view components) for a subset of predicted blocks in a depth view component on the basis of availability of co-located samples or blocks in a texture view component. A process similar to the one described in the previous paragraph may be used by interchanging a depth view component with a texture view component and vice versa.

In some embodiments, the encoder and/or the decoder may form a view synthesis prediction signal or prediction block or alike on the basis of availability of co-located depth samples as follows. If backward VSP is used, the encoder and/or the decoder may conclude if a co-located depth block is available for a texture block being coded/decoded similarly or identically to what has been described above for inter-component prediction. If a co-located depth block is available, the encoder and/or the decoder may use it for forming a view synthesis prediction signal or prediction block or alike. If forward VSP is used, a view synthesis prediction signal or prediction block or alike may be considered available if the number of samples in a co-located block in a synthesized view component of the same viewpoint as the current texture view component includes a number or share of warped samples that exceeds a predefined or indicated threshold and/or the average or cumulative confidence of samples warped into the co-located block in the synthesized view component exceeds a predefined or indicated threshold. Such thresholds may be indicated by the encoder in the bitstream and may be decoded from the bitstream by the decoder and used in the decoding process for concluding the availability of a block in a synthesized view component.

In some embodiments, the encoder and/or the decoder may conclude the availability of co-located samples for inter-component prediction and/or view synthesis prediction similarly to what has been described in the previous paragraphs. However, the encoder and/or the decoder may apply a padding process for those samples that are found unavailable and subsequently treat those samples available. A padding process derives sample values for some or all samples that are unavailable. A sample value may be derived for example first applying a horizontal padding process, where an unavailable sample is made available by assigning it to the value of the closest available sample in horizontal direction, and subsequently applying a vertical padding process, where unavailable sample is made available by assigning it to the value of the closest available sample in vertical direction. Any other type of a padding process may be applied alternatively. In some embodiments, the encoder indicates whether or not padding is used and/or the applied padding method within the bitstream and the decoder receives and decodes one or more indications of the applied padding method from the bitstream and performs the padding process accordingly.

In some embodiments, the encoder and/or the decoder may conclude the availability of co-located samples for inter-component prediction and/or view synthesis prediction similarly to what has been described in the previous paragraphs. However, the encoder and/or the decoder may apply a global or local interpolation process to both or either of view components for those samples that are found unavailable and subsequently treat those samples available. An interpolation process derives sample values for some or all samples that are unavailable.

In some embodiments, the encoder and/or the decoder may conclude that a depth view component is not aligned or rectified with a texture view component and apply an alignment or rectification process to both or either of the view components. The encoder and/or the decoder may subsequently determine the availability of co-located samples and may perform operations, such as padding or interpolation as described above for unavailable samples and subsequently treat those samples available.

In some embodiments, the encoder and/or the decoder may conclude the availability of co-located samples for inter-component prediction and/or view synthesis prediction similarly to what has been described in the previous paragraphs and an alignment or rectification process may be applied for those samples that are found unavailable. If samples remain unavailable after alignment or rectification, the encoder and/or the decoder may perform operations, such as padding or interpolation as described above for unavailable samples and subsequently treat those samples available.

Many embodiments have been described above for encoding and decoding of depth-enhanced multiview video when no frame packing is in use. It should be understood that many embodiments of the invention are also applicable to coding and decoding scenarios where frame packing is applied. Different types of frame packing may be applied, such as packing of two or more texture view components into a single frame, and/or packing of two or more depth view components into a single frame, and/or packing of one or more texture view components and one or more depth view components into a single frame. The encoder may code and include different indications as described above and additionally indicate the views or view components to which the indications apply for example by using appropriate nesting SEI messages or by associating a component type (e.g. texture or depth) and/or a view identifier to constituent frames by other means, such as including an identifier of a constituent frame into syntax structures that are used for indicating properties of texture and depth views. A nesting SEI message may for example indicate whether the nested SEI messages apply to texture views or depth views or both, and/or indicate which views (e.g. view identifiers or view order indexes) the nested SEI messages, and/or indicate which constituent frames the nested SEI messages apply to.

In some embodiments, the decoder side, such as a decoder and/or a post-processor and/or a renderer, may perform view synthesis on the basis of decoded texture and depth view components. The decoder side may obtain parameters and parameter values related to view synthesis which may be done as post-processing for example from an SEI message or from video usability information or from other syntax structures. These parameters may specifically include such that address cases where there may be an unequal number of texture and depth views, and/or some of the texture views might not have a co-located depth view, and/or some of the depth views might not have a co-located texture view, and/or co-located texture and depth views might cover a different spatial area. The decoder side may parse and use these parameters in controlling which viewpoints are synthesized and which parameters are used in the view synthesis. For example, the decoder side may decode a range of viewpoints or a list of viewpoints that are allowed to be synthesized as post-processing after decoding. Furthermore, the decoder side may be configured to use a certain camera separation or disparity characteristics (e.g. certain maximum positive and minimum negative disparity) or alike for example as pre-defined values for a display in use or user-selectable values. The decoder side may then select an appropriate viewpoint to be synthesized based on the range or list of allowed viewpoints and the desired camera separation or disparity characteristics or alike. In some embodiments, the decoder side may further decode from the bitstream one or more estimates or values of distortion or other cost metrics related to indicated synthesized viewpoints and accordingly choose the synthesized viewpoint(s) advantageously in terms of distortion or other cost metrics.

In the above, some embodiments have been described in relation to particular types of parameter sets. It needs to be understood, however, that embodiments could be realized with any type of parameter set or other syntax structure in the bitstream.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices. For example, in some embodiments, an indication according to any embodiment above may be coded into a video parameter set or a sequence parameter set, which is conveyed externally from a coded video sequence for example using a control protocol, such as SDP. Continuing the same example, a receiver may obtain the video parameter set or the sequence parameter set, for example using the control protocol, and provide the video parameter set or the sequence parameter set for decoding.

In the above, some embodiments have been described in relation to particular types of component pictures, namely depth view components and texture view components. In needs to be understood, however, that embodiments could be realized with any types of component pictures, which may be present in the bitstream instead of or in addition to texture and depth view components. For example, a component picture in some embodiments could comprise an infrared view component or some other image representation that falls outside of the conventional radio frequency spectrum used to represent human-perceivable images.

In the above, some embodiments have been described in relation to coding/decoding methods or tools having inter-component dependency, such as depth-based texture coding/decoding or prediction tools. It needs to be understood that embodiments may not be specific to the described coding/decoding methods but could be realized with any similar coding/decoding methods or tools.

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

According to a first example there is provided a method comprising:

examining availability of a depth block co-located with a texture block;

determining a prediction method for a texture block on the basis of availability of a co-located depth block; and deriving a first prediction block for the texture block on the basis of the co-located depth block, if the co-located depth block is available; and otherwise deriving a second prediction block for the texture block without using the co-located depth block.

In some examples the method further comprises:

encoding the texture block on the basis of the derived first or second prediction block.

In some examples the method further comprises:

encoding the texture block and the depth block into a bitstream comprising one or more encoded texture views and one or more encoded depth views.

In some examples the method further comprises:

determining the prediction method for the derivation of the first or second prediction block on the basis of one or more of the following:

the one or more encoded texture views and the one or more encoded depth views, inter-view prediction dependencies of the one or more encoded texture views, inter-view prediction dependencies of the one or more encoded depth views, view component order of the one or more encoded texture views and the one or more encoded depth views, presence of a depth view component having a same sampling or output time as a texture view component including the texture block.

In some examples the method further comprises:

determining the availability of the co-located depth block on the basis of one or more of the following:

the one or more encoded texture views and the one or more encoded depth views, inter-view prediction dependencies of the one or more encoded texture views, inter-view prediction dependencies of the one or more encoded depth views, view component order of the one or more encoded texture views and the one or more encoded depth views, presence of a depth view component having a same sampling or output time as a texture view component including the texture block, a texture sampling grid for the texture block and a depth sampling grid for the depth block, a position of the texture sampling grid and a position of the depth sampling grid, a first spatial area covered by a texture view containing the texture block and a second spatial area covered by a depth view containing the depth block, a location and area covered by the texture block within the second spatial area.

In some examples of the method the texture block comprises one or more samples and the depth block comprises one or more samples.

In some examples of the method the examination comprises:

examining if a co-located sample in the depth block is available for each of the one or more samples of the texture block.

In some examples the method further comprises:

in response to a co-located depth sample not being available, padding or interpolating the depth sample and treating the depth block as being available.

In some examples the method further comprises:

in response to a co-located depth sample not being available, treating the depth block as being unavailable.

In some examples of the method the deriving of the second prediction block comprises:

in response to a co-located depth sample not being available, deriving the co-located depth block on the basis of view synthesis.

In some examples the method further comprises:

receiving one or more input texture views and one or more input depth views;

determining which input texture views and input depth views are encoded; and encoding one or more indications of the one or more encoded texture views and the one or more encoded depth views.

In some examples of the method the determination which input texture views and input depth views are encoded comprises one or more of the following:

concluding if input depth views are needed for prediction of any of the one or more encoded texture views, and determining that depth views needed for prediction of any of the one or more encoded texture views are encoded, while depth views not needed for prediction of any of the one or more encoded texture views are not encoded;

receiving information which texture views are expected or known to be output and determining the encoded texture and depth views to facilitate decoding or view synthesis of said texture views expected or known to be output;

In some examples of the method the determination of the encoded texture and depth views to facilitate decoding or view synthesis of said texture views expected or known to be output comprises deriving a first cost for encoding an input depth view and a first distortion for said texture views expected or known to be output decoded or synthesized using the encoded input depth view, deriving a second cost without the encoded input depth view and a second distortion for said texture views expected or known to be output decoded or synthesized without using the encoded input depth view, determining whether or not to encode the depth view on the basis of the first cost, the second cost, the first distortion and the second distortion.

In some examples the method further comprises:

deriving a first cost and a first distortion for encoding a depth view comprising the depth block and a texture view comprising the texture block on the basis of the depth block, deriving a second cost and a second distortion for encoding the texture view comprising the texture block predicted from the second prediction block, determining whether or not to encode the depth view on the basis of the first cost, the second cost, the first distortion and the second distortion.

In some examples the method further comprises:

determining inter-view prediction hierarchy of the one or more encoded texture views and the one or more encoded depth views; and encoding one or more indications of the inter-view prediction hierarchy of the one or more encoded texture views and the one or more encoded depth views.

According to a second example there is provided a method comprising:

examining availability of a depth block co-located with a texture block;

determining a prediction method for a texture block on the basis of availability of a co-located depth block; and deriving a first prediction block for the texture block on the basis of the co-located depth block, if the co-located depth block is available; and otherwise deriving a second prediction block for the texture block without using the co-located depth block.

In some examples the method further comprises:

decoding the texture block on the basis of the first or second prediction block.

In some examples the method further comprises:

decoding the texture block and the depth block from a bitstream comprising one or more encoded texture views and one or more encoded depth views.

In some examples the method further comprises:

determining a prediction method on the basis of one or more of the following the one or more encoded texture views and the one or more encoded depth views, inter-view prediction dependencies of the one or more encoded texture views, inter-view prediction dependencies of the one or more encoded depth views, view component order of the one or more encoded texture views and the one or more encoded depth views, indicated prediction method for the texture block, presence of a depth view component having a same sampling or output time as a texture view component including the texture block.

In some examples the method further comprises:

determining the availability of the co-located depth block on the basis of one or more of the following:

the one or more encoded texture views and the one or more encoded depth views, inter-view prediction dependencies of the one or more encoded texture views, inter-view prediction dependencies of the one or more encoded depth views, view component order of the one or more encoded texture views and the one or more encoded depth views, presence of a depth view component having a same sampling or output time as a texture view component including the texture block, a texture sampling grid for a texture block and a depth sampling grid for a depth block, a position of the texture sampling grid and a position of the depth sampling grid, a first spatial area covered by a texture view containing the texture block and a second spatial area covered by a depth view containing the depth block, a location and area covered by the texture block within the second spatial area.

In some examples of the method the texture block comprises one or more samples and the depth block comprises one or more samples.

In some examples of the method the examination comprises:

examining if a co-located sample in the depth block is available for each of the one or more samples of the texture block.

In some examples the method further comprises:

in response to a co-located depth sample not being available, padding or interpolating a depth sample and treating the depth block as being available.

In some examples the method further comprises:

in response to a co-located depth sample not being available, treating the depth block as being unavailable.

In some examples of the method the deriving of the second prediction block comprises:

in response to a co-located depth sample not being available, deriving the co-located depth block on the basis of view synthesis.

In some examples the method further comprises:

receiving in a bitstream one or more indications of the one or more encoded texture views and the one or more encoded depth views; and using the one or more indications to determine which input texture views and input depth views have been encoded in the bitstream.

In some examples the method further comprises receiving an indication of the availability of the co-located depth block.

In some examples of the method the deriving of the second prediction block comprises:

deriving the depth block on the basis of one of the following:

an encoded depth block;
an encoded texture block;
a reconstructed depth block; or
a reconstructed texture block; and using the derived depth block as a reference for the prediction.

In some examples the method further comprises receiving an indication of the block used in the derivation of the depth block.

According to a third example there is provided an apparatus comprising at least one processor and at least one memory including computer program code, the at least one memory and the computer program code configured to, with the at least one processor, cause the apparatus to:

examine availability of a depth block co-located with a texture block;

determine a prediction method for a texture block on the basis of availability of a co-located depth block; and derive a first prediction block for the texture block on the basis of the co-located depth block, if the co-located depth block is available; and otherwise deriving a second prediction block for the texture block without using the co-located depth block.

In some examples of the apparatus said at least one memory stored with code thereon, which when executed by said at least one processor, further causes the apparatus to:

encode the texture block on the basis of the derived first or second prediction block.

In some examples of the apparatus said at least one memory stored with code thereon, which when executed by said at least one processor, further causes the apparatus to:

encode the texture block and the depth block into a bitstream comprising one or more encoded texture views and one or more encoded depth views.

In some examples of the apparatus said at least one memory stored with code thereon, which when executed by said at least one processor, further causes the apparatus to:

determine the prediction method for the derivation of the first or second prediction block on the basis of one or more of the following:

the one or more encoded texture views and the one or more encoded depth views,
inter-view prediction dependencies of the one or more encoded texture views,
inter-view prediction dependencies of the one or more encoded depth views,
view component order of the one or more encoded texture views and the one or more encoded depth views.

In some examples of the apparatus said at least one memory stored with code thereon, which when executed by said at least one processor, further causes the apparatus to:

determine the availability of the co-located depth block on the basis of one or more of the following:

the one or more encoded texture views and the one or more encoded depth views,
inter-view prediction dependencies of the one or more encoded texture views,
inter-view prediction dependencies of the one or more encoded depth views,
view component order of the one or more encoded texture views and the one or more encoded depth views,
a texture sampling grid for a texture block and a depth sampling grid for a depth block,
a position of the texture sampling grid and a position of the depth sampling grid,
a spatial area covered by a texture view containing the texture block and a spatial area covered by a depth view containing the depth block.

In some examples of the apparatus the texture block comprises one or more samples and the depth block comprises one or more samples.

In some examples of the apparatus said at least one memory stored with code thereon, which when executed by said at least one processor, further causes the apparatus to:

examine if a co-located sample in the depth block is available for each of the one or more samples of the texture block.

In some examples of the apparatus said at least one memory stored with code thereon, which when executed by said at least one processor, further causes the apparatus, in response to a co-located depth sample not being available, to pad or to interpolate the depth sample and to treat the depth block as being available.

In some examples of the apparatus said at least one memory stored with code thereon, which when executed by said at least one processor, further causes the apparatus, in response to a co-located depth sample not being available, to treat the depth block as being unavailable.

In some examples of the apparatus said at least one memory stored with code thereon, which when executed by said at least one processor, further causes the apparatus, in response to a co-located depth sample not being available, to derive the co-located depth block on the basis of view synthesis.

In some examples of the apparatus said at least one memory stored with code thereon, which when executed by said at least one processor, further causes the apparatus to:

receive one or more input texture views and one or more input depth views;

determine which input texture views and input depth views are encoded; and encode one or more indications of the one or more encoded texture views and the one or more encoded depth views.

In some examples of the apparatus said at least one memory stored with code thereon, which when executed by said at least one processor, further causes the apparatus to:

derive a first cost and a first distortion for encoding a depth view comprising the depth block and a texture view comprising the texture block on the basis of the depth block, derive a second cost and a second distortion for encoding the texture view comprising the texture block predicted from the second prediction block, determine whether or not to encode the depth view on the basis of the first cost, the second cost, the first distortion and the second distortion.

In some examples of the apparatus said at least one memory stored with code thereon, which when executed by said at least one processor, further causes the apparatus to:

determine inter-view prediction hierarchy of the one or more encoded texture views and the one or more encoded depth views; and encode one or more indications of the inter-view prediction hierarchy of the one or more encoded texture views and the one or more encoded depth views.

According to a fourth example there is provided an apparatus comprising at least one processor and at least one memory including computer program code, the at least one memory and the computer program code configured to, with the at least one processor, cause the apparatus to:

examine availability of a depth block co-located with a texture block;

determine a prediction method for a texture block on the basis of availability of a co-located depth block; and derive a first prediction block for the texture block on the basis of the co-located depth block, if the co-located depth block is available; and otherwise deriving a second prediction block for the texture block without using the co-located depth block.

In some examples of the apparatus said at least one memory stored with code thereon, which when executed by said at least one processor, further causes the apparatus to:

decode the texture block on the basis of the first or second prediction block.

In some examples of the apparatus said at least one memory stored with code thereon, which when executed by said at least one processor, further causes the apparatus to:

decode the texture block and the depth block from a bitstream comprising one or more encoded texture views and one or more encoded depth views.

In some examples of the apparatus said at least one memory stored with code thereon, which when executed by said at least one processor, further causes the apparatus to:

determine a prediction method on the basis of one or more of the following the one or more encoded texture views and the one or more encoded depth views, inter-view prediction dependencies of the one or more encoded texture views, inter-view prediction dependencies of the one or more encoded depth views, view component order of the one or more encoded texture views and the one or more encoded depth views, indicated prediction method for the texture block.

In some examples of the apparatus said at least one memory stored with code thereon, which when executed by said at least one processor, further causes the apparatus to:

determine the availability of the co-located depth block on the basis of one or more of the following:

the one or more encoded texture views and the one or more encoded depth views, inter-view prediction dependencies of the one or more encoded texture views, inter-view prediction dependencies of the one or more encoded depth views, view component order of the one or more encoded texture views and the one or more encoded depth views, a texture sampling grid for a texture block and a depth sampling grid for a depth block, a position of the texture sampling grid and a position of the depth sampling grid, a spatial area covered by a texture view containing the texture block and a spatial area covered by a depth view containing the depth block.

In some examples of the apparatus the texture block comprises one or more samples and the depth block comprises one or more samples.

In some examples of the apparatus said at least one memory stored with code thereon, which when executed by said at least one processor, further causes the apparatus to:

examine if a co-located sample in the depth block is available for each of the one or more samples of the texture block.

In some examples of the apparatus said at least one memory stored with code thereon, which when executed by said at least one processor, further causes the apparatus, in response to a co-located depth sample not being available, to pad or to interpolating a depth sample and to treat the depth block as being available.

In some examples of the apparatus said at least one memory stored with code thereon, which when executed by said at least one processor, further causes the apparatus, in response to a co-located depth sample not being available, to treat the depth block as being unavailable.

In some examples of the apparatus said at least one memory stored with code thereon, which when executed by said at least one processor, further causes the apparatus, in response to a co-located depth sample not being available, to derive the co-located depth block on the basis of view synthesis.

In some examples of the apparatus said at least one memory stored with code thereon, which when executed by said at least one processor, further causes the apparatus to:

receive in a bitstream one or more indications of the one or more encoded texture views and the one or more encoded depth views; and use the one or more indications to determine which input texture views and input depth views have been encoded in the bitstream.

In some examples of the apparatus said at least one memory stored with code thereon, which when executed by said at least one processor, further causes the apparatus to receive an indication of the availability of the co-located depth block.

In some examples of the apparatus said at least one memory stored with code thereon, which when executed by said at least one processor, further causes the apparatus to:
derive the depth block on the basis of one of the following:
an encoded depth block;
an encoded texture block;
a reconstructed depth block; or
a reconstructed texture block; and
use the derived depth block as a reference for the prediction.

In some examples of the apparatus said at least one memory stored with code thereon, which when executed by said at least one processor, further causes the apparatus to receive an indication of the block used in the derivation of the depth block.

According to a fifth example there is provided an apparatus comprising:
means for examining availability of a depth block co-located with a texture block;
means for determining a prediction method for a texture block on the basis of availability of a co-located depth block; and
means for deriving a first prediction block for the texture block on the basis of the co-located depth block, if the co-located depth block is available; and otherwise deriving a second prediction block for the texture block without using the co-located depth block.

In some examples the apparatus further comprises:
means for encoding the texture block on the basis of the derived first or second prediction block.

In some examples the apparatus further comprises:
means for encoding the texture block and the depth block into a bitstream comprising one or more encoded texture views and one or more encoded depth views.

In some examples the apparatus further comprises:
means for determining the prediction method for the derivation of the first or second prediction block on the basis of one or more of the following:
the one or more encoded texture views and the one or more encoded depth views,
inter-view prediction dependencies of the one or more encoded texture views,
inter-view prediction dependencies of the one or more encoded depth views,
view component order of the one or more encoded texture views and the one or more encoded depth views.

In some examples the apparatus further comprises:
means for determining the availability of the co-located depth block on the basis of one or more of the following:
the one or more encoded texture views and the one or more encoded depth views,
inter-view prediction dependencies of the one or more encoded texture views,
inter-view prediction dependencies of the one or more encoded depth views,
view component order of the one or more encoded texture views and the one or more encoded depth views,
a texture sampling grid for a texture block and a depth sampling grid for a depth block,
a position of the texture sampling grid and a position of the depth sampling grid,
a spatial area covered by a texture view containing the texture block and a spatial area covered by a depth view containing the depth block.

In some examples of the apparatus the texture block comprises one or more samples and the depth block comprises one or more samples.

In some examples of the apparatus the means for examining comprises:
means for examining if a co-located sample in the depth block is available for each of the one or more samples of the texture block.

In some examples the apparatus further comprises:
means for padding or interpolating the depth sample and means for treating the depth block as being available in response to a co-located depth sample not being available.

In some examples the apparatus further comprises:
means for treating the depth block as being unavailable in response to a co-located depth sample not being available.

In some examples of the apparatus the means for deriving of the second prediction block comprising:
means for deriving the co-located depth block on the basis of view synthesis in response to a co-located depth sample not being available.

In some examples the apparatus further comprises:
means for receiving one or more input texture views and one or more input depth views;
means for determining which input texture views and input depth views are encoded; and
means for encoding one or more indications of the one or more encoded texture views and the one or more encoded depth views.

In some examples the apparatus further comprises:
means for deriving a first cost and a first distortion for encoding a depth view comprising the depth block and a texture view comprising the texture block on the basis of the depth block,
means for deriving a second cost and a second distortion for encoding the texture view comprising the texture block predicted from the second prediction block,
means for determining whether or not to encode the depth view on the basis of the first cost, the second cost, the first distortion and the second distortion.

In some examples the apparatus further comprises:
means for determining inter-view prediction hierarchy of the one or more encoded texture views and the one or more encoded depth views; and
means for encoding one or more indications of the inter-view prediction hierarchy of the one or more encoded texture views and the one or more encoded depth views.

According to a sixth example there is provided an apparatus comprising:
means for examining availability of a depth block co-located with a texture block;
determining a prediction method for a texture block on the basis of availability of a co-located depth block; and
means for deriving a first prediction block for the texture block on the basis of the co-located depth block, if the co-located depth block is available; and otherwise deriving a second prediction block for the texture block without using the co-located depth block.

In some examples the apparatus further comprises:
means for decoding the texture block on the basis of the first or second prediction block.

In some examples the apparatus further comprises:
means for decoding the texture block and the depth block from a bitstream comprising one or more encoded texture views and one or more encoded depth views.

In some examples the apparatus further comprises:
means for determining a prediction method on the basis of one or more of the following
- the one or more encoded texture views and the one or more encoded depth views,
- inter-view prediction dependencies of the one or more encoded texture views,
- inter-view prediction dependencies of the one or more encoded depth views,
- view component order of the one or more encoded texture views and the one or more encoded depth views,
- indicated prediction method for the texture block.

In some examples the apparatus further comprises:
means for determining the availability of the co-located depth block on the basis of one or more of the following:
- the one or more encoded texture views and the one or more encoded depth views,
- inter-view prediction dependencies of the one or more encoded texture views,
- inter-view prediction dependencies of the one or more encoded depth views,
- view component order of the one or more encoded texture views and the one or more encoded depth views,
- a texture sampling grid for a texture block and a depth sampling grid for a depth block,
- a position of the texture sampling grid and a position of the depth sampling grid,
- a spatial area covered by a texture view containing the texture block and a spatial area covered by a depth view containing the depth block.

In some examples of the apparatus the texture block comprises one or more samples and the depth block comprises one or more samples.

In some examples of the apparatus the means for examining comprises:
means for examining if a co-located sample in the depth block is available for each of the one or more samples of the texture block.

In some examples the apparatus further comprises:
means for padding or interpolating a depth sample and means for treating the depth block as being available in response to a co-located depth sample not being available.

In some examples the apparatus further comprises:
means for treating the depth block as being unavailable in response to a co-located depth sample not being available.

In some examples of the apparatus the means for deriving of the second prediction block comprising:
means for deriving the co-located depth block on the basis of view synthesis in response to a co-located depth sample not being available.

In some examples the apparatus further comprises:
means for receiving in a bitstream one or more indications of the one or more encoded texture views and the one or more encoded depth views; and
means for using the one or more indications to determine which input texture views and input depth views have been encoded in the bitstream.

In some examples the apparatus further comprises means for receiving an indication of the availability of the co-located depth block.

In some examples of the apparatus the means for deriving of the second prediction block comprises:
means for deriving the depth block on the basis of one of the following:
- an encoded depth block;
- an encoded texture block;
- a reconstructed depth block; or
- a reconstructed texture block; and
using the derived depth block as a reference for the prediction.

In some examples the apparatus further comprises means for receiving an indication of the block used in the derivation of the depth block.

According to a seventh example there is provided a computer program product including one or more sequences of one or more instructions which, when executed by one or more processors, cause an apparatus to at least perform the following:
- examine availability of a depth block co-located with a texture block;
- determine a prediction method for a texture block on the basis of availability of a co-located depth block; and
- derive a first prediction block for the texture block on the basis of the co-located depth block, if the co-located depth block is available; and otherwise deriving a second prediction block for the texture block without using the co-located depth block.

In some examples the computer program product further comprises one or more sequences of one or more instructions which, when executed by one or more processors, cause the apparatus to:
encode the texture block on the basis of the derived first or second prediction block.

In some examples the computer program product further comprises one or more sequences of one or more instructions which, when executed by one or more processors, cause the apparatus to:
encode the texture block and the depth block into a bitstream comprising one or more encoded texture views and one or more encoded depth views.

In some examples the computer program product further comprises one or more sequences of one or more instructions which, when executed by one or more processors, cause the apparatus to:
determine the prediction method for the derivation of the first or second prediction block on the basis of one or more of the following:
- the one or more encoded texture views and the one or more encoded depth views,
- inter-view prediction dependencies of the one or more encoded texture views,
- inter-view prediction dependencies of the one or more encoded depth views,
- view component order of the one or more encoded texture views and the one or more encoded depth views.

In some examples the computer program product further comprises one or more sequences of one or more instructions which, when executed by one or more processors, cause the apparatus to:
determine the availability of the co-located depth block on the basis of one or more of the following:
- the one or more encoded texture views and the one or more encoded depth views,
- inter-view prediction dependencies of the one or more encoded texture views,
- inter-view prediction dependencies of the one or more encoded depth views,
- view component order of the one or more encoded texture views and the one or more encoded depth views,
- a texture sampling grid for a texture block and a depth sampling grid for a depth block, a position of the texture sampling grid and a position of the depth sampling grid, a spatial area covered by a texture view containing the texture block and a spatial area covered by a depth view containing the depth block.

In some examples of the computer program product the texture block comprises one or more samples and the depth block comprises one or more samples.

In some examples the computer program product further comprises one or more sequences of one or more instructions which, when executed by one or more processors, cause the apparatus to:

examine if a co-located sample in the depth block is available for each of the one or more samples of the texture block.

In some examples the computer program product further comprises one or more sequences of one or more instructions which, when executed by one or more processors, cause the apparatus, in response to a co-located depth sample not being available, to pad or to interpolate the depth sample and to treat the depth block as being available.

In some examples the computer program product further comprises one or more sequences of one or more instructions which, when executed by one or more processors, cause the apparatus, in response to a co-located depth sample not being available, to treat the depth block as being unavailable.

In some examples the computer program product further comprises one or more sequences of one or more instructions which, when executed by one or more processors, cause the apparatus, in response to a co-located depth sample not being available, to derive the co-located depth block on the basis of view synthesis.

In some examples the computer program product further comprises one or more sequences of one or more instructions which, when executed by one or more processors, cause the apparatus to:

receive one or more input texture views and one or more input depth views;

determine which input texture views and input depth views are encoded; and encode one or more indications of the one or more encoded texture views and the one or more encoded depth views.

In some examples the computer program product further comprises one or more sequences of one or more instructions which, when executed by one or more processors, cause the apparatus to:

derive a first cost and a first distortion for encoding a depth view comprising the depth block and a texture view comprising the texture block on the basis of the depth block, derive a second cost and a second distortion for encoding the texture view comprising the texture block predicted from the second prediction block, determine whether or not to encode the depth view on the basis of the first cost, the second cost, the first distortion and the second distortion.

In some examples the computer program product further comprises one or more sequences of one or more instructions which, when executed by one or more processors, cause the apparatus to:

determine inter-view prediction hierarchy of the one or more encoded texture views and the one or more encoded depth views; and encode one or more indications of the inter-view prediction hierarchy of the one or more encoded texture views and the one or more encoded depth views.

According to an eighth example there is provided a computer program product including one or more sequences of one or more instructions which, when executed by one or more processors, cause an apparatus to at least perform the following:

examine availability of a depth block co-located with a texture block;

determine a prediction method for a texture block on the basis of availability of a co-located depth block; and derive a first prediction block for the texture block on the basis of the co-located depth block, if the co-located depth block is available; and otherwise deriving a second prediction block for the texture block without using the co-located depth block.

In some examples the computer program product further comprises one or more sequences of one or more instructions which, when executed by one or more processors, cause the apparatus to:

decode the texture block on the basis of the first or second prediction block.

In some examples the computer program product further comprises one or more sequences of one or more instructions which, when executed by one or more processors, cause the apparatus to:

decode the texture block and the depth block from a bitstream comprising one or more encoded texture views and one or more encoded depth views.

In some examples the computer program product further comprises one or more sequences of one or more instructions which, when executed by one or more processors, cause the apparatus to:

determine a prediction method on the basis of one or more of the following the one or more encoded texture views and the one or more encoded depth views, inter-view prediction dependencies of the one or more encoded texture views, inter-view prediction dependencies of the one or more encoded depth views, view component order of the one or more encoded texture views and the one or more encoded depth views, indicated prediction method for the texture block.

In some examples the computer program product further comprises one or more sequences of one or more instructions which, when executed by one or more processors, cause the apparatus to:

determine the availability of the co-located depth block on the basis of one or more of the following:

the one or more encoded texture views and the one or more encoded depth views, inter-view prediction dependencies of the one or more encoded texture views, inter-view prediction dependencies of the one or more encoded depth views, view component order of the one or more encoded texture views and the one or more encoded depth views, a texture sampling grid for a texture block and a depth sampling grid for a depth block, a position of the texture sampling grid and a position of the depth sampling grid, a spatial area covered by a texture view containing the texture block and a spatial area covered by a depth view containing the depth block.

In some examples of the computer program product the texture block comprises one or more samples and the depth block comprises one or more samples.

In some examples the computer program product further comprises one or more sequences of one or more instructions which, when executed by one or more processors, cause the apparatus to:

examine if a co-located sample in the depth block is available for each of the one or more samples of the texture block.

In some examples the computer program product further comprises one or more sequences of one or more instructions which, when executed by one or more processors, cause the apparatus, in response to a co-located depth sample not being available, to pad or to interpolating a depth sample and to treat the depth block as being available.

In some examples the computer program product further comprises one or more sequences of one or more instructions which, when executed by one or more processors, cause the apparatus, in response to a co-located depth sample not being available, to treat the depth block as being unavailable.

In some examples the computer program product further comprises one or more sequences of one or more instructions which, when executed by one or more processors, cause the apparatus, in response to a co-located depth sample not being available, to derive the co-located depth block on the basis of view synthesis.

In some examples the computer program product further comprises one or more sequences of one or more instructions which, when executed by one or more processors, cause the apparatus to:

receive in a bitstream one or more indications of the one or more encoded texture views and the one or more encoded depth views; and use the one or more indications to determine which input texture views and input depth views have been encoded in the bitstream.

In some examples the computer program product further comprises one or more sequences of one or more instructions which, when executed by one or more processors, cause the apparatus to receive an indication of the availability of the co-located depth block.

In some examples the computer program product further comprises one or more sequences of one or more instructions which, when executed by one or more processors, cause the apparatus to:

derive the depth block on the basis of one of the following:
  an encoded depth block;
  an encoded texture block;
  a reconstructed depth block; or
  a reconstructed texture block; and
  use the derived depth block as a reference for the prediction.

In some examples the computer program product further comprises one or more sequences of one or more instructions which, when executed by one or more processors, cause the apparatus to receive an indication of the block used in the derivation of the depth block.

According to a ninth example there is provided a method comprising:

receiving, capturing, or deriving one or more input texture views and one or more input depth views;

determining which input texture views and input depth views are encoded;

encoding one or more indications of the one or more encoded texture views and the one or more encoded depth views; and encoding the input texture views and the input depth views determined to be encoded into a bitstream, wherein the encoded texture views and the encoded depth views having one or more of the following characteristics:

an encoded depth view represents a viewpoint that is not represented by any encoded texture view of the bitstream;

two or more encoded depth views represent a same viewpoint;

a first encoded depth view comprises depth view components of a first depth map type and a second encoded depth view comprises depth view components of a second depth map type, the first depth map type and the second depth map type being different;

an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:

a ratio of a horizontal or vertical sample dimension of the first sampling grid and a horizontal or vertical sample dimension, respectively, of the second sampling grid is not an integer;

the first sampling grid does not cover the same sampling area as the second sampling grid.

In some examples of the method the two or more encoded depth views representing the same viewpoint are further characterized by one or more of the following:

a first depth view among the two or more encoded depth views is intended for view synthesis towards a first direction or to a first viewpoint and a second depth view among the two or more coded depth views is intended for view synthesis towards a second direction or to a second view point, wherein the first direction is different from the second direction and the first viewpoint is different from the second viewpoint;

a first depth view among the two or more encoded depth views is intended for a first display arrangement or viewing situation and a second depth view among the two or more encoded depth views is intended for a second display arrangement or viewing situation, wherein the first display arrangement or viewing situation is different from the second display arrangement or viewing situation.

In some examples the method further comprises:

determining that the first encoded depth view is of the first depth map type and the second encoded depth view is of the second depth map type on the basis of one or more of the following:

a prediction mechanism used in the bitstream requires the use of the first depth map type and/or the second depth map type;

a prediction mechanism used in the bitstream causes fewer computations when the first depth map type and/or the second depth map type are used rather than another depth map type.

According to a tenth example there is provided a method comprising:

receiving, capturing, or deriving one or more input texture views and one or more input depth views;

determining which input texture views and input depth views are encoded, wherein the determination comprises one or more of the following:

concluding if input depth views are needed for prediction of any of the one or more encoded texture views, and determining that depth views needed for prediction of any of the one or more encoded texture views are encoded, while depth views not needed for prediction of any of the one or more encoded texture views are not encoded;

receiving information which texture views are expected or known to be output on the basis of the bitstream and determining the encoded texture and depth views to facilitate decoding or view synthesis of said texture views expected or known to be output;

encoding the input texture views and the input depth views determined to be encoded into a bitstream; and encoding one or more indications of the one or more encoded texture views and the one or more encoded depth views.

In some examples of the method the determination of the encoded texture and depth views to facilitate decoding or view synthesis of said texture views expected or known to be output comprises deriving a first cost for encoding an input depth view and a first distortion for said texture views expected or known to be output decoded or synthesized using the encoded input depth view, deriving a second cost without the encoded input depth view and a second distortion for said texture views expected or known to be output decoded or synthesized without using the encoded input depth view, determining whether or not to encode the depth view on the basis of the first cost, the second cost, the first distortion and the second distortion.

According to an eleventh example there is provided a method comprising:

receiving one or more encoded texture views and one or more encoded depth views;

decoding one or more indications of the one or more encoded texture views and the one or more encoded depth views to determine which input texture views and input depth views have been encoded; and decoding the encoded texture views and the encoded depth views from a bitstream, wherein the encoded texture views and the encoded depth views having one or more of the following characteristics:

an encoded depth view represents a viewpoint that is not represented by any encoded texture view of the bitstream;

two or more encoded depth views represent a same viewpoint;

a first encoded depth view comprises depth view components of a first depth map type and a second encoded depth view comprises depth view components of a second depth map type, the first depth map type and the second depth map type being different;

an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:

a ratio of a horizontal or vertical sample dimension of the first sampling grid and a horizontal or vertical sample dimension, respectively, of the second sampling grid is not an integer;

the first sampling grid does not cover the same sampling area as the second sampling grid.

In some examples of the method the two or more encoded depth views representing the same viewpoint are further characterized by one or more of the following:

using a first depth view among the two or more encoded depth views for view synthesis towards a first direction or to a first viewpoint and using a second depth view among the two or more coded depth views for view synthesis towards a second direction or to a second view point, wherein the first direction is different from the second direction and the first viewpoint is different from the second viewpoint;

using a first depth view among the two or more encoded depth views for a first display arrangement or viewing situation and using a second depth view among the two or more encoded depth views for a second display arrangement or viewing situation, wherein the first display arrangement or viewing situation is different from the second display arrangement or viewing situation.

According to a twelfth example there is provided an apparatus comprising at least one processor and at least one memory including computer program code, the at least one memory and the computer program code configured to, with the at least one processor, cause the apparatus to:

receive, capture, or derive one or more input texture views and one or more input depth views;

determine which input texture views and input depth views are encoded;

encode one or more indications of the one or more encoded texture views and the one or more encoded depth views; and encode the input texture views and the input depth views determined to be encoded into a bitstream, wherein the encoded texture views and the encoded depth views having one or more of the following characteristics:

an encoded depth view represents a viewpoint that is not represented by any encoded texture view of the bitstream;

two or more encoded depth views represent a same viewpoint;

a first encoded depth view comprises depth view components of a first depth map type and a second encoded depth view comprises depth view components of a second depth map type, the first depth map type and the second depth map type being different;

an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:

a ratio of a horizontal or vertical sample dimension of the first sampling grid and a horizontal or vertical sample dimension, respectively, of the second sampling grid is not an integer;

the first sampling grid does not cover the same sampling area as the second sampling grid.

In some examples of the apparatus the two or more encoded depth views representing the same viewpoint are further characterized by one or more of the following:

a first depth view among the two or more encoded depth views is intended for view synthesis towards a first direction or to a first viewpoint and a second depth view among the two or more coded depth views is intended for view synthesis towards a second direction or to a second view point, wherein the first direction is different from the second direction and the first viewpoint is different from the second viewpoint;

a first depth view among the two or more encoded depth views is intended for a first display arrangement or viewing situation and a second depth view among the two or more encoded depth views is intended for a second display arrangement or viewing situation, wherein the first display arrangement or viewing situation is different from the second display arrangement or viewing situation.

In some examples of the apparatus said at least one memory stored with code thereon, which when executed by said at least one processor, further causes the apparatus to determine that the first encoded depth view is of the first depth map type and the second encoded depth view is of the second depth map type on the basis of one or more of the following:

a prediction mechanism used in the bitstream requires the use of the first depth map type and/or the second depth map type;

a prediction mechanism used in the bitstream causes fewer computations when the first depth map type and/or the second depth map type are used rather than another depth map type.

According to a thirteenth example there is provided an apparatus comprising at least one processor and at least one memory including computer program code, the at least one memory and the computer program code configured to, with the at least one processor, cause the apparatus to:

receive, capture, or derive one or more input texture views and one or more input depth views;

determine which input texture views and input depth views are encoded, wherein the determination comprises one or more of the following:

conclude if input depth views are needed for prediction of any of the one or more encoded texture views, and determine that depth views needed for prediction of any of the one or more encoded texture views are encoded, while depth views not needed for prediction of any of the one or more encoded texture views are not encoded;

receive information which texture views are expected or known to be output on the basis of the bitstream and determine the encoded texture and depth views to facilitate decoding or view synthesis of said texture views expected or known to be output;

encode the input texture views and the input depth views determined to be encoded into a bitstream; and encode one or more indications of the one or more encoded texture views and the one or more encoded depth views.

In some examples of the apparatus the determination of the encoded texture and depth views to facilitate decoding or view synthesis of said texture views expected or known to be output comprises code, which when executed by said at least one processor, further causes the apparatus to perform one or more of the following:

derive a first cost for encoding an input depth view and a first distortion for said texture views expected or known to be output decoded or synthesized using the encoded input depth view, derive a second cost without the encoded input depth view and a second distortion for said texture views expected or known to be output decoded or synthesized without using the encoded input depth view, determine whether or not to encode the depth view on the basis of the first cost, the second cost, the first distortion and the second distortion.

According to a fourteenth example there is provided an apparatus comprising at least one processor and at least one memory including computer program code, the at least one memory and the computer program code configured to, with the at least one processor, cause the apparatus to:

receive one or more encoded texture views and one or more encoded depth views;

decode one or more indications of the one or more encoded texture views and the one or more encoded depth views to determine which input texture views and input depth views have been encoded; and decode the encoded texture views and the encoded depth views from a bitstream, wherein the encoded texture views and the encoded depth views having one or more of the following characteristics:

an encoded depth view represents a viewpoint that is not represented by any encoded texture view of the bitstream;

two or more encoded depth views represent a same viewpoint;

a first encoded depth view comprises depth view components of a first depth map type and a second encoded depth view comprises depth view components of a second depth map type, the first depth map type and the second depth map type being different;

an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:

a ratio of a horizontal or vertical sample dimension of the first sampling grid and a horizontal or vertical sample dimension, respectively, of the second sampling grid is not an integer;

the first sampling grid does not cover the same sampling area as the second sampling grid.

In some examples of the apparatus said at least one memory stored with code thereon, which when executed by said at least one processor, further causes the apparatus to perform one or more of the following:

use a first depth view among the two or more encoded depth views for view synthesis towards a first direction or to a first viewpoint and using a second depth view among the two or more coded depth views for view synthesis towards a second direction or to a second view point, wherein the first direction is different from the second direction and the first viewpoint is different from the second viewpoint;

use a first depth view among the two or more encoded depth views for a first display arrangement or viewing situation and using a second depth view among the two or more encoded depth views for a second display arrangement or viewing situation, wherein the first display arrangement or viewing situation is different from the second display arrangement or viewing situation.

According to a fifteenth example there is provided an apparatus comprising:

means for receiving, capturing, or deriving one or more input texture views and one or more input depth views;

means for determining which input texture views and input depth views are encoded;

means for encoding one or more indications of the one or more encoded texture views and the one or more encoded depth views; and means for encoding the input texture views and the input depth views determined to be encoded into a bitstream, wherein the encoded texture views and the encoded depth views having one or more of the following characteristics:
- an encoded depth view represents a viewpoint that is not represented by any encoded texture view of the bitstream;
- two or more encoded depth views represent a same viewpoint;
- a first encoded depth view comprises depth view components of a first depth map type and a second encoded depth view comprises depth view components of a second depth map type, the first depth map type and the second depth map type being different;
- an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:
  - a ratio of a horizontal or vertical sample dimension of the first sampling grid and a horizontal or vertical sample dimension, respectively, of the second sampling grid is not an integer;
  - the first sampling grid does not cover the same sampling area as the second sampling grid.

In some examples of the apparatus the two or more encoded depth views representing the same viewpoint are further characterized by one or more of the following:
- a first depth view among the two or more encoded depth views is intended for view synthesis towards a first direction or to a first viewpoint and a second depth view among the two or more coded depth views is intended for view synthesis towards a second direction or to a second view point, wherein the first direction is different from the second direction and the first viewpoint is different from the second viewpoint;
- a first depth view among the two or more encoded depth views is intended for a first display arrangement or viewing situation and a second depth view among the two or more encoded depth views is intended for a second display arrangement or viewing situation, wherein the first display arrangement or viewing situation is different from the second display arrangement or viewing situation.

In some examples the apparatus further comprises:
means for determining that the first encoded depth view is of the first depth map type and the second encoded depth view is of the second depth map type on the basis of one or more of the following:
- a prediction mechanism used in the bitstream requires the use of the first depth map type and/or the second depth map type;
- a prediction mechanism used in the bitstream causes fewer computations when the first depth map type and/or the second depth map type are used rather than another depth map type.

According to a sixteenth example there is provided an apparatus comprising:
means for receiving, capturing, or deriving one or more input texture views and one or more input depth views;
means for determining which input texture views and input depth views are encoded, wherein the means for determination comprises one or more of the following:
means for concluding if input depth views are needed for prediction of any of the one or more encoded texture views, and determining that depth views needed for prediction of any of the one or more encoded texture views are encoded, while depth views not needed for prediction of any of the one or more encoded texture views are not encoded;
means for receiving information which texture views are expected or known to be output on the basis of the bitstream and determining the encoded texture and depth views to facilitate decoding or view synthesis of said texture views expected or known to be output;
means for encoding the input texture views and the input depth views determined to be encoded into a bitstream; and
means for encoding one or more indications of the one or more encoded texture views and the one or more encoded depth views.

In some examples of the apparatus the means for determination of the encoded texture and depth views to facilitate decoding or view synthesis of said texture views expected or known to be output comprises
means for deriving a first cost for encoding an input depth view and a first distortion for said texture views expected or known to be output decoded or synthesized using the encoded input depth view,
means for deriving a second cost without the encoded input depth view and a second distortion for said texture views expected or known to be output decoded or synthesized without using the encoded input depth view,
means for determining whether or not to encode the depth view on the basis of the first cost, the second cost, the first distortion and the second distortion.

According to a seventeenth example there is provided an apparatus comprising:
means for receiving one or more encoded texture views and one or more encoded depth views;
means for decoding one or more indications of the one or more encoded texture views and the one or more encoded depth views to determine which input texture views and input depth views have been encoded; and
means for decoding the encoded texture views and the encoded depth views from a bitstream, wherein the encoded texture views and the encoded depth views having one or more of the following characteristics:
- an encoded depth view represents a viewpoint that is not represented by any encoded texture view of the bitstream;
- two or more encoded depth views represent a same viewpoint;
- a first encoded depth view comprises depth view components of a first depth map type and a second encoded depth view comprises depth view components of a second depth map type, the first depth map type and the second depth map type being different;
- an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:
  - a ratio of a horizontal or vertical sample dimension of the first sampling grid and a horizontal or vertical sample dimension, respectively, of the second sampling grid is not an integer;
  - the first sampling grid does not cover the same sampling area as the second sampling grid.

In some examples the apparatus further comprises one or more of the following:

means for using a first depth view among the two or more encoded depth views for view synthesis towards a first direction or to a first viewpoint and using a second depth view among the two or more coded depth views for view synthesis towards a second direction or to a second view point, wherein the first direction is different from the second direction and the first viewpoint is different from the second viewpoint;

means for using a first depth view among the two or more encoded depth views for a first display arrangement or viewing situation and using a second depth view among the two or more encoded depth views for a second display arrangement or viewing situation, wherein the first display arrangement or viewing situation is different from the second display arrangement or viewing situation.

According to an eighteenth example there is provided a computer program product including one or more sequences of one or more instructions which, when executed by one or more processors, cause an apparatus to at least perform the following:

receive, capture, or derive one or more input texture views and one or more input depth views;

determine which input texture views and input depth views are encoded;

encode one or more indications of the one or more encoded texture views and the one or more encoded depth views; and encode the input texture views and the input depth views determined to be encoded into a bitstream, wherein the encoded texture views and the encoded depth views having one or more of the following characteristics:

an encoded depth view represents a viewpoint that is not represented by any encoded texture view of the bitstream;

two or more encoded depth views represent a same viewpoint;

a first encoded depth view comprises depth view components of a first depth map type and a second encoded depth view comprises depth view components of a second depth map type, the first depth map type and the second depth map type being different;

an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:

a ratio of a horizontal or vertical sample dimension of the first sampling grid and a horizontal or vertical sample dimension, respectively, of the second sampling grid is not an integer;

the first sampling grid does not cover the same sampling area as the second sampling grid.

In some examples of the computer program product the two or more encoded depth views representing the same viewpoint are further characterized by one or more of the following:

a first depth view among the two or more encoded depth views is intended for view synthesis towards a first direction or to a first viewpoint and a second depth view among the two or more coded depth views is intended for view synthesis towards a second direction or to a second view point, wherein the first direction is different from the second direction and the first viewpoint is different from the second viewpoint;

a first depth view among the two or more encoded depth views is intended for a first display arrangement or viewing situation and a second depth view among the two or more encoded depth views is intended for a second display arrangement or viewing situation, wherein the first display arrangement or viewing situation is different from the second display arrangement or viewing situation.

In some examples the computer program product further comprises one or more sequences of one or more instructions which, when executed by one or more processors, cause the apparatus to determine that the first encoded depth view is of the first depth map type and the second encoded depth view is of the second depth map type on the basis of one or more of the following:

a prediction mechanism used in the bitstream requires the use of the first depth map type and/or the second depth map type;

a prediction mechanism used in the bitstream causes fewer computations when the first depth map type and/or the second depth map type are used rather than another depth map type.

According to a nineteenth example there is provided a computer program product including one or more sequences of one or more instructions which, when executed by one or more processors, cause an apparatus to at least perform the following:

receive, capture, or derive one or more input texture views and one or more input depth views;

determine which input texture views and input depth views are encoded, wherein the determination comprises one or more of the following:

conclude if input depth views are needed for prediction of any of the one or more encoded texture views, and determine that depth views needed for prediction of any of the one or more encoded texture views are encoded, while depth views not needed for prediction of any of the one or more encoded texture views are not encoded;

receive information which texture views are expected or known to be output on the basis of the bitstream and determine the encoded texture and depth views to facilitate decoding or view synthesis of said texture views expected or known to be output;

encode the input texture views and the input depth views determined to be encoded into a bitstream; and encode one or more indications of the one or more encoded texture views and the one or more encoded depth views.

In some examples of the computer program product the determination of the encoded texture and depth views to facilitate decoding or view synthesis of said texture views expected or known to be output includes one or more sequences of one or more instructions which, when executed by one or more processors, cause the apparatus to:

derive a first cost for encoding an input depth view and a first distortion for said texture views expected or known to be output decoded or synthesized using the encoded input depth view, derive a second cost without the encoded input depth view and a second distortion for said texture views expected or known to be output decoded or synthesized without using the encoded input depth view, determine whether or not to encode the depth view on the basis of the first cost, the second cost, the first distortion and the second distortion.

According to a twentieth example there is provided a computer program product including one or more sequences of one or more instructions which, when executed by one or more processors, cause an apparatus to at least perform the following:

receive one or more encoded texture views and one or more encoded depth views;

decode one or more indications of the one or more encoded texture views and the one or more encoded depth views to determine which input texture views and input depth views have been encoded; and decode the encoded texture views and the encoded depth views from a bitstream, wherein the encoded texture views and the encoded depth views having one or more of the following characteristics:

- an encoded depth view represents a viewpoint that is not represented by any encoded texture view of the bitstream;
- two or more encoded depth views represent a same viewpoint;
- a first encoded depth view comprises depth view components of a first depth map type and a second encoded depth view comprises depth view components of a second depth map type, the first depth map type and the second depth map type being different;
- an encoded depth view and an encoded texture view represent a same viewpoint, a first sampling grid being used for depth view components of the encoded depth view and a second sampling grid being used for texture view component of the encoded texture view, and the first sampling grid and the second sampling grid having one or more of the following characteristics:
  - a ratio of a horizontal or vertical sample dimension of the first sampling grid and a horizontal or vertical sample dimension, respectively, of the second sampling grid is not an integer;
  - the first sampling grid does not cover the same sampling area as the second sampling grid.

In some examples the computer program product further comprises one or more sequences of one or more instructions which, when executed by one or more processors, cause the apparatus to perform one or more of the following:

use a first depth view among the two or more encoded depth views for view synthesis towards a first direction or to a first viewpoint and using a second depth view among the two or more coded depth views for view synthesis towards a second direction or to a second view point, wherein the first direction is different from the second direction and the first viewpoint is different from the second viewpoint;

use a first depth view among the two or more encoded depth views for a first display arrangement or viewing situation and using a second depth view among the two or more encoded depth views for a second display arrangement or viewing situation, wherein the first display arrangement or viewing situation is different from the second display arrangement or viewing situation.

According to a twenty-first example there is provided a method comprising receiving from a bitstream a first depth view of a first viewpoint, the bitstream not including a texture view of the first viewpoint, decoding the first depth view, using backward view synthesis to the first viewpoint based on the decoded first depth view.

We claim:

1. A method comprising:
examining availability of a depth block co-located with a texture block;
on the basis of a co-located depth sample within the co-located depth block being unavailable in said examining, padding or interpolating the co-located depth sample on the basis of one or more available depth samples and treating the co-located depth block as available and determining a prediction method to use the co-located depth block; and
deriving a prediction block for the texture block on the basis of the prediction method.

2. The method according to claim 1 further comprising one of the following:
encoding the texture block on the basis of the derived prediction block to a bitstream, wherein the bitstream is being formed for comprising one or more encoded texture views and one or more encoded depth views;
decoding the texture block on the basis of the derived prediction block from a bitstream comprising one or more encoded texture views and one or more encoded depth views.

3. The method according to claim 2 comprising:
determining the prediction method for the derivation of the prediction block on the basis of one or more of the following:
the one or more encoded texture views and the one or more encoded depth views,
inter-view prediction dependencies of the one or more encoded texture views,
inter-view prediction dependencies of the one or more encoded depth views,
view component order of the one or more encoded texture views and the one or more encoded depth views,
presence of a depth view component having a same sampling or output time as a texture view component including the texture block.

4. The method according to claim 2 comprising:
determining the availability of the co-located depth block on the basis of one or more of the following:
the one or more encoded texture views and the one or more encoded depth views,
inter-view prediction dependencies of the one or more encoded texture views,
inter-view prediction dependencies of the one or more encoded depth views,
view component order of the one or more encoded texture views and the one or more encoded depth views,
presence of a depth view component having a same sampling or output time as a texture view component including the texture block,
a texture sampling grid for the texture block and a depth sampling grid for the depth block,
a position of the texture sampling grid and a position of the depth sampling grid,
a first spatial area covered by a texture view containing the texture block and a second spatial area covered by a depth view containing the depth block,
a location and area covered by the texture block within the second spatial area.

5. The method according to claim 2 comprising:
receiving one or more input texture views and one or more input depth views;
determining which input texture views and input depth views are to be encoded; and encoding one or more indications of the one or more encoded texture views and the one or more encoded depth views.

6. The method according to claim 2 comprising:
receiving in a bitstream one or more indications of the one or more encoded texture views and the one or more encoded depth views; and
using the one or more indications to determine which input texture views and input depth views have been encoded in the bitstream.

7. An apparatus comprising at least one processor and at least one non-transitory computer-readable medium comprising a computer program code stored thereon, the at least one non-transitory computer-readable medium and the computer program code configured to, with the at least one processor, cause the apparatus to:
examine availability of a depth block co-located with a texture block;
on the basis of a co-located depth sample within the co-located depth block being unavailable in said examining, pad or interpolate the co-located depth sample on the basis of one or more available depth samples and treat the co-located depth block as available and determine a prediction method to use the co-located depth block; and
derive a prediction block for the texture block on the basis of the prediction method.

8. The apparatus according to claim 7, said at least one non-transitory computer-readable medium and the computer program code further configured to, with the at least one processor, cause the apparatus to perform at least one of the following:
encode the texture block on the basis of the derived prediction block to a bitstream, wherein the bitstream is being formed for comprising one or more encoded texture views and one or more encoded depth views;
decode the texture block on the basis of the derived prediction block from a bitstream comprising one or more encoded texture views and one or more encoded depth views.

9. The apparatus according to claim 8, said at least one non-transitory computer-readable medium and the computer program code further configured to, with the at least one processor, cause the apparatus to:
determine the prediction method for the derivation of the prediction block on the basis of one or more of the following:
the one or more encoded texture views and the one or more encoded depth views,
inter-view prediction dependencies of the one or more encoded texture views,
inter-view prediction dependencies of the one or more encoded depth views,
view component order of the one or more encoded texture views and the one or more encoded depth views.

10. The apparatus according to claim 8, said at least one non-transitory computer-readable medium and the computer program code further configured to, with the at least one processor, cause the apparatus to:
determine the availability of the co-located depth block on the basis of one or more of the following:
the one or more encoded texture views and the one or more encoded depth views,
inter-view prediction dependencies of the one or more encoded texture views,
inter-view prediction dependencies of the one or more encoded depth views,
view component order of the one or more encoded texture views and the one or more encoded depth views,
a texture sampling grid for a texture block and a depth sampling grid for a depth block,
a position of the texture sampling grid and a position of the depth sampling grid,
a spatial area covered by a texture view containing the texture block and a spatial area covered by a depth view containing the depth block.

11. The apparatus according to claim 7, said at least one non-transitory computer-readable medium and the computer program code further configured to, with the at least one processor, cause the apparatus to:
receive one or more input texture views and one or more input depth views;
determine which input texture views and input depth views are to be encoded; and
encode one or more indications of the one or more encoded texture views and the one or more encoded depth views.

12. The apparatus according to claim 7, said at least one non-transitory computer-readable medium and the computer program code further configured to, with the at least one processor, cause the apparatus to:
receive in a bitstream one or more indications of the one or more encoded texture views and the one or more encoded depth views; and
use the one or more indications to determine which input texture views and input depth views have been encoded in the bitstream.

* * * * *